US008311879B2

(12) United States Patent
Alderman et al.

(10) Patent No.: US 8,311,879 B2
(45) Date of Patent: Nov. 13, 2012

(54) SYSTEM AND METHOD FOR CUSTOMER VALUE CREATION

(75) Inventors: Jerry Alderman, Saint Charles, IL (US); Brian Kiep, Barrington, IL (US)

(73) Assignee: Valkre Solutions, Inc., Chicago, IL (US)

( * ) Notice: Subject to any disclaimer, the term of this patent is extended or adjusted under 35 U.S.C. 154(b) by 439 days.

(21) Appl. No.: 12/486,700

(22) Filed: Jun. 17, 2009

(65) Prior Publication Data

US 2010/0049592 A1 Feb. 25, 2010

Related U.S. Application Data

(60) Provisional application No. 61/073,293, filed on Jun. 17, 2008, provisional application No. 61/187,372, filed on Jun. 16, 2009.

(51) Int. Cl.
*G06Q 10/00* (2012.01)
(52) U.S. Cl. ...................................... 705/7.36
(58) Field of Classification Search ................... 705/7.36
See application file for complete search history.

(56) References Cited

U.S. PATENT DOCUMENTS

| | | | | |
|---|---|---|---|---|
| 5,208,765 A * | 5/1993 | Turnbull | ............ | 702/84 |
| 5,767,848 A * | 6/1998 | Matsuzaki et al. | ............ | 715/751 |
| 5,864,875 A * | 1/1999 | Van Huben et al. | ............ | 1/1 |
| 6,282,514 B1 * | 8/2001 | Kumashiro | ............ | 705/7.11 |
| 6,542,871 B1 * | 4/2003 | Harshaw | ............ | 705/7.11 |
| 6,581,040 B1 * | 6/2003 | Wright et al. | ............ | 705/7.23 |
| 6,862,585 B2 * | 3/2005 | Planalp et al. | ............ | 1/1 |
| 6,871,182 B1 * | 3/2005 | Winnard et al. | ............ | 705/7.37 |
| 7,346,538 B2 * | 3/2008 | Reardon | ............ | 705/7.29 |
| 7,769,615 B2 * | 8/2010 | Linder et al. | ............ | 705/7.29 |
| 7,809,634 B1 * | 10/2010 | Bierc | ............ | 705/38 |
| 2001/0032105 A1 * | 10/2001 | Frye et al. | ............ | 705/7 |
| 2002/0052862 A1 * | 5/2002 | Scott et al. | ............ | 707/1 |
| 2002/0059512 A1 * | 5/2002 | Desjardins | ............ | 713/1 |
| 2002/0165744 A1 * | 11/2002 | Juras et al. | ............ | 705/7 |

(Continued)

OTHER PUBLICATIONS

"ISBM Nuggets: New Product Development Consortium Portfolio Management", Donath, Bob, Mar. 19, 2001, pp. 1-54.*

(Continued)

*Primary Examiner* — Jonathan G Sterrett
(74) *Attorney, Agent, or Firm* — Venable LLP; Frank M. Gasparo; Ryan M. Flandro

(57) ABSTRACT

A system and related methods used by an organization to collect, manage, analyze and act on data (i.e., manage "customer value creation" or "CVC") from customers. The system may be used by organizations without depending on consultants to manage customer value creation. The system comprises an integrated dataset and schema, termed "Customer Value Creation Data," which comprises three data types: Differential Value Proposition; Demand Influence; and Opportunities. Differential Value Proposition is the ability of the organization's products and services to positively impact their customer's bottom line relative to the organization's competitors. The ability to create a DVP can be correlated to the investments and strategies made by the organization on an ongoing basis. The connection between an organization's investments and strategies, and their customer's bottom line, comprises three parts: the investments and strategies that an organization makes (Value Attributes); the relative importance or impact each investment or strategy has on a customer's bottom line (Value Attribute Scores); and the combined, quantified economic or financial impact that all the Value Attributes have on a customer's bottom line or profitability (Differential Value Proposition Percentage, or "DVP %"). The system may be embodied in a computer program that implements modules in the appropriate order, collects and stores relevant data, and perform necessary calculations. The program may be run through an Internet web browser.

8 Claims, 76 Drawing Sheets

U.S. PATENT DOCUMENTS

| | | | | |
|---|---|---|---|---|
| 2003/0033191 | A1* | 2/2003 | Davies et al. | 705/10 |
| 2003/0088493 | A1* | 5/2003 | Larsen et al. | 705/36 |
| 2004/0249658 | A1* | 12/2004 | Schwerin-Wenzel et al. | 705/1 |
| 2005/0108043 | A1* | 5/2005 | Davidson | 705/1 |
| 2008/0086344 | A1* | 4/2008 | Martini et al. | 705/7 |
| 2008/0208648 | A1* | 8/2008 | Linder et al. | 705/7 |
| 2009/0271255 | A1* | 10/2009 | Utter et al. | 705/14 |

OTHER PUBLICATIONS

Deck, Mark; Givert, Didier; Strom, Mark; "The Increasing Role of Deep Collaboration in Development—Strategy, Produces and Processes are Converging into Customer-Driven Value Chains", Spring 2000, PRTM's Insight Magazine, pp. 1-2.*

New product performance: What distinguishes the star products Robert G Cooper, Elko J Kleinschmidt. Australian Journal of Management. Sydney: Jun. 2000.vol. 25, Iss. 1; p. 17, 29 pgs.*

McGrath, Michael; Iansiti, Marco, "Envisioning IT-Enabled Innovation", Dec. 1998, PRTM Insight Magazine, pp. 1-11, www.prtm.com/insight/article.asp?insight_id=2737.*

From experience: linking projects to strategy [PDF] from uncw.edu RL Englund . . . —Journal of Product Innovation . . . , 1999—Wiley Online Library.*

* cited by examiner

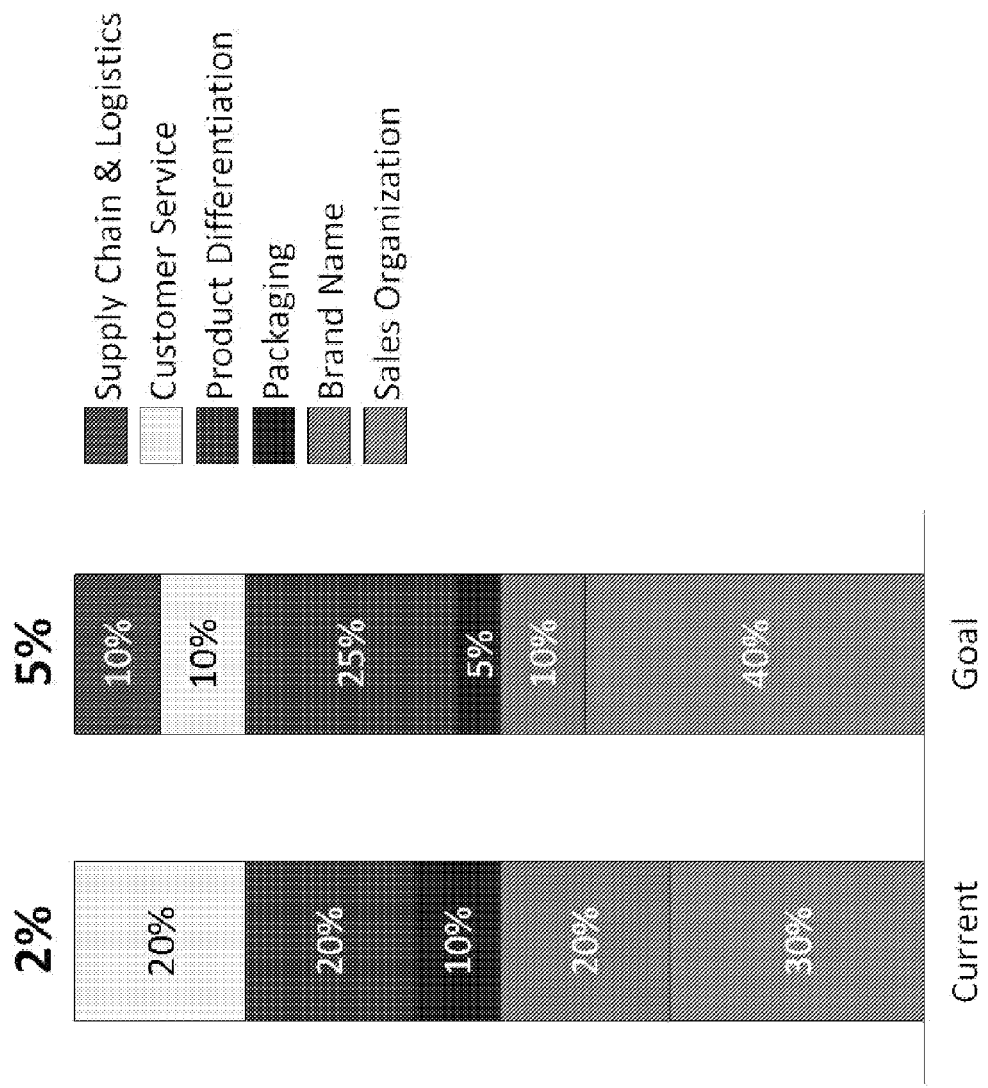

| Value Attribute | Opportunity | Opty $ |
|---|---|---|
| Sales Organization | Sales organization has to make more frequent sales calls. They need to engage our sales people and stores on new product launches, market info, service issues. Make joint sales calls with our best customers. | $143,842 |
| Product Differentiation | Our stores cannot co-ordinate top loading accessories on full shingle trucks. They are forced to buy through distribution. You are constantly asking for more accessory business. Bring us a business proposition that will allow us to buy in single pallet qty. | $143,842 |
| Corporate Services | Pricing. We need price sheets that reflect the correct price, are understandable and complete. As an ex., Lubbock TX does not have pricing | $ 0 |
| Marketing Programs | OC needs a builder incentive program. The old OC builder program was a great program. We together need to offer a package that builder can't refuse, something that has a training component on how to make more money and part that helps pull through sales for builder. | $143,842 |

DVP Opty = 1%

| 33% Product Differentiation | 33% Sales Organization | 33% Marketing Programs |

Opportunity

FIGURE 4

Internal Hypothesis Search

Please select an Internal Hypothesis for Influence or Value Proposition to get started.

Internal Hypothesis for Influence

Country: -- Any --   Business Unit: -- Any --   Market: -- Any --
Decision: -- Any --   Active: -- Any --   Planning Period: -- Any --

Internal Hypothesis for Value Proposition

Country: -- Any --   Customer Type: -- Any --   Business Unit: -- Any --   Planning Period: -- Any --
Market: -- Any --   Active: -- Any --

| Country | Customer Type | Business Unit | Market | Active | Planning Period |
|---------|---------------|---------------|--------|--------|-----------------|
| USA | Big Box | Roofing | All Markets | ● | 2009 |
| USA | Pipe Distributor | Pipe | All Markets | ● | 2009 |
| USA | Architect | Masonry Products | New Commercial | ● | 2009 |
| USA | Building Owner | Masonry Products | New Commercial | ● | 2009 |
| USA | Influence Group | Residential Insulation | All Markets | ● | 2009 |

Business: Residential Insulation
Customer: Big Box
Market: All Markets

How do we create value for you?

Internal

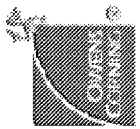

- Customer Service 5
- Market Research & Knowledge 5
- Operations Consulting 5
- Merchandising 5
- Packaging 5
- Marketing Programs 10
- Marketing Materials 10
- Product Differentiation 15
- Sales Organization 15
- Brand Name 25

Total Value: 3.5%

Customer

Notes:

| | Current | Goal |
|---|---|---|
| Customer Service | | |
| Market Research & Knowledge | | |
| Operations Consulting | | |
| Merchandising | | |
| Packaging | | |
| Marketing Programs | | |
| Marketing Materials | | |
| Product Differentiation | | |
| Sales Organization | | |
| Brand Name | | |
| Others? | | |
| Total Value | | |

| Scenario | Current DVP | DVP Opportunity | Influence | CVC Approach |
|---|---|---|---|---|
| Opportunity | LOW (<4%) | High (>2%) | HIGH currently or getting larger quickly | These customers are looking for help. They currently do not see much value, but have provided a roadmap to create it. Investments here will be new to these customers and may require more coordination and effort |
| Partner | HIGH (>4%) | High (>2%) | HIGH currently or getting larger quickly | These customers are looking to substantially grow with you. The investments here could be new ideas that could substantially grow the profitability of you and your customer. |
| Maintain | HIGH (>4%) | LOW (<2%) | HIGH currently or getting larger quickly | These customers are looking for you to maintain the value proposition you've established. The investments here will create incremental value and maintain a satisfied customer relationship. |
| Test | LOW (<4%) | LOW (<2%) | HIGH currently or getting larger quickly | These customers either do not know or don't care if you create value for them. The best approach here is to focus on a few individual customers in this group and test some value creation opportunities. If successful, then they can be rolled out to the larger group |
| Influencer | Unknown | Unknown | HIGH currently or getting larger quickly | These participants in the value chain control or will control significant portion of the demand for your products and services. The best approach in this case is to begin collecting DVP data on this group to better understand their value drivers and motivations. |
| None | N/A | N/A | No influence and/or not a direct customer | These participants seemingly do not have the power to execute a platform for profitable growth and should not be a value creation focus. |

FIGURE 22

Client Values

DVP Segments

Current 4 %  Current DVP level to determine High and Low segments.
Opportunity 2 %  Opportunity level to determine High and Low segments.

Value Attribute Segments

Current 20 %  Minimum level of current Value Attribute score.
Opportunity 5 %  Minimum level of change in Value Attribute score.

Internal Hypothesis
- Assumptions
- Value Drivers
- Functional Areas
- Value Segmentation
Planning Periods
Customer Types
Customer Levels
Market Types
Competitors
Businesses
Business Units
Influencer Types
Decision Types
Value Attribute Types
Additional Note Types
Locations
Categories
Category Units
Investment Allocations

| Value Attribute | Source Analysis | Initiatives | Value Creation |
|---|---|---|---|
| Sales Organization | Attribute Segments | Bolster sales to be responsive and proactive with communications (clarity, transparency, trust) problem solving and building relationships down the value stream (contractors, builders ...) | $669,358 |
| Sales Organization | Attribute Segments | Demand generation via joint sales calls with distributors. | $6,873,771 |
| Marketing Programs | Attribute Segments | Expand customer loyalty programs | $145,739 |
| Supply Chain & Logistics | Attribute Segments | Improve replenishment capability to include shorter cycle, more frequent deliveries, and less than truck load quantities. | $1,961,452 |
| Corporate Services | Customer Type | Improvements required in pricing SAR turn around time and invoice accuracy, BMG Pricing Operations project underway. | N/A |
| Product Differentiation | Attribute Segments | More product innovation in areas of green, high end shingles, specialty (hail resistant) and more bold color selections. | $9,294,719 |
| Partnership | Attribute Segments | Resolve channel conflict with big box - consider possibility of some exclusive products to mitigate head to head comparisons | N/A |
| Partnership | Attribute Segments | Training for customer store associates to better represent and sell OC. | $1,123,464 |

FIGURE 30

Initiative Management

Initiative: Pricing Administration requires improvement including SAP processing time and assurance that orders are priced appropriately the first time (in accordance with buys or approved SARs)

*Investment successfully created*

Value Attribute: Corporate Services

Status: Under Review

Planning Period: 2009

Level: Customer Type

Scope: 2-Step Distributor

Opportunities | Value Creation | Actions | Investments

Action: Value Creation Action

Action Investments

| Investment | Category | Category Unit | Unit Quantity | Unit Cost | Allocation |
|---|---|---|---|---|---|
| Investment Description | Capital | Dollars | 100 | $100.00 | # of Customers |

FIGURE 35

Value Creation Plan

Value Creation Goal $431,526
Value Creation Plan $431,526

Business Unit: Roofing
Customer Type: 1-Step Distributor
Market Type: All Markets

| Value Attribute | Opportunity | Opty $ | Initiatives | Status |
|---|---|---|---|---|
| Sales Organization | Sales organization has to make more frequent sales calls. They need to engage our sales people and stores on new product launches, market info, service issues. Make joint sales calls with our best customers. | $143,842 | Demand generation via joint sales calls with distributors. | Under Review |
| Product Differentiation | Our stores can not co-ordinate top loading accessories on full shingle trucks. They are forced to buy through distribution. You are constantly asking for more accessory business. Bring us a business proposition that will allow us to buy in single pallet qty. | $143,842 | Improve replenishment capability to include shorter cycle, more frequent deliveries, and less than truck load quantities. | Under Review |
| Corporate Services | Pricing we need price sheets that reflect the correct, are understandable and complete. As an example Lubbock, TX does not have pricing | $0 | Delivered updated pricing sheets on a weekly basis | In Progress |
| | | | log a quick win | Completed |
| Marketing Programs | OC needs a builder incentive program. The old OC builder program was a great program. We together need to offer a package that the builder can't refuse. something that has a training component on how to make more money and part that helps pull through sales for the builder | $143,842 | Expand customer loyalty programs | Under Review |

FIGURE 38

Initiative Management

Investment successfully created.

Initiative: Pricing Administration requires improvement including SAP processing time and assurance that orders are priced appropriately the first time (in accordance with buys or approved SARs)
    Value Attribute: Corporate Services    Status: Under Review Planning Period: 2009    Level: Customer Type    Status: 2-Step Distributor Opportunities | Value Creation | Actions | Investments

Initiative Actions

| Action | Team | Owner | Investment Status | % Complete | Start Date | Length (weeks) |
|---|---|---|---|---|---|---|
| Value Creation Action | BMS Region: Southwest | Katie Boulton | $10,000.00 Under Review | 100 % | 1/1/2009 | 1 |

FIGURE 43

| Value Creation Opportunity | ~$5 million | $2.5 million |
|---|---|---|
| Opportunities | • The code work is still important and you cannot lose sight. Work to adopt R8 codes & to assure code compliance/upgrades in current R8 states<br>• International Capabilities: International Capacity: The international markets are growing and the demand for FDM is there...we need to grow together internationally<br>• Product Differentiation: Technology agreement: we need to be developing new products and product enhancement to drive growth and profitability...we are not doing this now | • Educate and market to HVAC contractors and homeowners in both new construction and retrofit markets. This will boost total market and sales of flex duct.<br>• International Capabilities: OC put FDM insulation capacity outside the U.S. to service ATCO plants outside the U.S. 1st priority should be capacity in Europe.<br>• Pricing Strategy: Continue to work together to create pricing and programs specific to ATCO that provide differentiation, allowing ATCO to manage costs, as well as gain share in the market. Need clear strategy to help defend against Quietflex pricing direct to contractor.<br>• Product Differentiation: Need to continue with projects underway to jointly develop product differentiation for ATCO specifically (i.e. lightweight rainbow projects). Need these to get to product and market in order to impact actual business results. |
| Incremental Value Created | $2.5 million | TBD |

FIGURE 49B

| Role | Responsibility | Organization Positions |
|---|---|---|
| CVC Officer | • Leadership, Budgets, and Performance Expectations | • Executive Team<br>• Business Presidents |
| CVC Leader | • Define Scope, Objectives, Process, Resources and Accountabilities<br>• Make Investment Decisions | • General Managers<br>• Sales Leadership Team |
| CVC Manager | • Lead Customer Value Creation Execution | • Area Directors<br>• Regional Sales Leaders<br>• National Account Managers |
| CVC Specialist | • Execute Customer Value Creation | • Area Sales Managers |
| CVC Analyst | • Formulate CVC recommendations through analysis, interpretation, and presentation of CVC data | • Marketing Managers<br>• Business Managers<br>• Marketing Analysts |
| CVC Consultant | • Incorporate CVC data into other processes, functions and capabilities | • R&D Leadership<br>• HR Leadership<br>• Supply Chain Leadership<br>• Marketing Leadership |

FIGURE 52

CVC Change Management Task Matrix

Accountability:
Harlan
Employee
Valkre

| | | Architect | | Capability | | | Adoption | |
|---|---|---|---|---|---|---|---|---|
| | Task | Type | Task | Type | Task | Type |
| CVC Officer | CVC Officer Meeting | Communications | Change Management Status Sched | Communications | Customer Ops Plan Analysis | Technology |
| | | | Office Classroom Training | Training | New Product Development Analysis | Technology |
| | | | | | Corporate Awareness Campaign | Communications |
| CVC Leader | GM Status Schedule | Communications | OCU | Training | Value Creation Analysis | Technology |
| | SLT Status Schedule | Communications | Interview Classroom Training | Training | Value Capture Analysis | Technology |
| | CVC Business Plan Created | Process | Opportunity Analysis | Technology | Execution Status | Technology |
| | | | Value Segmentation | Technology | 75% of Revenues In Plan | Process |
| | | | Customer Operating Plans | Technology | Corporate Awareness Campaign | Communications |
| | | | Customer Management | Technology | Refresh Training Schedule | Training |
| | | | Customer Ops Plan Training | Training | | |
| | | | Customer Ops Plan Created | Process | | |
| | | | Analysis Training | Training | | |

FIGURE 54

CVC Leaders

Category Status: 50%

Total resources in category: 12

| Adoption Step | Count | | Training | Count |
|---|---|---|---|---|
| Aware | 5 | | Not Started | 5 |
| Capability | 7 | | In Progress | 1 |
| Activity | 0 | | Completed | 6 |
| Adoption | 0 | | | |

| | | Tom Quigley | Joe Sihoa | David Rasussen | Larry Shealey | Curt Barker | Mike Swift |
|---|---|---|---|---|---|---|---|
| | | 47% | 41% | 41% | 59% | 59% | 47% |
| Technology | | | | | | | |
| 2 Opportunity Analysis | Valkre | Completed | Completed | Completed | Completed | Completed | Completed |
| 2 Value Segmentation | Valkre | Completed | Completed | Completed | Completed | Completed | Completed |
| 2 Customer Operating Plans | Valkre | Completed | Completed | Completed | Completed | Completed | Completed |
| 2 Customer Management | Valkre | Completed | Completed | Completed | Completed | Completed | Completed |
| 3 Value Creation Analysis | Valkre | Not Started | Not Started | Not Started | Not Started | Not Started | Not Started |
| 3 Value Capture Analysis | Valkre | Not Started | Not Started | Not Started | Not Started | Not Started | Not Started |
| 3 Execution Dashboard | Valkre | Completed | Completed | Completed | Completed | Completed | Completed |
| | | | | | | | |
| Communications | | | | | | | |
| 1 GM Status Schedule | Harlan | Completed | Completed | Completed | Completed | Completed | Completed |
| 1 SLT Status Schedule | Harlan | Completed | Completed | Completed | Completed | Completed | Completed |
| 3 Corporate Awareness Campaign | Harlan | Not Started | Not Started | Not Started | Not Started | Not Started | Not Started |

FIGURE 55

Objectives:
- Determine how we can improve our collective profitability by better aligning our investments and strategies with your business objectives
- This starts by creating Differential Value for you
- To help achieve the objective, we have:
  - prepared this guide to make best use of your time
  - organized our best thinking on the market and our place in the market
- We need your perspective so we can tailor our investments and strategies to your needs

Agenda:
- Create a common understanding of Quantifying Differential Value
- Understand how we should be work together in the marketplace
- Determine how our investments impact your bottom line today
- Create an investment roadmap that will improve your profitability

FIGURE 57A

Talking Points

1. Thank the customer for their time and ask them to be open and honest as the conversation is all about making their business more money
2. This is not a sales call we are here to listen to your perspective on how we can improve the value you receive from the investment we make
3. State that this is the start. OC's vision is that this conversation drives continuous improvement in terms of understanding how OC can improve your profitability.
4. Cover The Agenda
5. This is a CEO Level Initiative
6. The initiative cuts across multiple business units, markets, and geographies

FIGURE 57B

Talking Points

1. For this conversation we would like to define value as the increase in your operating income by doing business with us instead of our competitors.

2. It's the difference we make to your bottom line relative to our competitors that will determine if we grow and prosper with you over time.

3. If it's something all competitors offer then it's not Differential Value.

4. We have calculated how our DVP impacts your bottom line. This number is expressed as a percentage, such as 2%. If our DVP to you was 2% this would mean that for every $1 million of purchase from us you would realize $20,000 additional operating income that you would not have gotten had you purchased that same $1 million from our competitors.

FIGURE 58B

Talking Points

1. This picture represents our internal perspective on the participants in the Value Chain and their respective power or influence on product choice and brand choice.

2. Outline the contents of the slide, including the definition of Product Type Influence vs. Brand Influence.
   - Product Type: Indirect Competition
   - Brand: Direct Competition 3. Explain the rationale behind the OC Internal Hypothesis 4. Ask the Customer To Allocate 100 Points to Product Type and Brand Influence.

5. Ask the Customer if the influence picture will be changing in the future. Get them to redistribute 100 points.

6. Ask which of the channel participants OC and the Customer should work together to increase our collective influence. Where should OC focus the resources?

FIGURE 59B

Talking Points

1. This page is about putting visualizing the DVP
2. On the Left Hand Side you see a stacked bar chart that lists the differential value attributes and what we feel is the most important to you
3. The large # below this is the total value of the DVP.
4. Let's focus on the Value Attributes, do these scores need updating? Are there Attributes missing? WHY?
5. Based on these Value Attributes, what is the total value of the DVP? WHY?
6. Do you see the DVP value Increasing? To What? WHY?
7. To get there, what would change regarding the Value Attributes? WHY?

FIGURE 60B

Talking Points

1. Ideally, at this point, you know the value creation opportunities based on the Influence and Value Proposition Discussion. Read them back to the customer and prioritize accordingly.
2. If no value creation opportunities have been identified, ask them: "If we could invest in ONE thing to improve your long-term profitability, what would it be?"
3. What would be the second thing? The third? Anything we've missed?

Top 3 Value Creation Opportunities

| 1 | 2 | 3 |
|---|---|---|
|   |   |   |

Class Overview

The Class Catalog Matrix below provides the required and recommended/optional classes for the various Value training paths.

| Class Name | ID | Value Analyst | Value Practice | Value Managers | Value Consultant | Value Architect | Custom Managers |
|---|---|---|---|---|---|---|---|
| Customer Discovery Introduction | CD100A | R | R | R | R | R | R |
| Overview of the Discovery Process | CD100B | R | R | R | R | R | R |
| Customer Discovery Introduction Lecture | CD100C | R | R | R | R | R | R |
| Customer Discovery Interview Overview | CD200A | R | R | R | R | R | R |
| Internal Hypothesis Data Collection | CD210A | R | R | R | | | |
| Creating The Internal Hypothesis | CD210B | R | R | R | R | | |
| Facilitating the Internal Hypothesis | CD210C | R | R | R | | R | |
| Internal Hypothesis Work Session | CD210D | R | R | R | R | | R |
| Customer Selection | CD220A | R | R | R | R | | R |
| Interview Scheduling | CD220B | R | R | R | R | | |
| Creating the Interview Guide | CD220C | R | R | R | R | | |
| Creating the Customer Fact Book & Quick Reference | CD220D | R | R | R | R | | |
| Leading the Customer Discovery Interview | CD230A | R | R | R | R | R | |
| Interview Best Practices | CD230B | R | R | R | R | | |
| Customer Discovery Mock Interview Work Session | CD230C | R | R | R | R | R | |
| Recording a Customer Interview | CD240A | R | R | R | R | R | |
| Recording a Customer Interview Work Session | CD240B | R | R | R | R | R | |
| Customer Discovery Analysis Overview | CD300A | R | R | R | R | R | |
| Report Analysis Work Session | CD300B | R | R | R | R | R | R |
| Value Proposition Analysis | CD310A | R | R | R | | R | R |
| Value Creation Opportunities Analysis | CD320A | R | R | R | | R | R |

FIGURE 67

SYSTEM AND METHOD FOR CUSTOMER VALUE CREATION

This application claims priority to Provisional Patent Application Nos. 61/073,293, filed Jun. 17, 2008, and 61/187,372, filed Jun. 16, 2009, both entitled "SYSTEM AND METHOD FOR CUSTOMER VALUE CREATION," and is entitled to those filing dates for priority in whole or in part. The complete disclosures, specifications, drawings and attachments of Provisional Patent Application Nos. 61/073,293 and 61/187,372 are incorporated herein in their entireties by reference for all purposes.

TECHNICAL FIELD

The present invention relates to a system and method for data collection, analysis and management.

BACKGROUND OF THE INVENTION

Companies have long made strategic and investment decisions by investing in the collection and analysis of internal data streams. Typical internal data streams, such as those seen in a normal customer relationship management system, include customer order history, customer service history, sales forecasts, marketing campaign results, and supply chain/operating data. The fundamental use of this data is to measure an organization's profitability with a customer or set of customers.

While this type of data is commercially focused, and has been sufficient in the past, in today's markets this type of knowledge is simply the cost of doing business. As competition intensifies with the introduction of so much readily available information, the ability for organizations to differentiate will become more difficult. In today's markets, an organization's ability to differentiate will require a deep understanding of how their investments and strategies impact their bottom line as well as their customer's bottom line. Data streams that are internally-focused on the economics of the company, not on the economics of the company's customers, are missing an entire dimension when evaluating their competitiveness. Organizations that can add data streams in a systemic fashion along the dimension of understanding their role in a customer's profitability will be able to align their investments and strategies around the economics of their customers, not their own, and succeed in the future.

In recent years the market has seen an influx of "Voice of Customer" firms and methodologies that use surveys to collect customer information to better understand their services. This type of data is typically collected during single-focus projects, and creates silos of data that are not easily integrated into the organization, acted upon, and measured on an ongoing and systemic basis. In addition, existing 'Voice of Customer' firms and methodologies focus on qualitative and relative indices such as customer satisfaction or preference that is inherently difficult to quantify the economic benefit a customer receives as a result of an organization's investments or strategies. Finally, existing 'Voice of Customer' firms and methodologies are built for the execution by advanced degree subject matter experts, in turn creating a dependency on these high cost individuals for the data stream.

SUMMARY OF INVENTION

In several exemplary embodiments, the system of the present invention may be used by a consulting business helping a client (i.e., the organization) collect, manage, analyze and act on data (i.e., manage "customer value creation" or "CVC") from the client's customers. The system may be used by organizations without depending on consultants to manage customer value creation. In one embodiment, at the core of managing customer value creation is an integrated dataset and schema, termed "Customer Value Creation Data." Embodiments of the present invention go beyond "Voice of Customer" work in that customer value creation includes a computer-assisted or implemented process, software, and education to create a sustainable and scalable platform for profitable growth.

In one embodiment, the system comprises a CVC Dataset, which is an integrated schema of, at the highest level, three data types: Differential Value Proposition; Demand Influence; and Opportunities. At the highest level, the two key differentiators are the dataset and how the data integrates to form a system of understanding customer value creation. Each individual piece of the dataset is collected to better understand how organizations impact their customer's profitability so that these organizations better know where to invest to create a differential competitive advantage.

Differential Value Proposition is the ability of the organization's products and services to positively impact their customer's bottom line relative to the organization's competitors. The ability to create a DVP can be correlated to the investments and strategies made by the organization on an ongoing basis. The connection between an organization's investments and strategies, and their customer's bottom line, comprises three parts: the investments and strategies that an organization makes (Value Attributes); the relative importance or impact each investment or strategy has on a customer's bottom line (Value Attribute Scores); and the combined, quantified economic or financial impact that all the Value Attributes have on a customer's bottom line or profitability (Differential Value Proposition Percentage, or "DVP %"). The Differential Value Proposition may be measured in three stages: internally to create a baseline understanding; currently from the customer's perspective; and the customer's perspective on what the Differential Value Proposition can be.

The Demand Influence element comprises measuring market and channel influence to provide insight into where a Differential Value Proposition is critical. In one embodiment, it comprises a map of investment options within a given market, organization or channel that instructs an organization where a Differential Value Proposition % needs to be strong and where the investments to create a Differential Value Proposition should be focused. A Demand Influence Map may comprise three parts: which constituents in a given market, organization, or channel control demand for an organization's products or solutions currently; how the demand control will change in the future; and based on that information, where should the investment focus be placed.

The Opportunities element comprises the identification of opportunities to create incremental value for a customer. One approach comprises examining and explaining the difference between current DVPs and goal DVPs. Examples of opportunities and their impacts include: (a) improving special order sales lead times, with the impact of freeing working capital and increasing the number of customers; (b) promoting use of recycled content for "green" products, with the impact of increasing the number of customers; and (c) and becoming more responsive to day-to-day needs, with the impact of reducing operating costs.

An investment detail may comprise two parts: specification of how an organization should invest to create differential value, and how that investment will impact a customer's profitability.

By combining individual pieces and Customer Value Creation data types, silos of information are turned into a system of knowledge. This system of knowledge provides the basis for managing the dataset above and beyond simplistic analysis. At the highest level, when two of the three data types are combined, a piece of the CVC data system is created. These are Value Creation Opportunities, Channel Understanding, and Probability of Success.

In another exemplary embodiment, the system comprises the CVC Approach, which comprises the following modules or components: Gather/Discover, Analyze, Execute, Measure, and Certify. These modules, when combined, are the framework for managing customer value from an outside-in (i.e., customer-driven) perspective. By doing so, organizations create a competitive advantage by continuously optimizing return on investments made and eliminating the investments that are bound to fail. In the description of the CVC approach that follows, the CVC solution focuses on transforming the way client organizations create, deliver, and measure customer value, using a rigorous, quantitative approach.

In one embodiment, the CVC Approach comprises a computer program that implements the above modules in the appropriate order, collects and stores relevant data, and perform necessary calculations. The program may be run through an Internet web browser.

BRIEF DESCRIPTION OF THE DRAWINGS

FIG. 3 is an exemplary diagram showing the examination of current and goal DVPs under the Opportunities component.

FIG. 4 is an exemplary diagram summarizing Value Creation Opportunities.

FIG. 7 shows an exemplary Internal Hypothesis screen for the Gather module.

FIG. 8 shows another exemplary Internal Hypothesis screen for the Gather module.

FIG. 15 shows a DVP data collection template for the Gather module.

FIG. 16 shows an Interview Capture Screen for the Gather module.

FIG. 17 shows an Influence Capture Screen for the Gather module.

FIG. 18 shows a DVP Capture Screen for the Gather module.

FIG. 22 is a table of scenarios based on DVP and Demand Influence for the Analyze module.

FIG. 23 shows a setup for Value Segmentation Criteria for the Analyze module.

FIG. 28 shows an Opportunity Analysis screen for the Analyze module.

FIG. 30 shows an Opportunity Analysis list of initiatives for the Analyze module.

FIG. 35 shows a Value Capture Analysis investment screen for the Analyze module.

FIG. 38 shows a Value Creation Plan initiatives status screen for the Execute module.

FIG. 43 shows an Action Execution screen for the Execute module.

FIG. 52 shows a Roles & Responsibilities table for the Certify module.

FIG. 54 shows a Change Management chart for the Certify module.

FIG. 55 shows a Change Management milestone chart for the Certify module.

FIGS. 57-62 show the steps in an embodiment of the Discovery Process of the Product Suite.

FIG. 66 shows an Application Shell client value form.

FIG. 67 shows a class catalog matrix.

DETAILED DESCRIPTION OF EXEMPLARY EMBODIMENTS

The system and method of the present invention is a methodology and tool set that allows organizations to collect, manage, analyze, and act on data that quantifies their competitive advantage from their customer's perspective. This is done by enabling organizations to systemically answer the question, "Do My Customers make more money doing business with me?"

In one exemplary embodiment, the system of the present invention may be used by a consulting business helping a client (i.e., the organization) collect, manage, analyze and act on data (i.e., manage "customer value creation" or "CVC") from the client's customers. The system may be used by organizations without depending on consultants to manage customer value creation. In one embodiment, at the core of managing customer value creation is an integrated dataset and schema, termed "Customer Value Creation Data." Embodiments of the present invention go beyond "Voice of Customer" work in that customer value creation includes a computer-assisted or implemented process, software, and education to create a sustainable and scalable platform for profitable growth.

Figure 1:
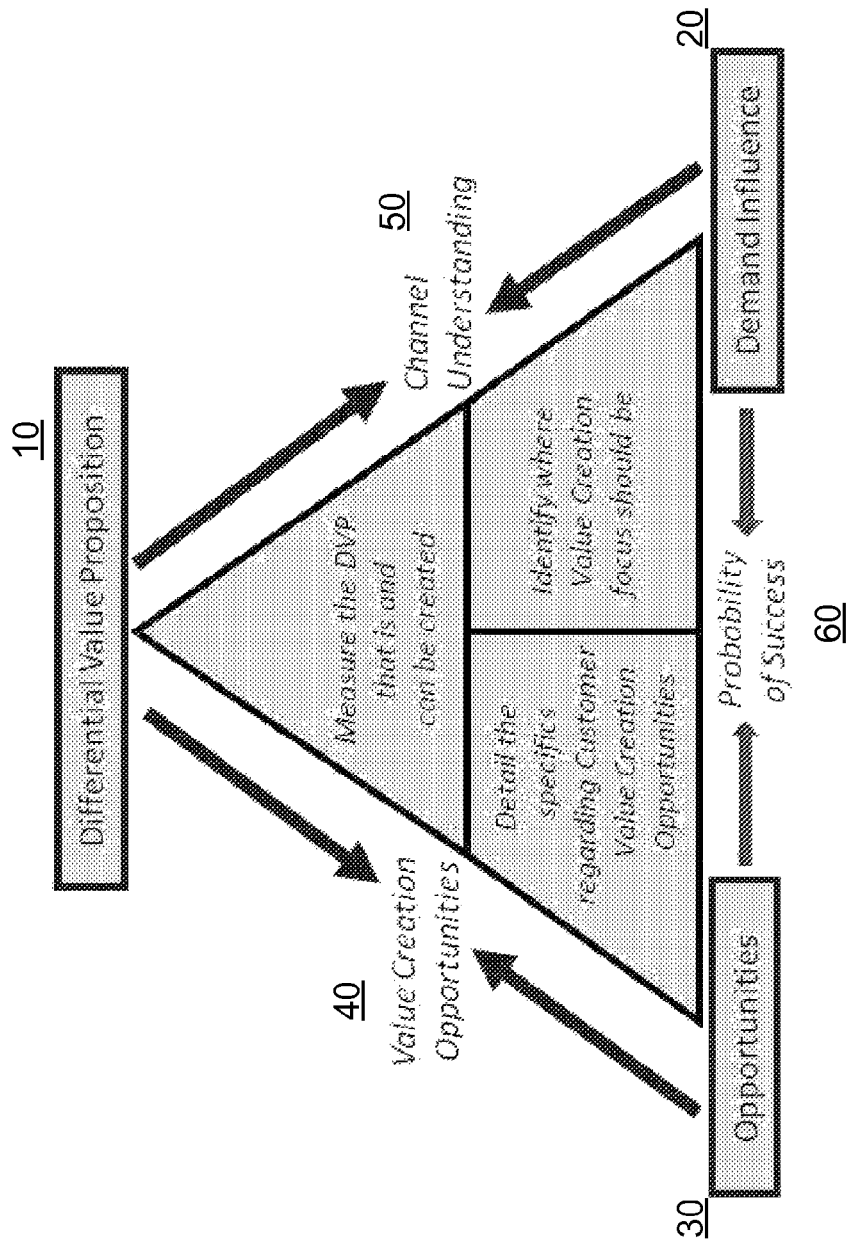
FIG. 1 is a diagram showing components of the Customer Value Creation Dataset in accordance with an exemplary embodiment of the present invention.

In one embodiment, the system comprises a CVC Dataset. As seen in FIG. 1, a CVC Dataset is an integrated schema of, at the highest level, three data types: Differential Value Proposition 10; Demand Influence 20; and Opportunities 30. At the highest level, the two key differentiators are the dataset and how the data integrates to form a system of understanding customer value creation. Each individual piece of the dataset is collected to better understand how organizations impact their customer's profitability so that these organizations better know where to invest to create a differential competitive advantage. The three pieces of the dataset are described in detail below.

Differential Value Proposition: This element (DVP) is the ability of the organization's products and services to positively impact their customer's bottom line relative to the organization's competitors. In sum, the ability of the organization's customers to make more money doing business with the organization than with its competitors. The ability to create a DVP can be correlated to the investments and strategies made by the organization on an ongoing basis. The connection between an organization's investments and strategies, and their customer's bottom line, comprises three parts: the investments and strategies that an organization makes (Value Attributes); the relative importance or impact each investment or strategy has on a customer's bottom line (Value Attribute Scores); and the combined, quantified economic or financial impact that all the Value Attributes have on a customer's bottom line or profitability (Differential Value Proposition Percentage, or "DVP %").

In one embodiment, the Differential Value Proposition Percentage (DVP %) is calculated as the total economic impact, in operating margin dollars, an organization has on its customer's bottom line divided by the amount of money a customer spends with that organization to buy, use, or interact with its products or services. In other terms, DVP % equals the profit that the organization's DVP contributes, divided by the amount of products or services the customer buys or uses. For example, if the DVP is $40,000, and the total amount of money spent by the customer is $1,000,000, then the DVP % is 4%.

A DVP % scale may be used to indicate relative advantage. A DVP % of 0% means that the organization is equal to its competitors. A DVP % of less than 0% means that the competitor has the advantage. A DVP % of 2% indicates that the DVP is measurable, but thin, while a DVP % of 4% indicates a solid contribution to the client's bottom line, which higher percentages indicate relatively greater importance of the organization to the client.

The Differential Value Proposition may be measured in three stages: internally to create a baseline understanding; currently from the customer's perspective; and the customer's perspective on what the Differential Value Proposition can be.

Figure 2:
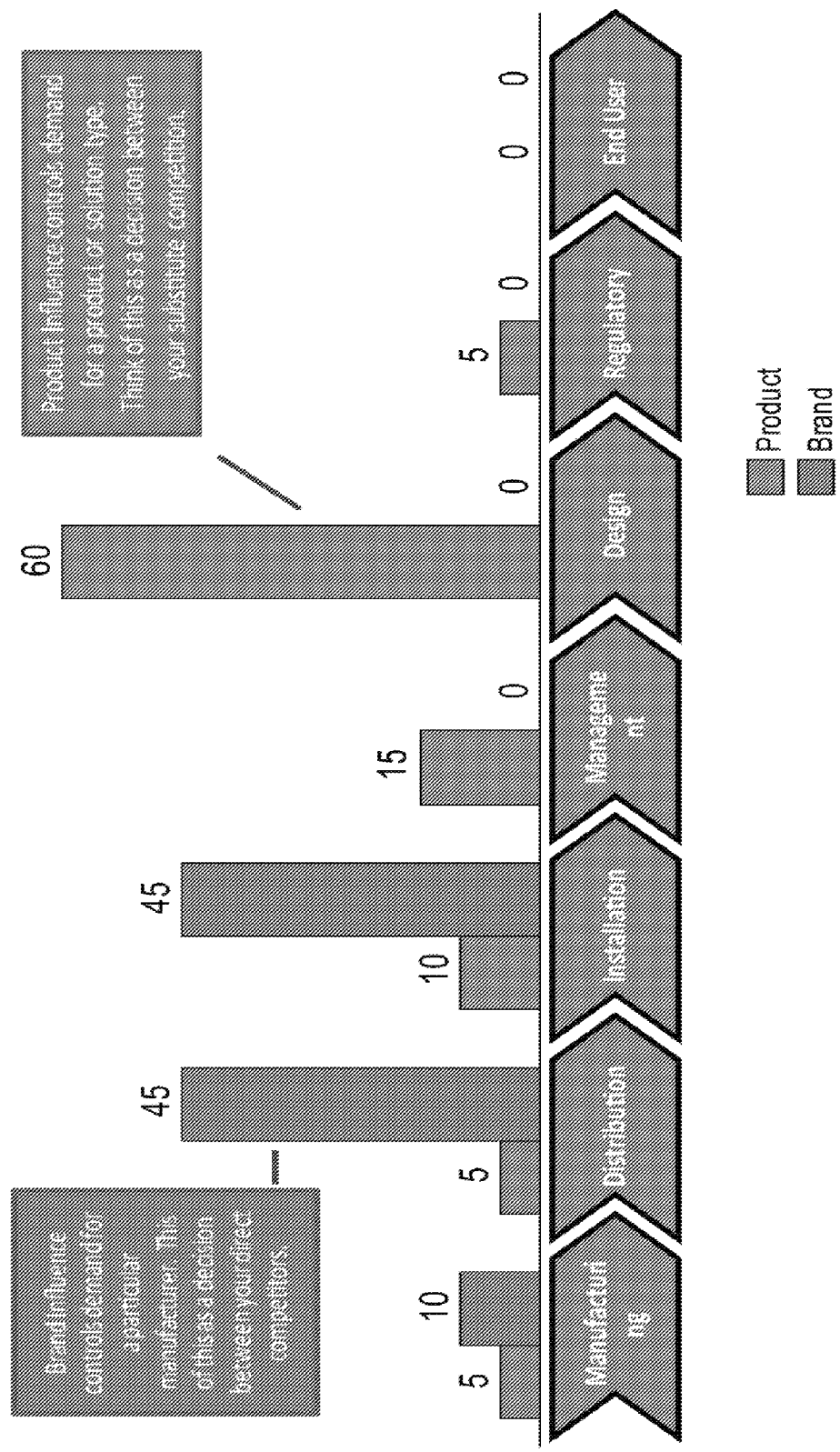
FIG. 2 is an exemplary diagram showing measuring channel influence under the Demand Influence component.

Demand Influence: The element comprises measuring market and channel influence to provide insight into where a Differential Value Proposition is critical (see FIG. 2). In one embodiment, it comprises a map of investment options within a given market, organization or channel that instructs an organization where a Differential Value Proposition % needs to be strong and where the investments to create a Differential Value Proposition should be focused. A Demand Influence Map may comprise three parts: which constituents in a given market, organization, or channel control demand for an organization's products or solutions currently; how the demand control will change in the future; and based on that information, where should the investment focus be placed.

Opportunities: This element comprises the identification of opportunities to create incremental value for a customer. One approach comprises examining and explaining the difference between current DVPs and goal DVPs, as seen in FIG. 3. Examples of opportunities and their impacts include: (a) improving special order sales lead times, with the impact of freeing working capital and increasing the number of customers; (b) promoting use of recycled content for "green" products, with the impact of increasing the number of customers; and (c) and becoming more responsive to day-to-day needs, with the impact of reducing operating costs.

An investment detail may comprise two parts: specification of how an organization should invest to create differential value, and how that investment will impact a customer's profitability.

By combining individual pieces and Customer Value Creation data types, silos of information are turned into a system of knowledge. This system of knowledge provides the basis for managing the dataset above and beyond simplistic analysis. At the highest level, when two of the three data types are combined, a piece of the CVC data system is created. As shown in FIG. 1, these are Value Creation Opportunities 40, Channel Understanding 50, and Probability of Success 60.

Value Creation Opportunity: As seen in FIG. 4, comparing the current DVP vs. goal DVP can lead to an understanding of how much value can be created; this data may be summarized as the Value Creation Opportunity. In one embodiment, this element comprises a quantified economic roadmap for an organization to create differential value for its customers. The investment details (i.e., Value Creation Opportunities) create incremental differential value for a customer with a relative impact within a portfolio of investments or strategies (i.e., Value Creation Opportunity Scores), and lead to the determination a quantified economic impact the portfolio of investments or strategies would have on a customer's bottom line (i.e., Differential Value Creation Opportunity Percentage). The Differential Value Creation Opportunity Percentage is calculated as the total economic impact, in operating margin dollars, an organization could have on its customer's bottom line in the event the investments and strategies specified were made, divided by the amount of money a customer spends with that organization to buy, use or interact with its products or services. In the example shown in FIG. 4, the DVP opportunity is 1% of incremental value that can be created. If the customer purchased $1 million in goods or services, then the Value Creation Opportunity is $1 million multiplied by 1%, or approximately $10,000. This calculation assists in prioritizing potential investments.

Figure 5:
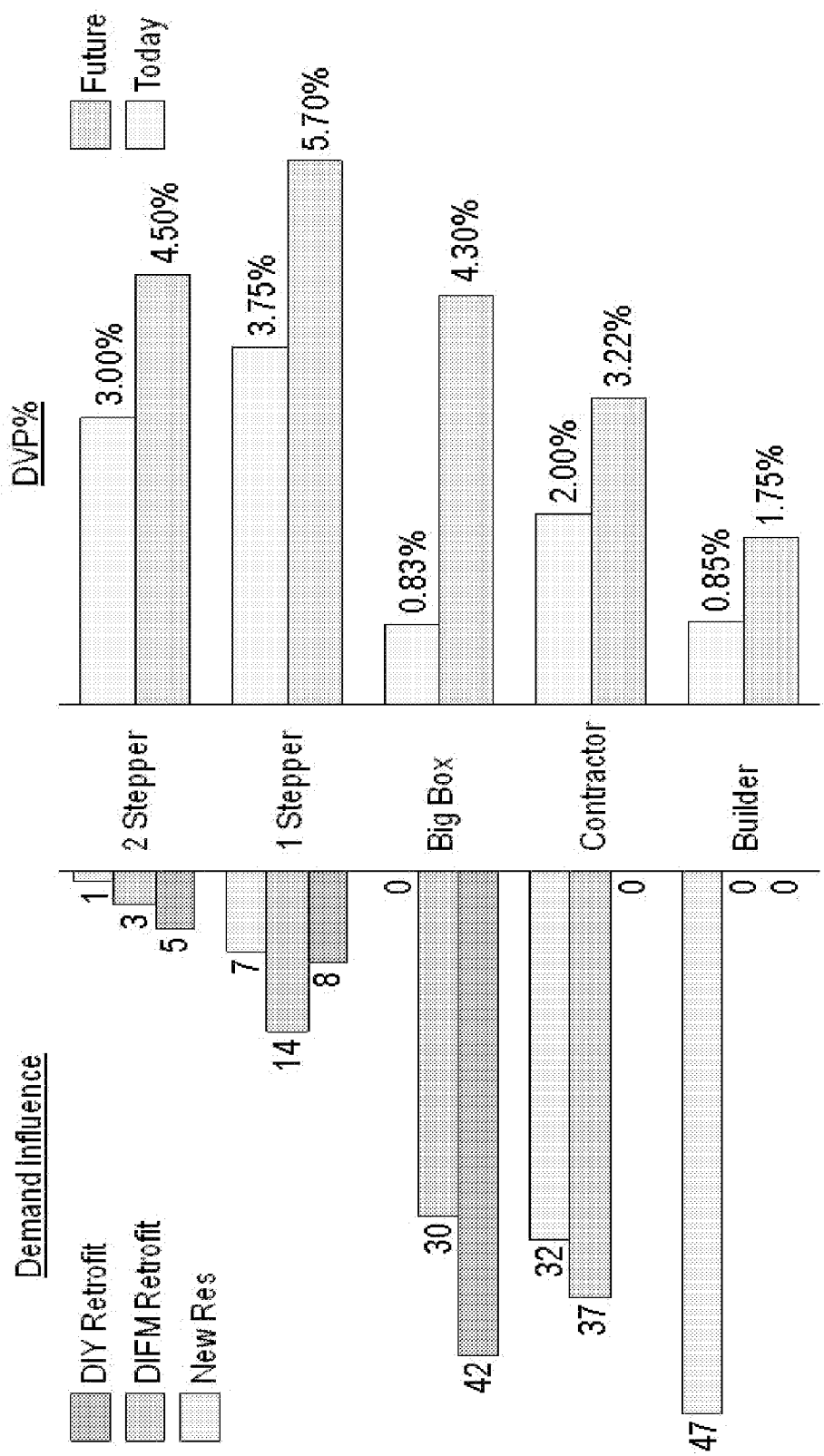
FIG. 5 is an exemplary diagram comparing Demand Influence with DVP %.

Channel Understanding: This element is the correlation between where differential value is being created today, where it can be created in a given market, organization, or channel, and where differential value needs to be created in order for competitive advantage to drive profitable growth. This understanding allows organizations to prioritize and align their potential investment portfolio with constituencies that offer the largest profit improvement opportunity for an organization. FIG. 5 shows an example of a comparison of Demand Influence and current DVP % to prioritize where to create value.

Probability of Success: The element comprises the link between creation of customer value and an organization's ability to capture their "fair share." Combining Demand Influence and a value creation roadmap exposes whether the constituencies the organization plans on creating value for have the power to control demand in an organization's favor.

Figure 6:
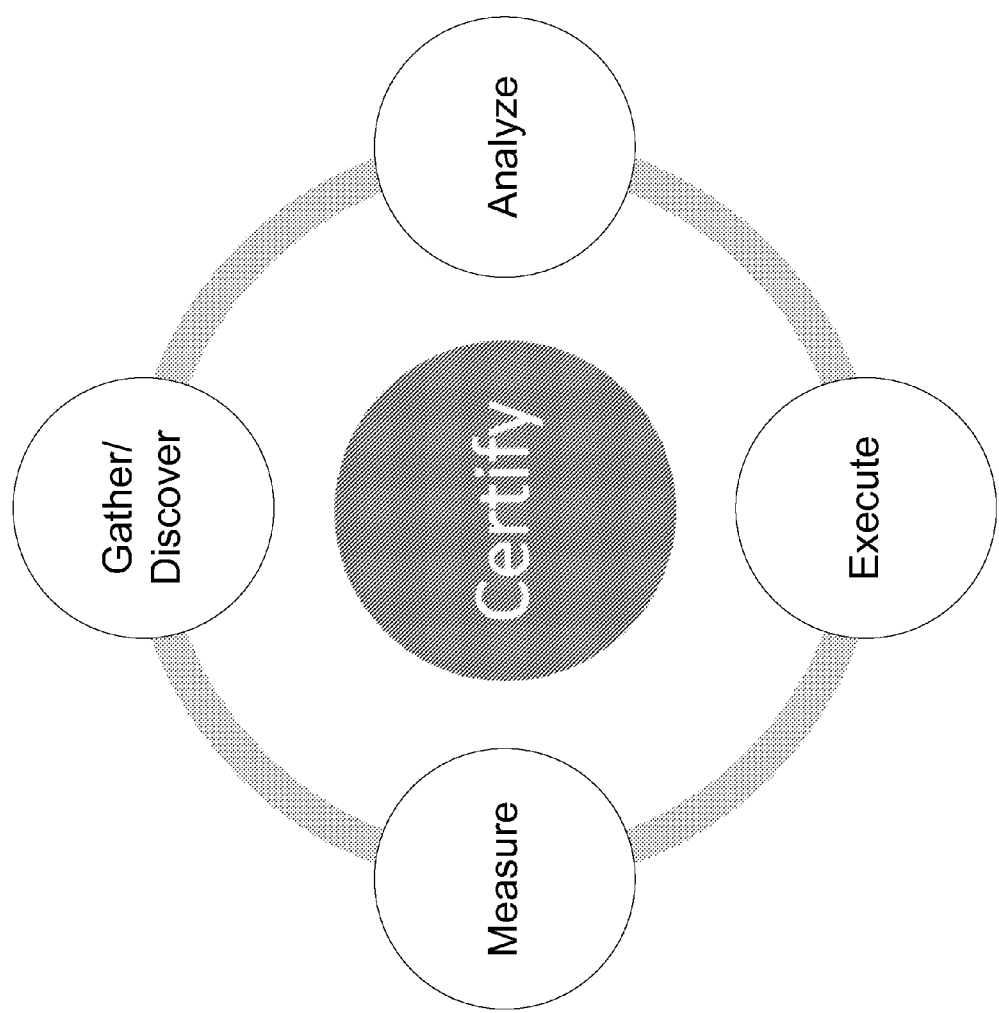
FIG. 6 shows the components or modules of the CVC Approach, in accordance with an exemplary embodiment of the present invention.

In another exemplary embodiment, the system comprises the CVC Approach, as seen in FIG. 6. The CVC Approach comprises the following modules or components: Gather/Discover 110, Analyze 120, Execute 130, Measure 140, and Certify 150. These modules, when combined, are the framework for managing customer value from an outside-in (i.e., customer-driven) perspective. By doing so, organizations create a competitive advantage by continuously optimizing return on investments made and eliminating the investments that are bound to fail. In the description of the CVC approach that follows, the CVC solution focuses on transforming the way client organizations create, deliver, and measure customer value, using a rigorous, quantitative approach.

In one embodiment, the CVC Approach comprises a computer program that implements the above modules in the appropriate order, collects and stores relevant data, and perform necessary calculations. The program may be run through an Internet web browser.

Figure 8:
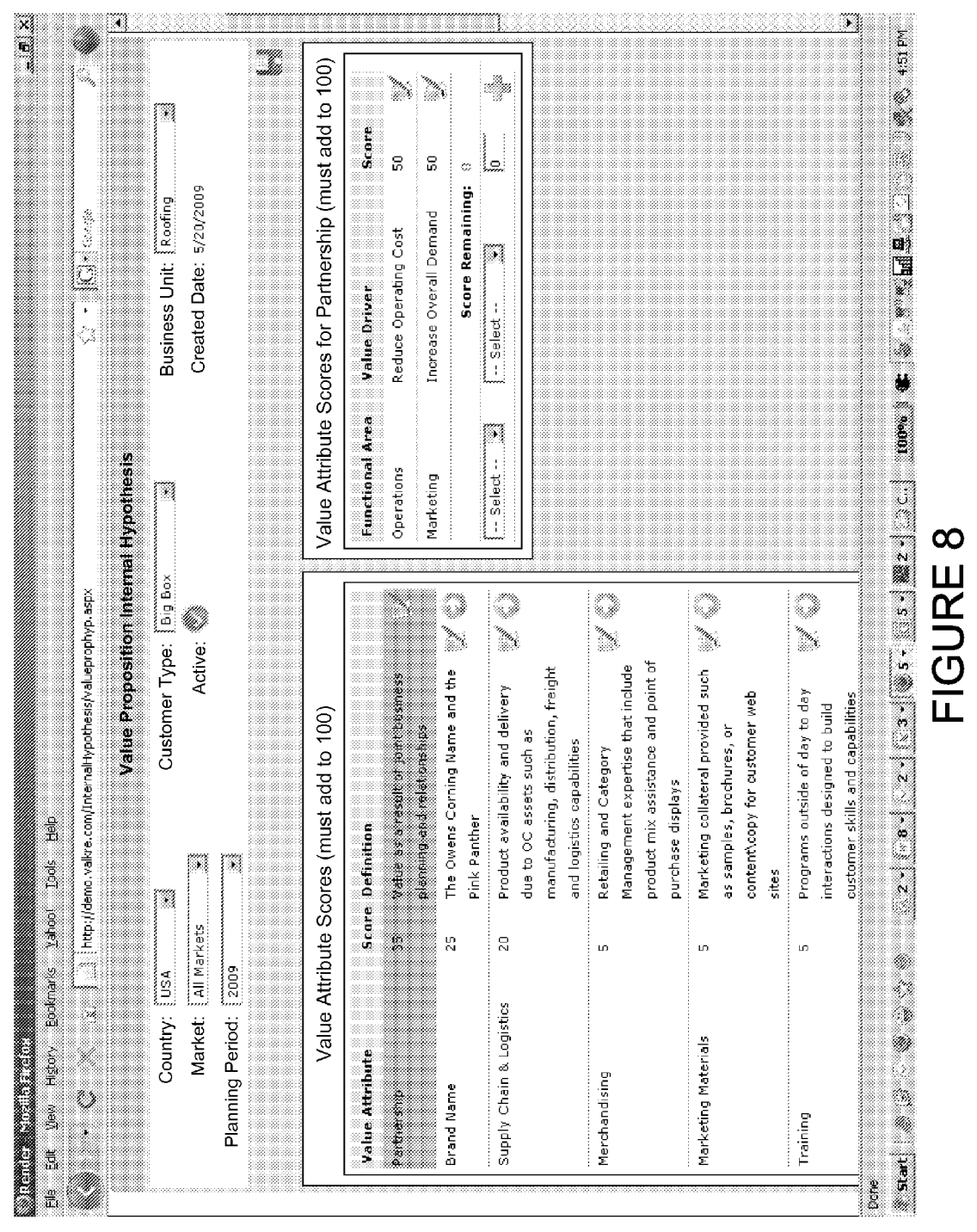

Gather/Discover: The Gather module collections and stores CVC Data. In one exemplary embodiment, as seen in FIGS. 7 and 8, the Gather module comprises an initial "Internal Hypothesis" step. This is the development of a quantified internal hypothesis for the Demand Influence and Differential Value Proposition data types to create a baseline internal understanding of customer value creation, and to generate the materials necessary to gain the customer's perspective. Internal Hypothesis data are stored in a database for both Channel Influence and the Differential Value Proposition.

Figure 9:
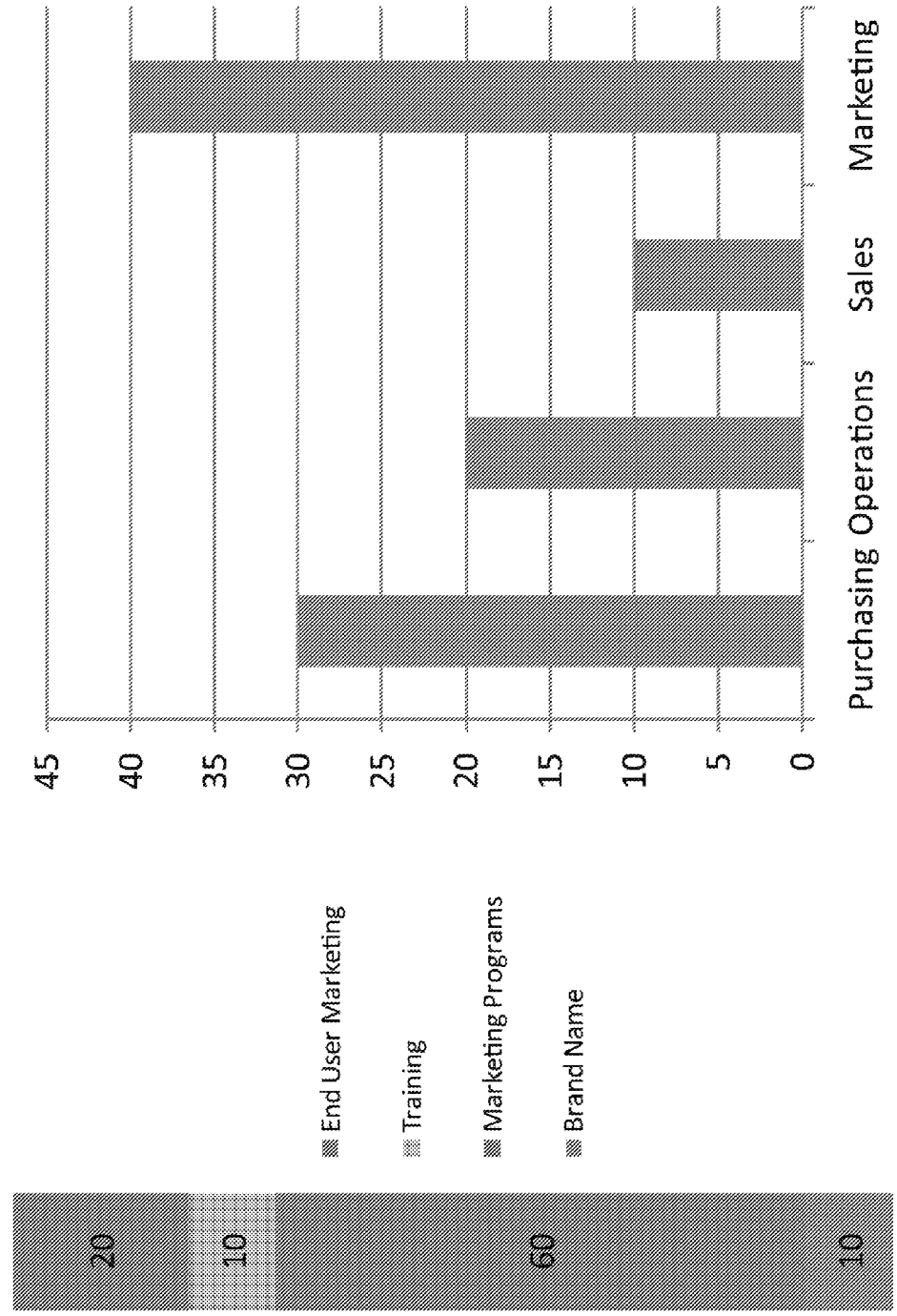
FIG. 9 shows another exemplary Internal Hypothesis screen for the Gather module.

In one embodiment, an Internal Hypothesis is created in a minimum of three steps: (1) creating a Demand Influence Hypothesis; (2) creating a qualitative Differential Value Proposition model; and (3) quantifying a Differential Value Proportion Model. As seen in FIG. 8, the DVP Internal Hypothesis comprises value attributes, relative scores (which must add to 100), definitions, and value driver scores. For a particular value attribute, value drivers in particular functional areas are assigned scores, which must add to 100. The module assists the user in assigning appropriate scores to the value attributes and value drivers. These scores may be presented graphically to the user to help visualization, as seen in FIG. 9.

Figure 10:
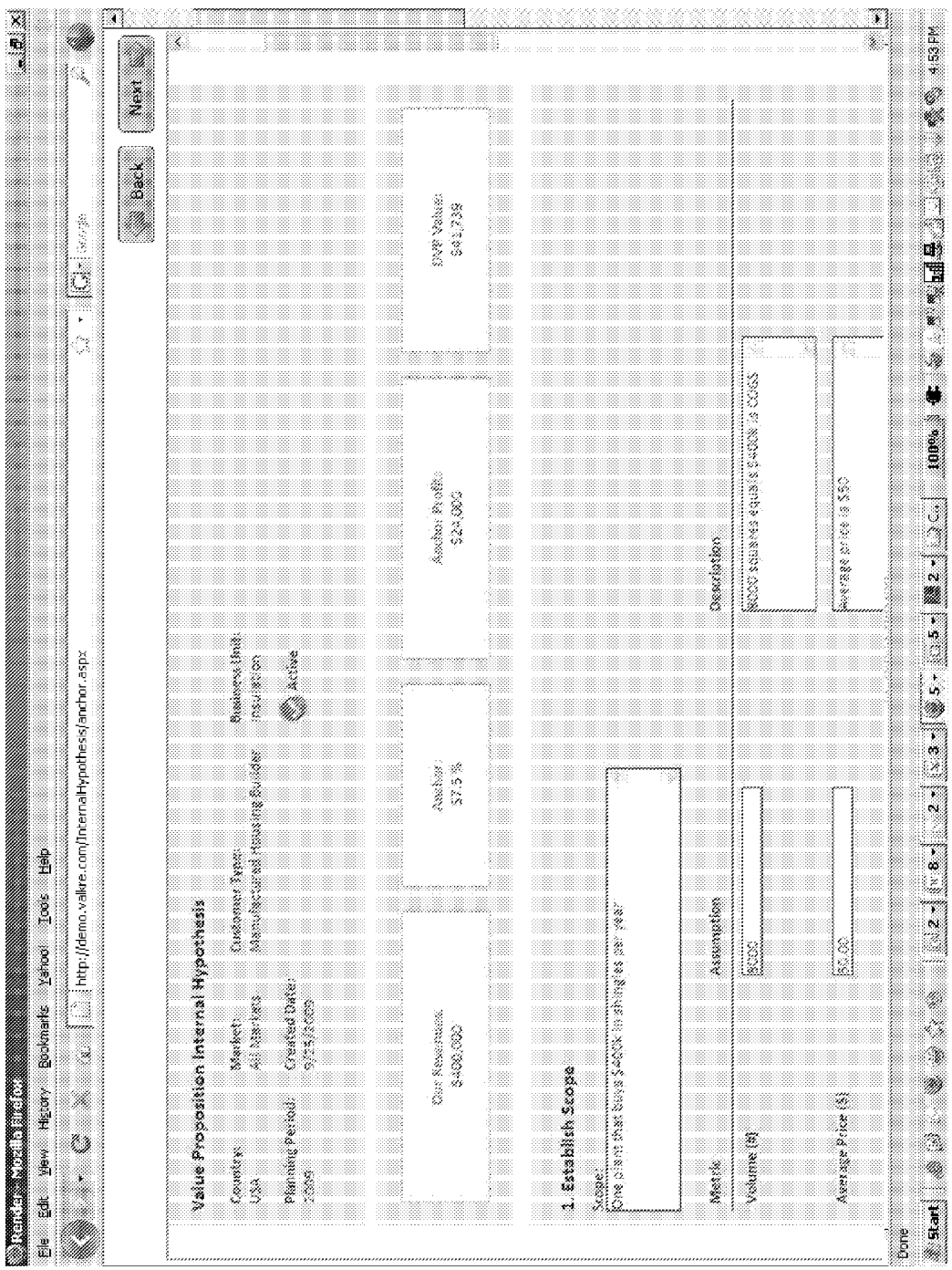
FIG. 10 shows an exemplary Internal Hypothesis screen for anchoring for the Gather module.
Figure 11:
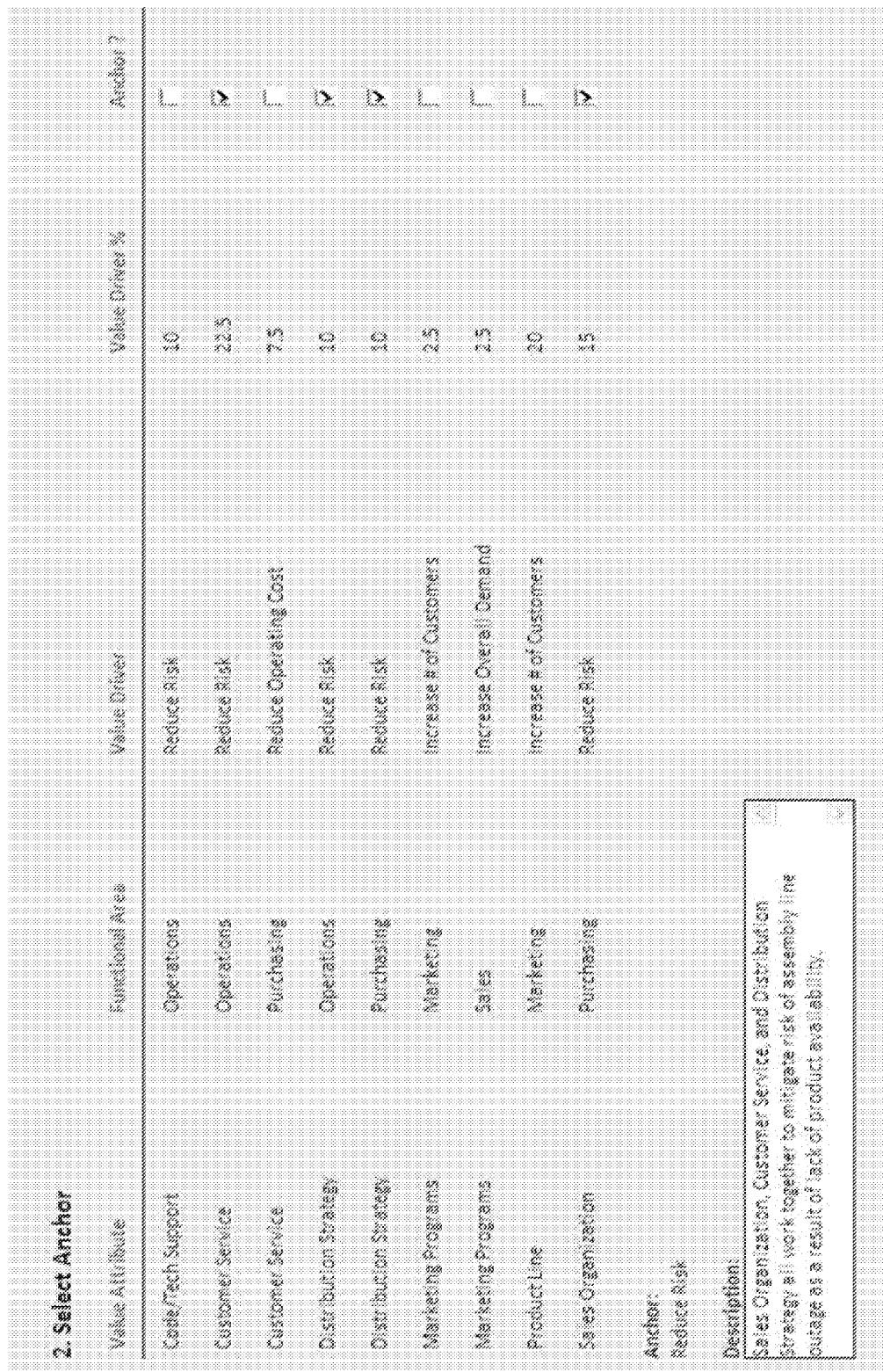
FIG. 11 shows another exemplary Internal Hypothesis screen for anchoring for the Gather module.
Figure 12:
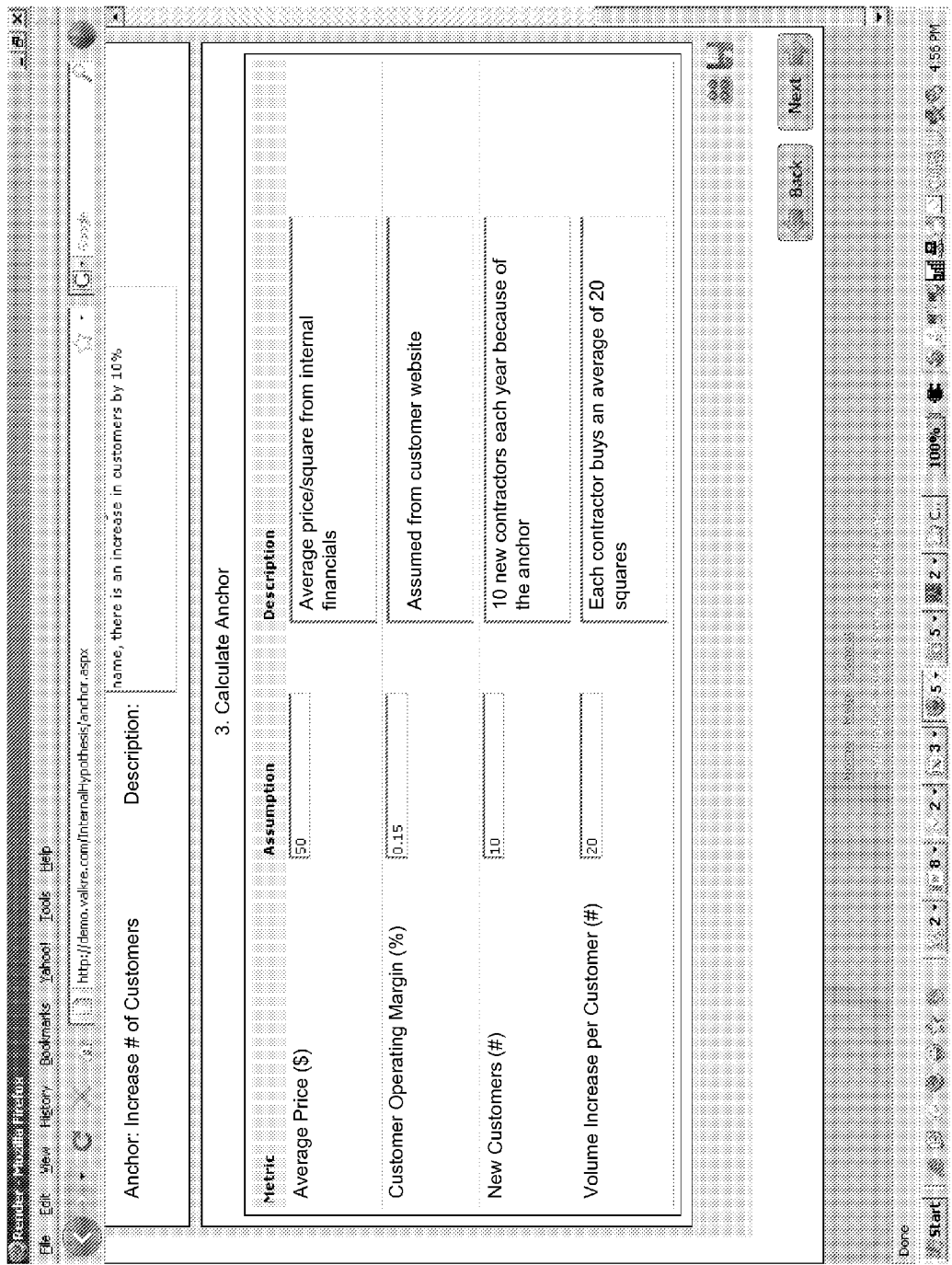
FIG. 12 shows another exemplary Internal Hypothesis screen for anchoring for the Gather module.
Figure 13:
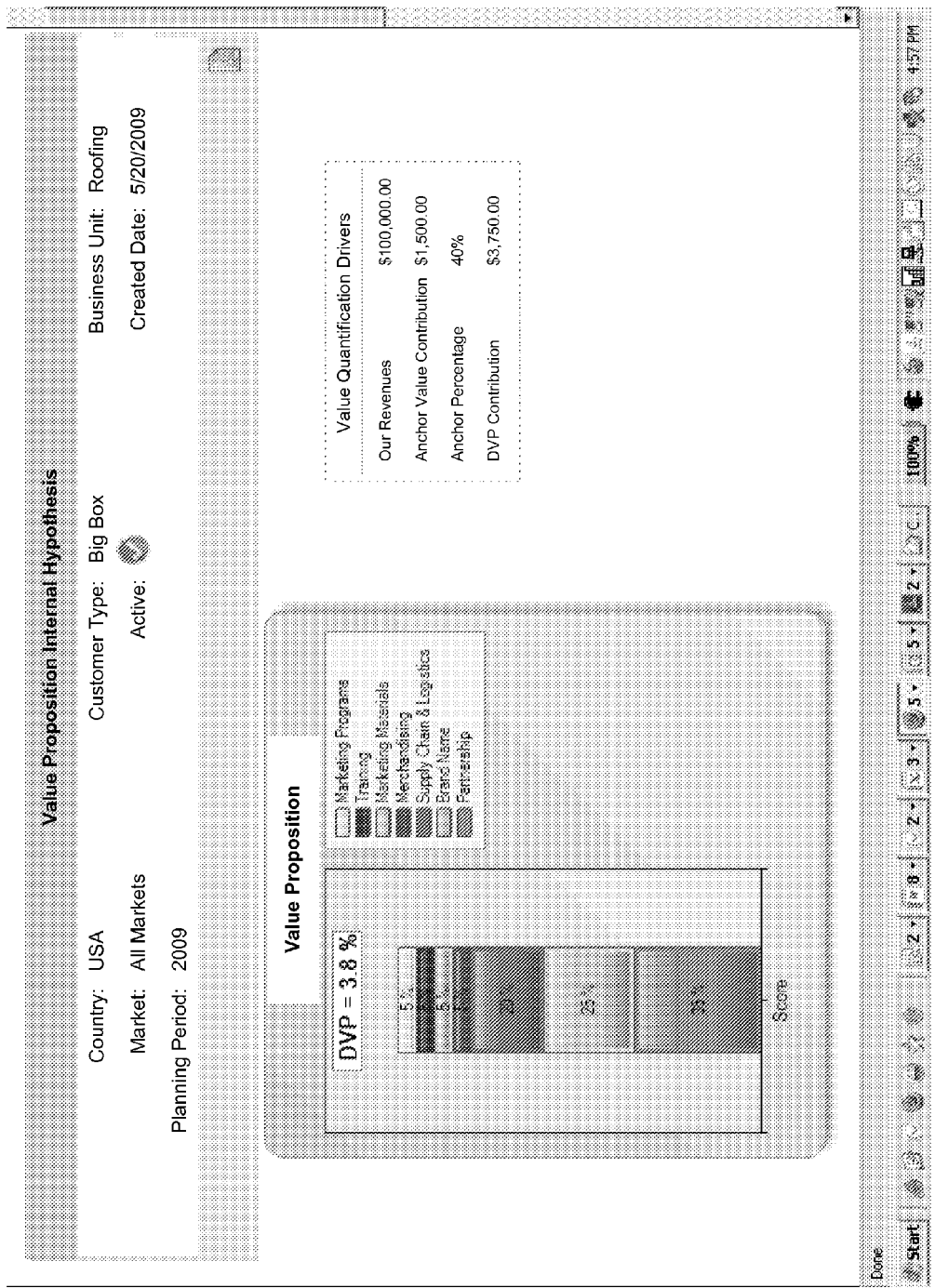
FIG. 13 shows another exemplary Internal Hypothesis screen for the Gather module.

The Internal Hypothesis may be quantified using "anchoring" methodology, as shown in FIG. 10. The first step of this methodology is establishing the scope by determining the size of the customer. The second step is selecting the "anchor"; i.e., the part of the DVP that will be quantified, as seen in FIG. 11. The third step is quantifying the value that the anchor has on the customer's bottom line, as seen in FIG. 12. This calculation may be based on several metric, which may be assumed. Once anchoring is complete, the DVP may be quantified and depicted visually as shown in FIG. 13.

Figure 14:
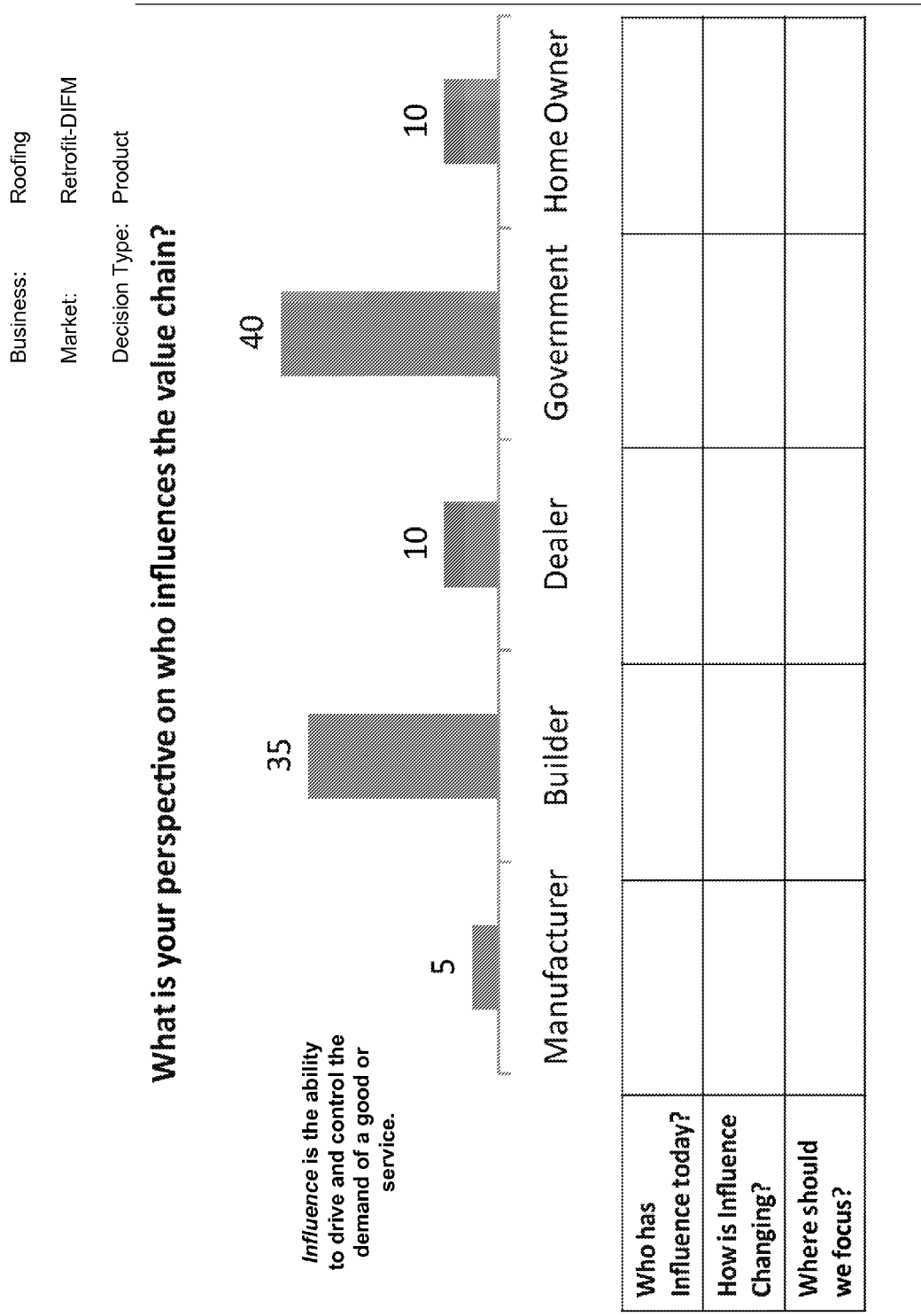
FIG. 14 shows a Channel Influence data collection template for the Gather module.
Figure 16:
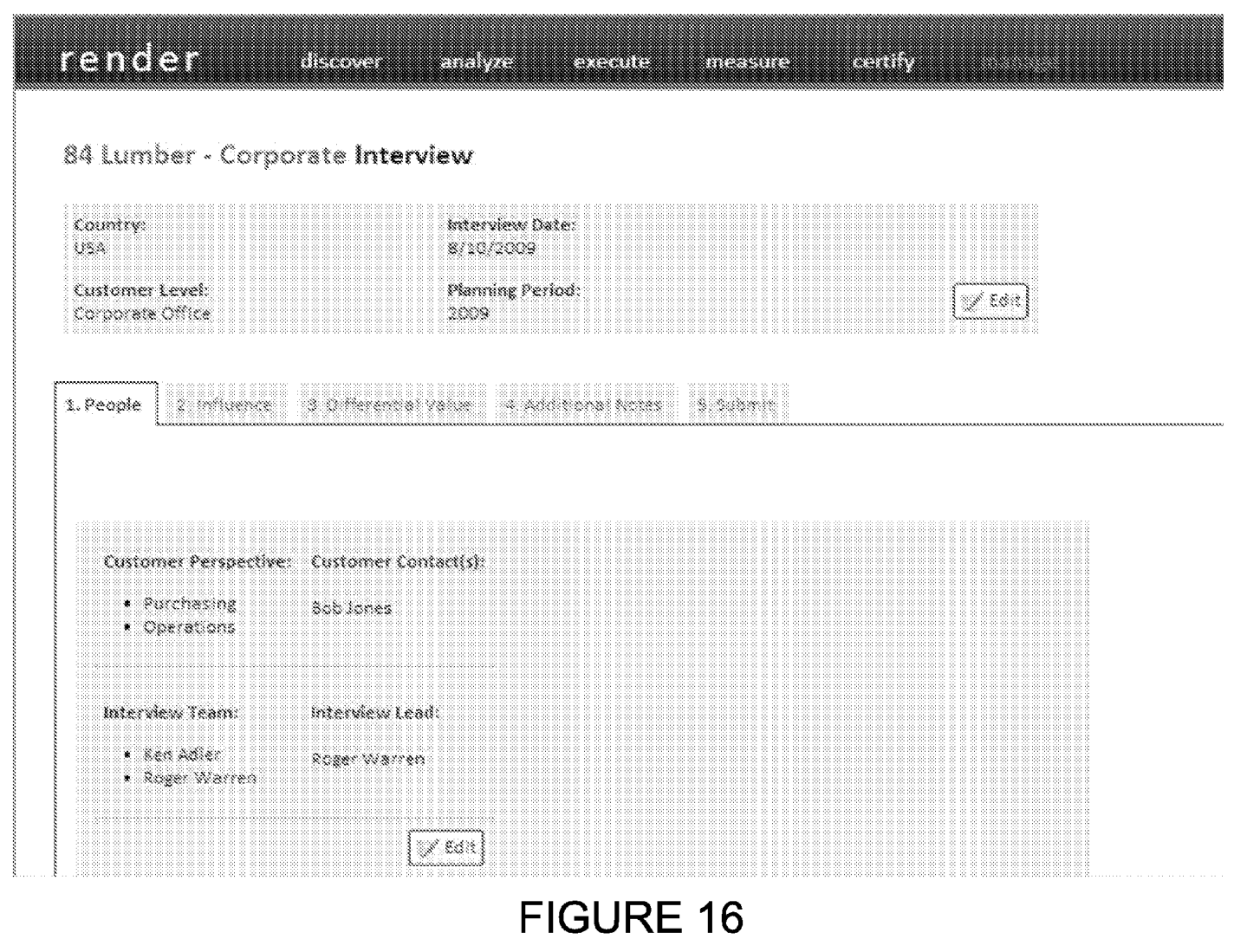
Figure 17:
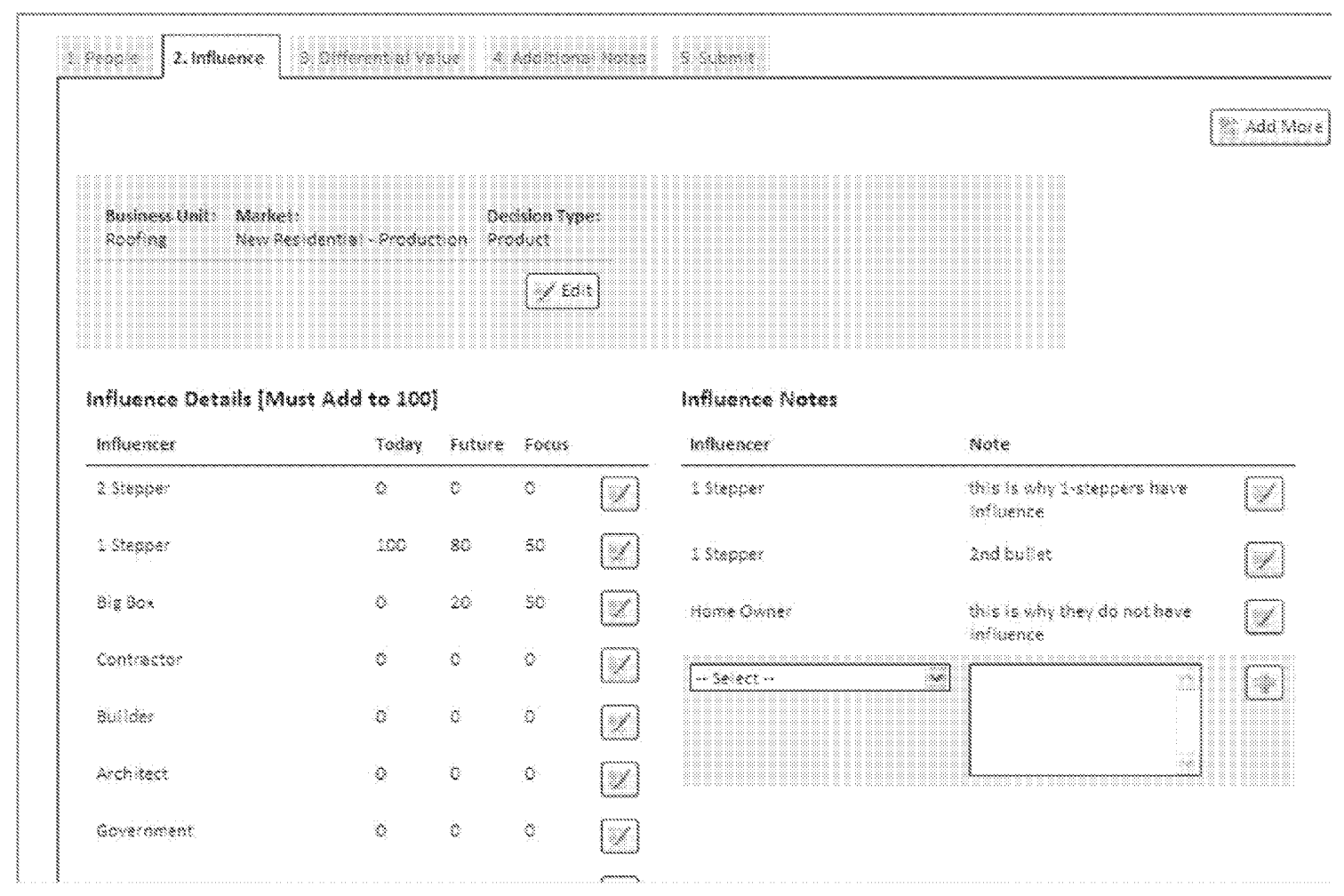
Figure 18:
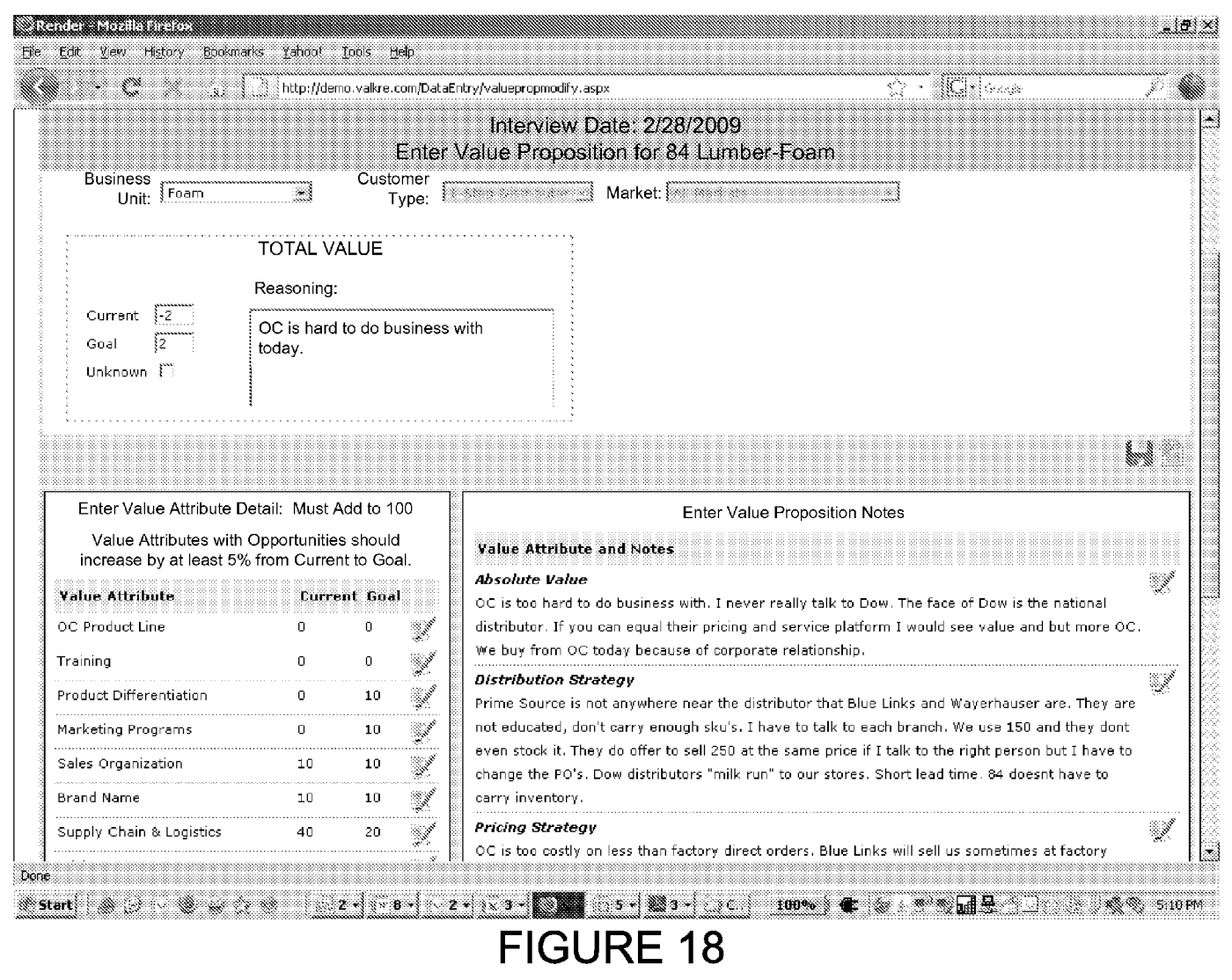
Figure 19:
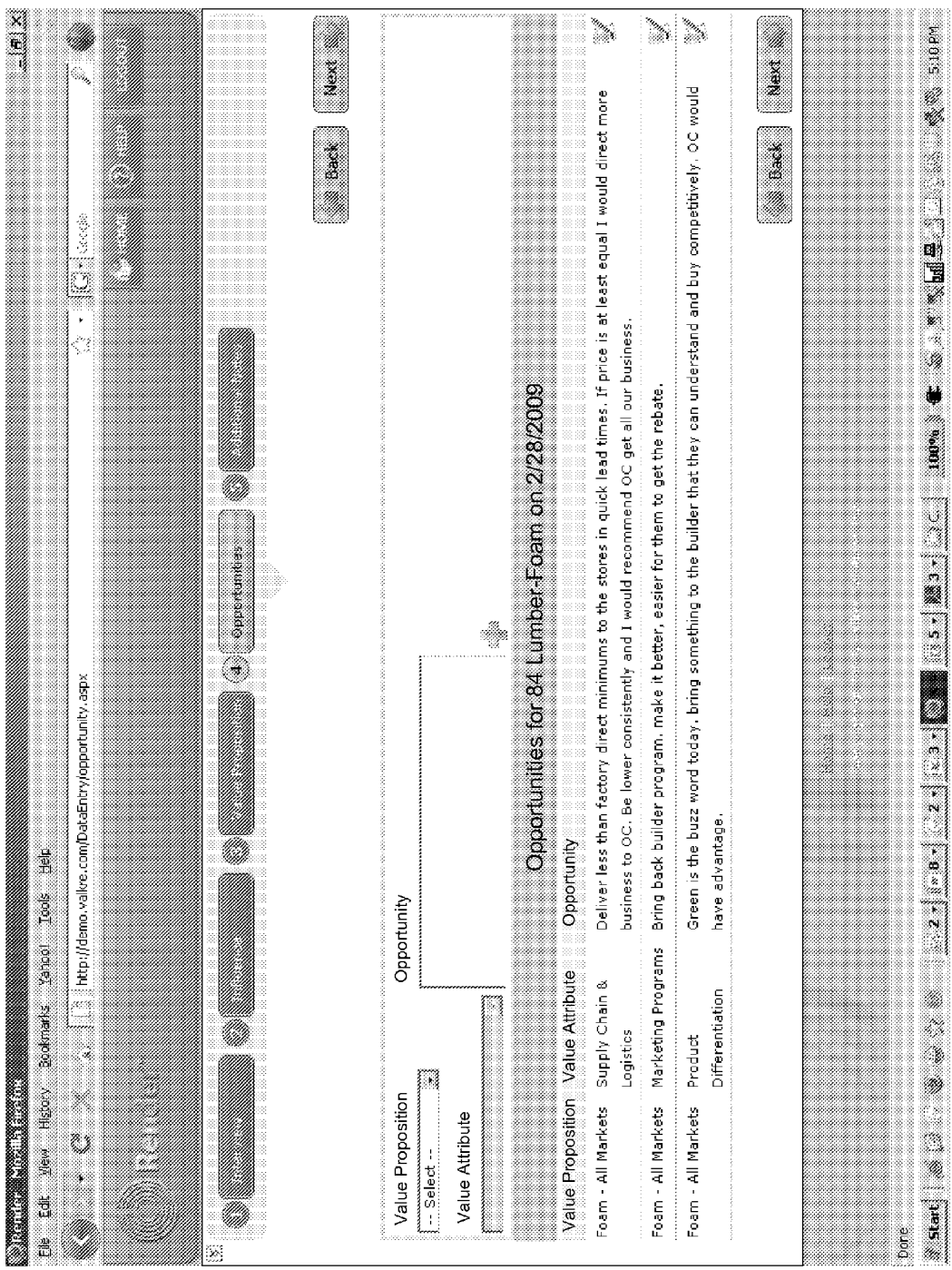
FIG. 19 shows an Opportunity Capture Screen for the Gather module.

Once the Internal Hypothesis has been created, the system automatically creates a Discover Interview Guide to assist the user in collecting data from a customer. FIG. 14 shows the Channel Influence data collection template from the Interview Guide, while FIG. 15 shows the DVP data collection template. These can be completed by the user offline or online, through direct interaction with the customer. The system also may create a Discover Quick Reference Guide for use as a reference guide while gathering the customer's perspective and data. Once the customer interview is complete and data is collected, it may be entered into and stored in a system database. Entry may be accomplished by means of the Interview Capture Screen shown in FIG. 16, the Influence Capture Screen shown in FIG. 17, the DVP Capture Screen shown in FIG. 18, and the Opportunity Capture Screen shown in FIG. 19. The information may be stored in a standardized format such that it can be compiled and combined with other customer perspectives.

Figure 20:
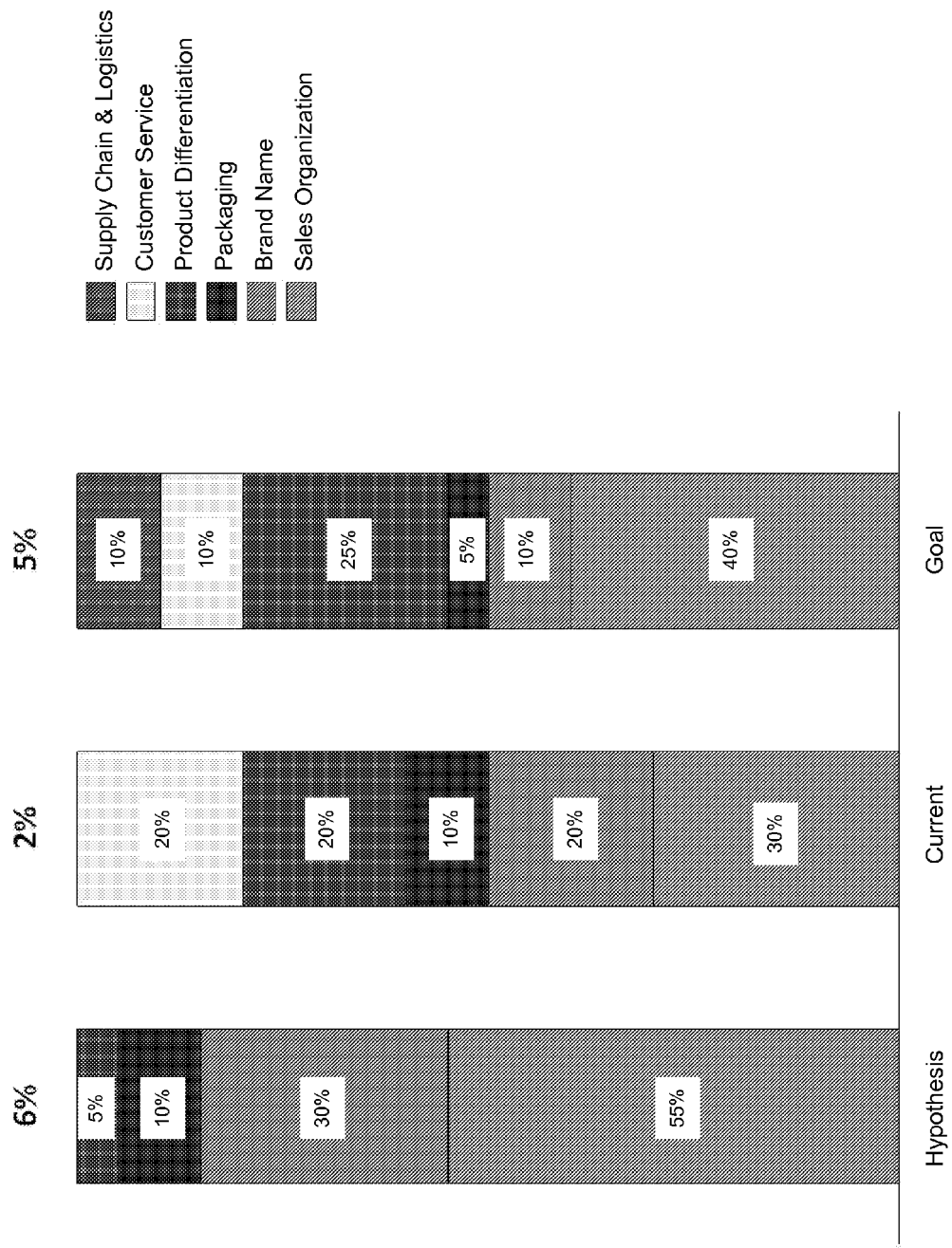
FIG. 20 shows an exemplary graphical comparison of dataset perspectives for the Analyze module.

Analyze: The Analysis module processes the CVC data, and analyzes the Differential Value dataset across several components, including, but not limited to, customers, customer types, geographies, and businesses. As seen in FIG. 20, this may involve the comparison of the Internal Hypothesis (i.e., the organization's internal perspective) with the current perspective based on the customer's analyzable data set and the future perspective (or goal) based on the customer's analyzable data set. In one embodiment, the module comprises four components.

Figure 21:
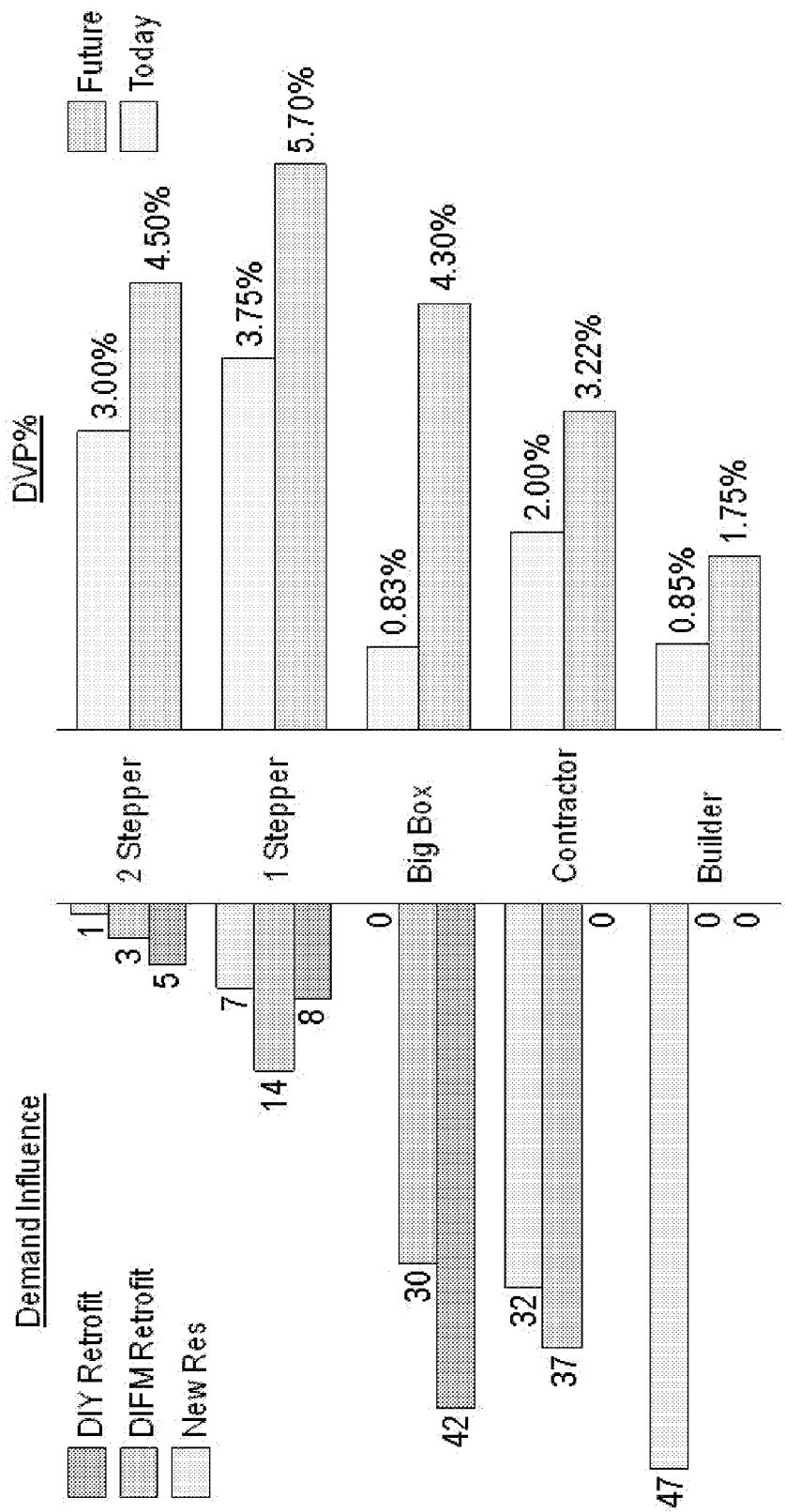
FIG. 21 is an exemplary diagram comparing Demand Influence with DVP %.

First, Value Creation Analysis analyzes Current Differential Value Proposition Data and Demand Influence to understand how much value is being created for customers and which investments should be a priority to create differential value such that competitive advantage is advanced or maintained. A graphical example of this analysis is shown in FIG. 21. Based on the combination of DVP and Demand Influence, organizations can invest in different ways. A table showing various scenarios based on these combinations is shown in FIG. 22.

Figure 24A:
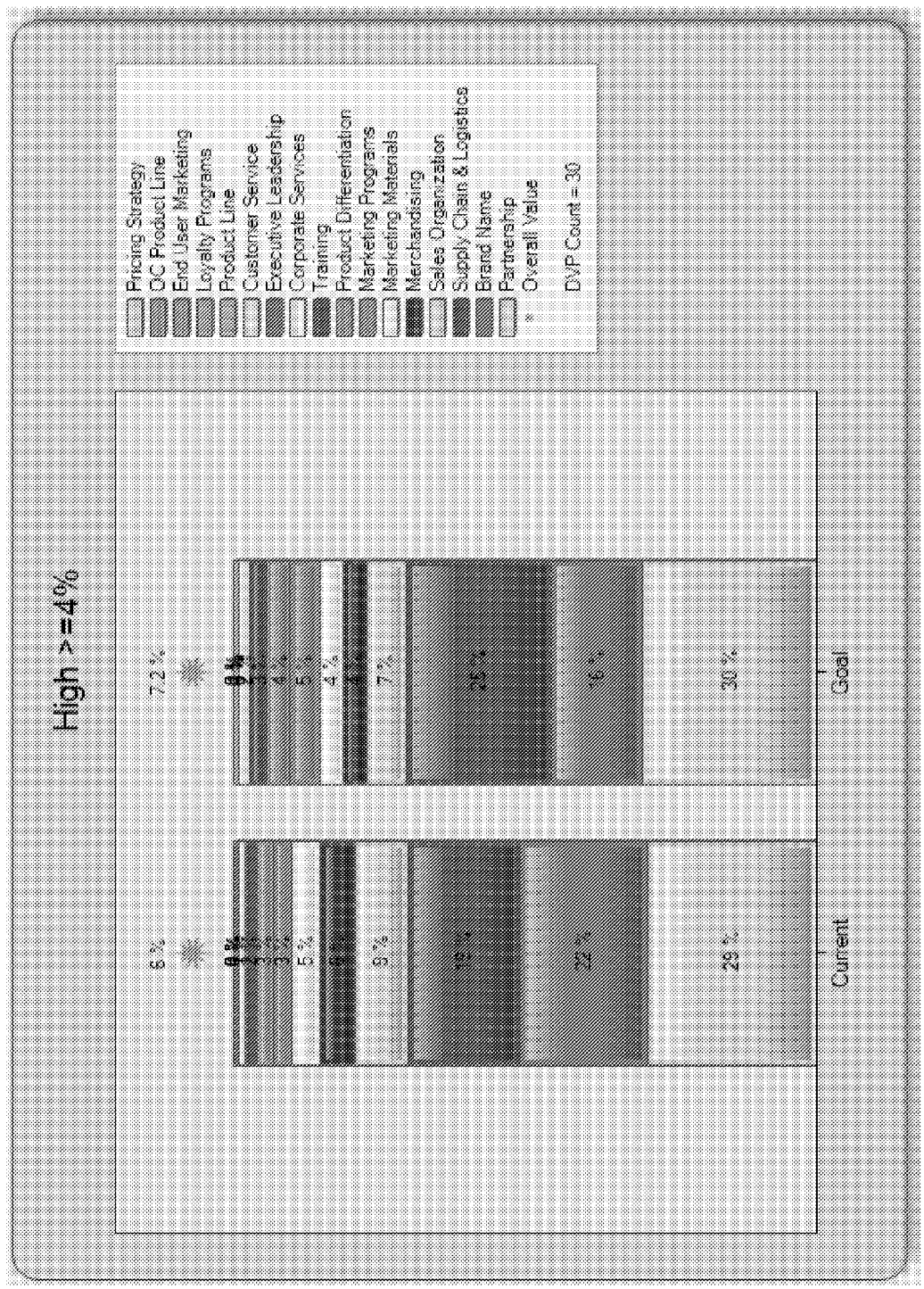
FIG. 24 shows an exemplary Value Segmentation Analysis comparison for the Analyze module.
Figure 24B:
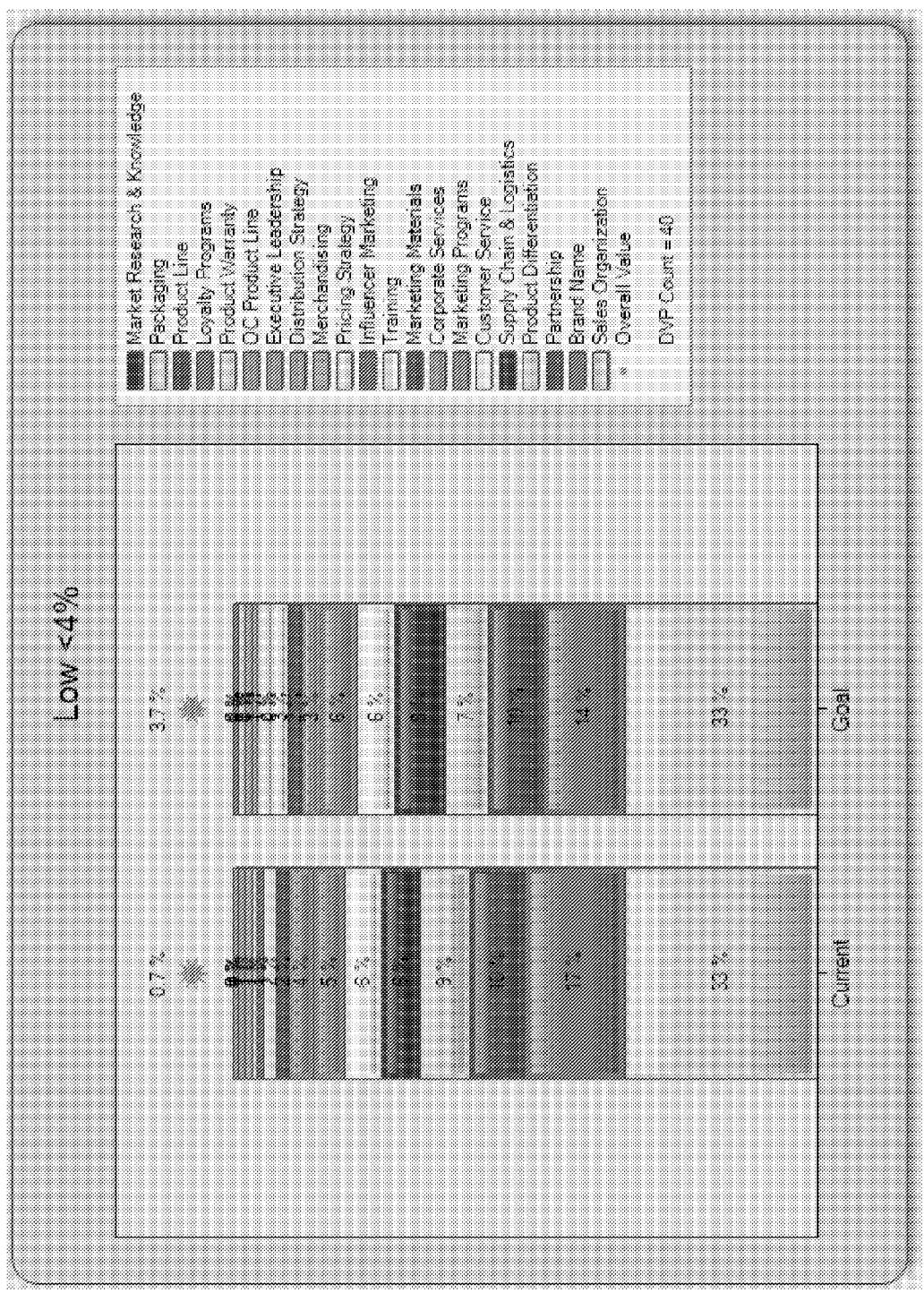
Figure 25A:
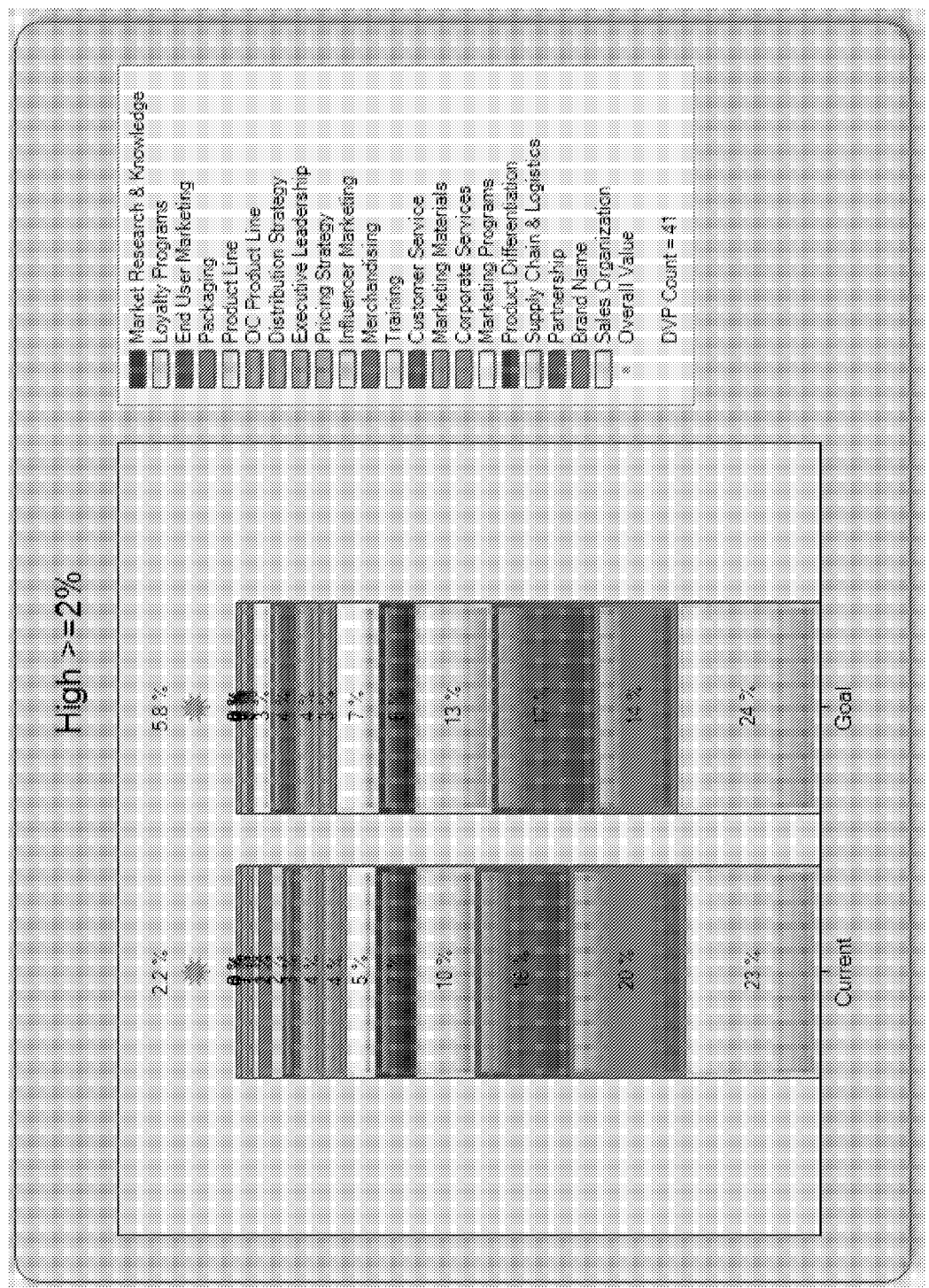
FIG. 25 shows another exemplary Value Segmentation Analysis comparison for the Analyze module.
Figure 25B:
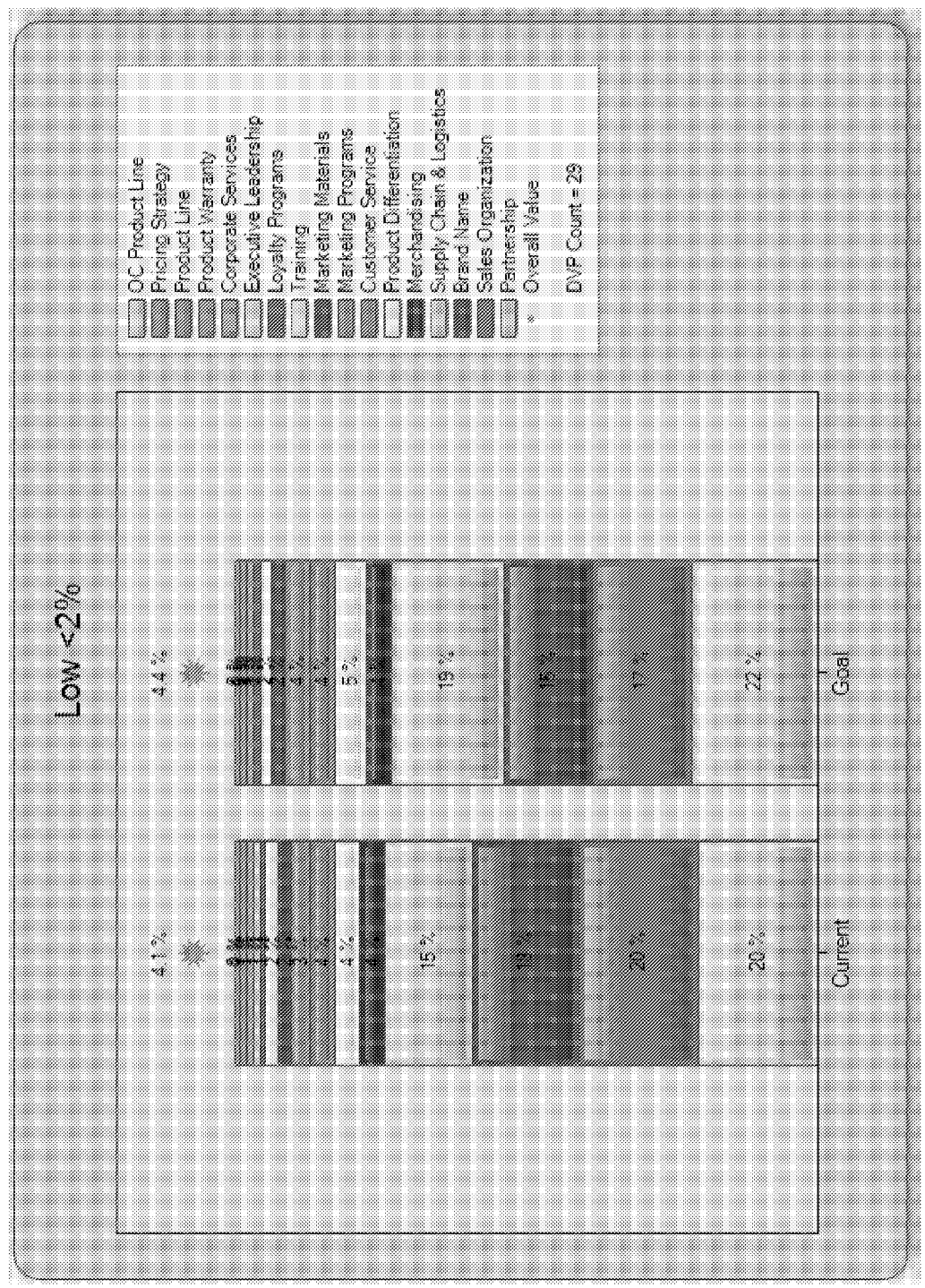
Figure 26:
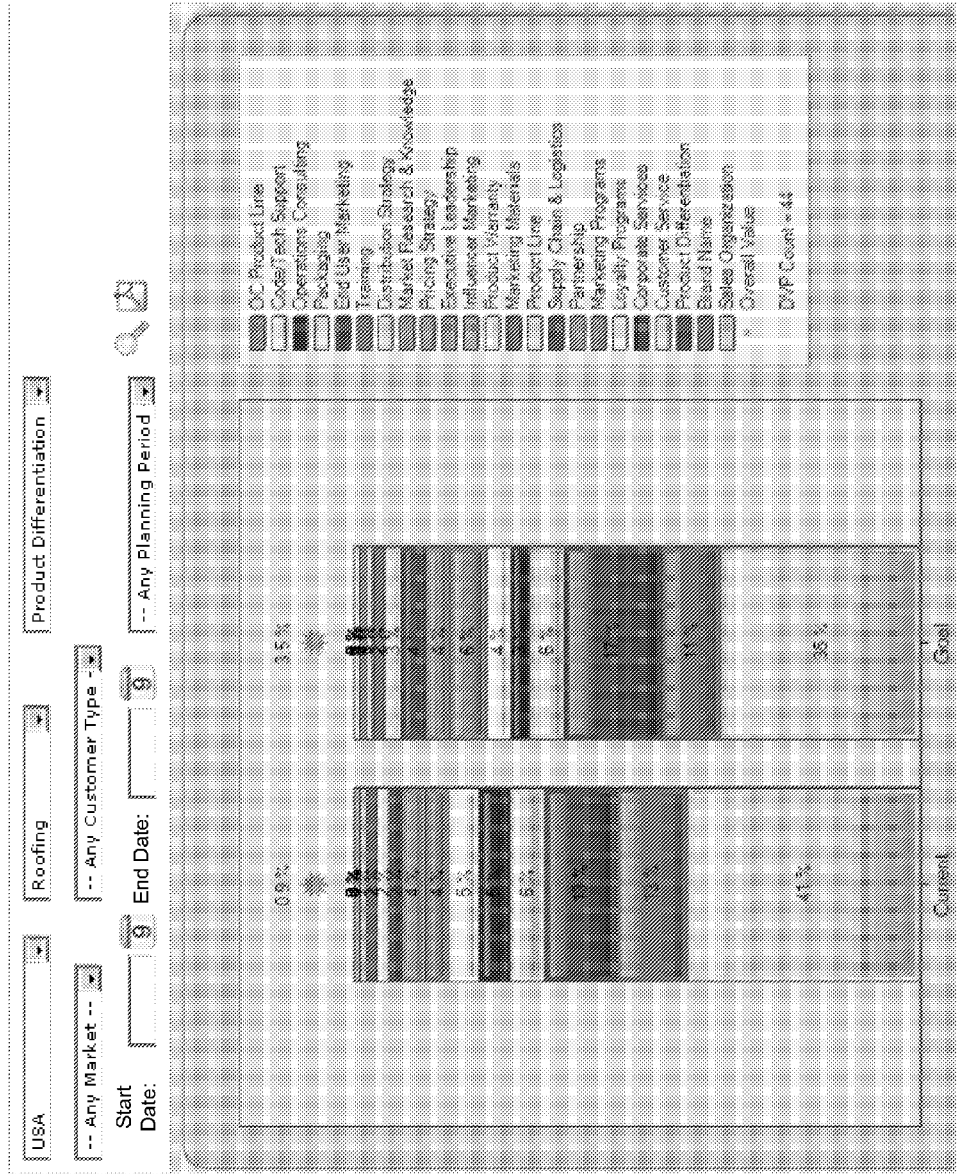
FIG. 26 shows a Value Attribute Segmentation Report for the Analyze module.

Second, Value Segmentation Analysis allows the segmentation, classification, and/or grouping of customers across businesses, markets, geographies, and the like, according to or based on their economic needs. Organizations can then invest in a selective and efficient fashion to maximize returns and eliminate waste. A setup screen for value segmentation criteria is shown in FIG. 23. The economic needs of customers can be shown graphically, as seen in FIGS. 24 and 25. FIG. 24 shows the exemplary needs of a customer with a strong DVP in comparison to a customer who does not see a strong DVP, while FIG. 25 shows the same for DVP growth opportunity. FIG. 26 show a value attribute segmentation report screen, showing an example of a customer who sees the same investments as an opportunity to create incremental differential value.

Figure 27:
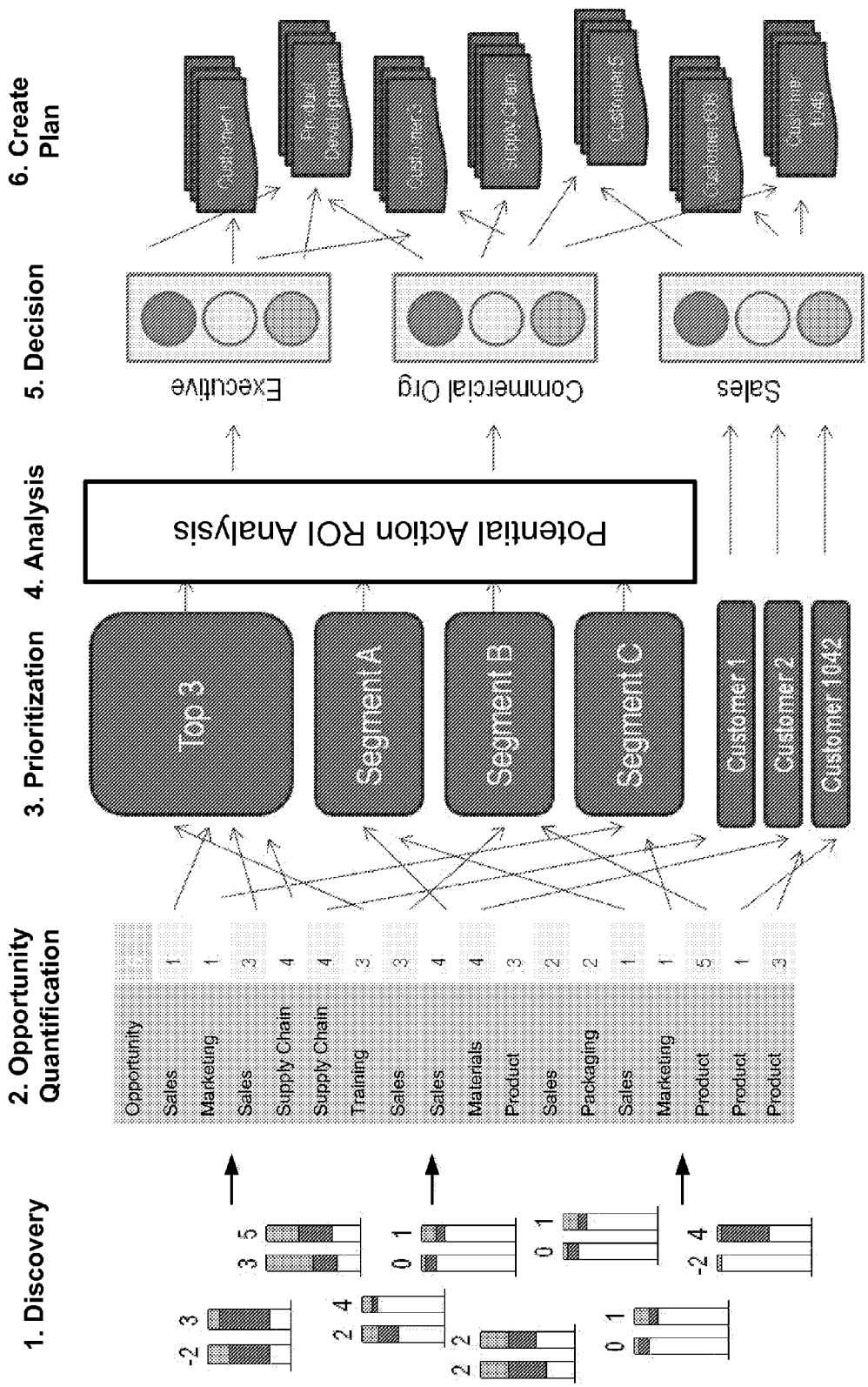
FIG. 27 shows an Opportunity Analysis chart for the Analyze module.
Figure 28:
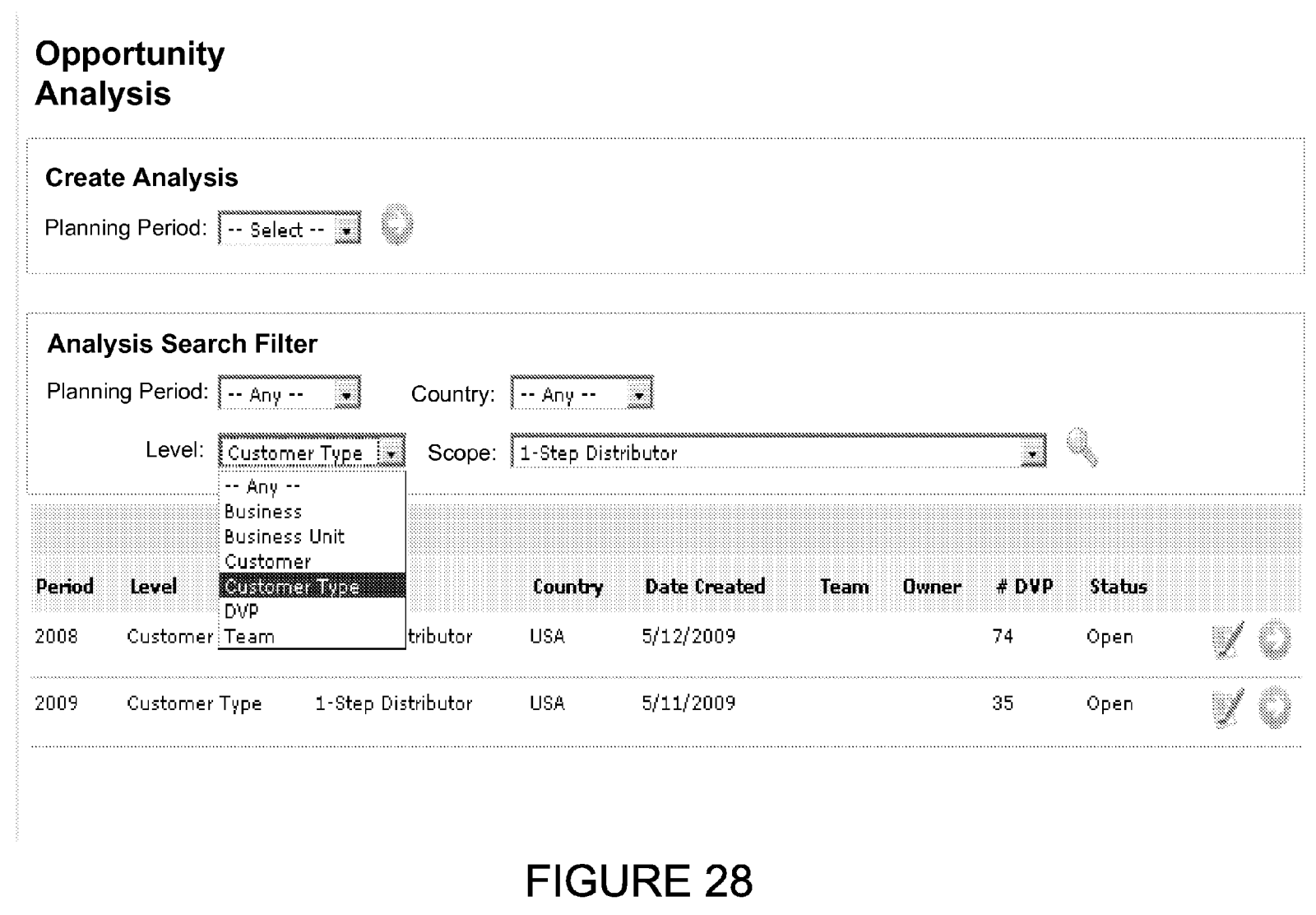
Figure 29:
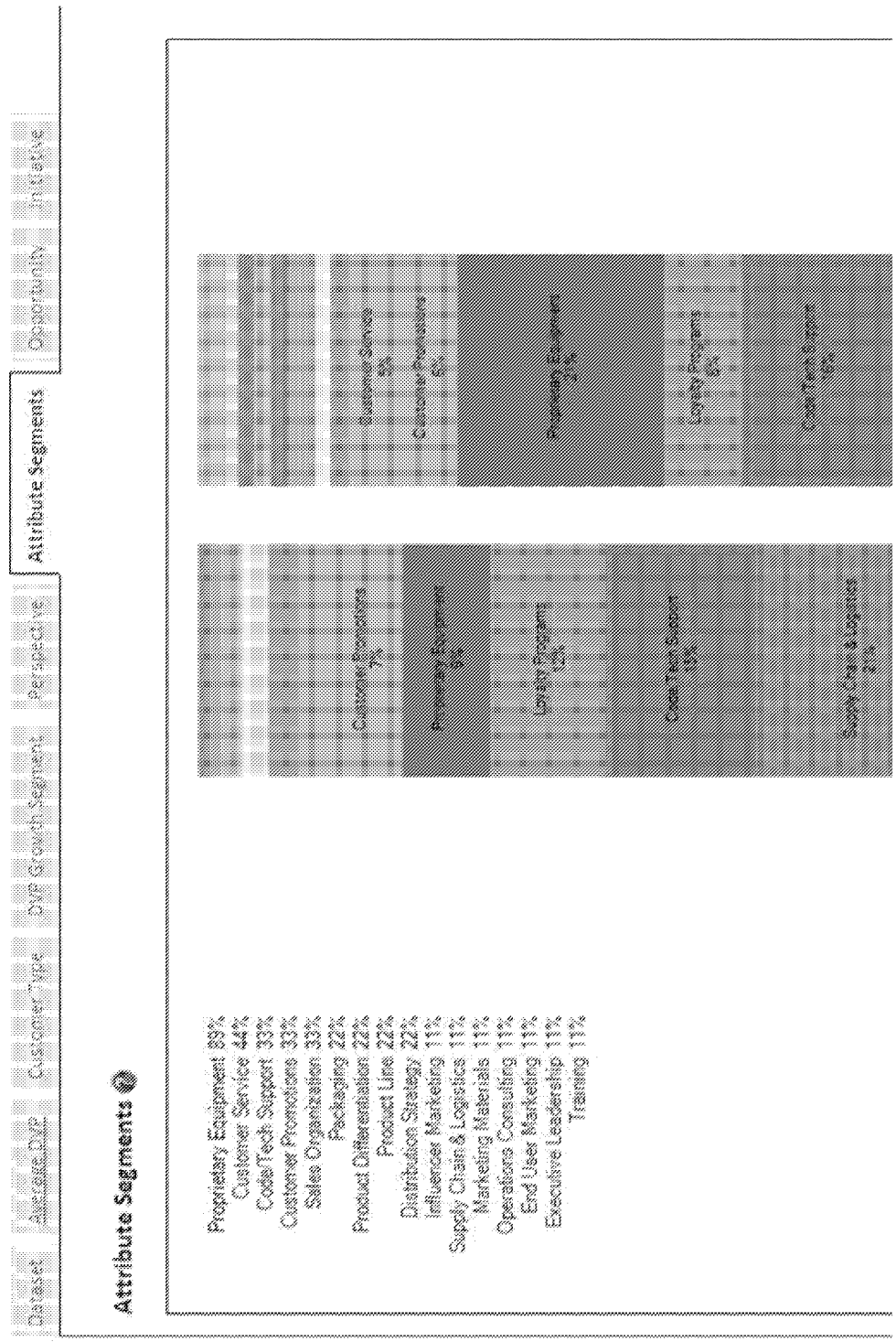
FIG. 29 shows another Opportunity Analysis screen for the Analyze module.

Third, Opportunity Analysis allows organizations to roll-up value creation opportunities across the entire analyzable data set, combine them, quantify them, build business cases, and make decisions (this process is shown graphically in FIG. 27). It allows the compilation of customer economic needs across businesses, business units, customer types, teams, DVPS, markets, geographies, and the like, and within large complex customer organizations, to identify and create a potential investment portfolio of value creation initiatives that is prioritized by the improvement opportunity to a customer's bottom line. FIG. 28 shows an opportunity analysis input screen with analysis search filters to identify an analysis dimension. Once an analysis dimension is identified, the opportunity dataset can be analyzed across many viewpoints, including segments, perspectives and levels with a customer organization, as shown in FIG. 29. The result of Opportunity Analysis is a quantified list of value creation initiatives, as seen in FIG. 30. This process takes hundreds of raw customer comments and data, and condenses them into initiatives that can be acted upon. Value creation quantification occurs by summing the value creation opportunity for each of the customers that informed the system of a given initiative.

Figure 31:
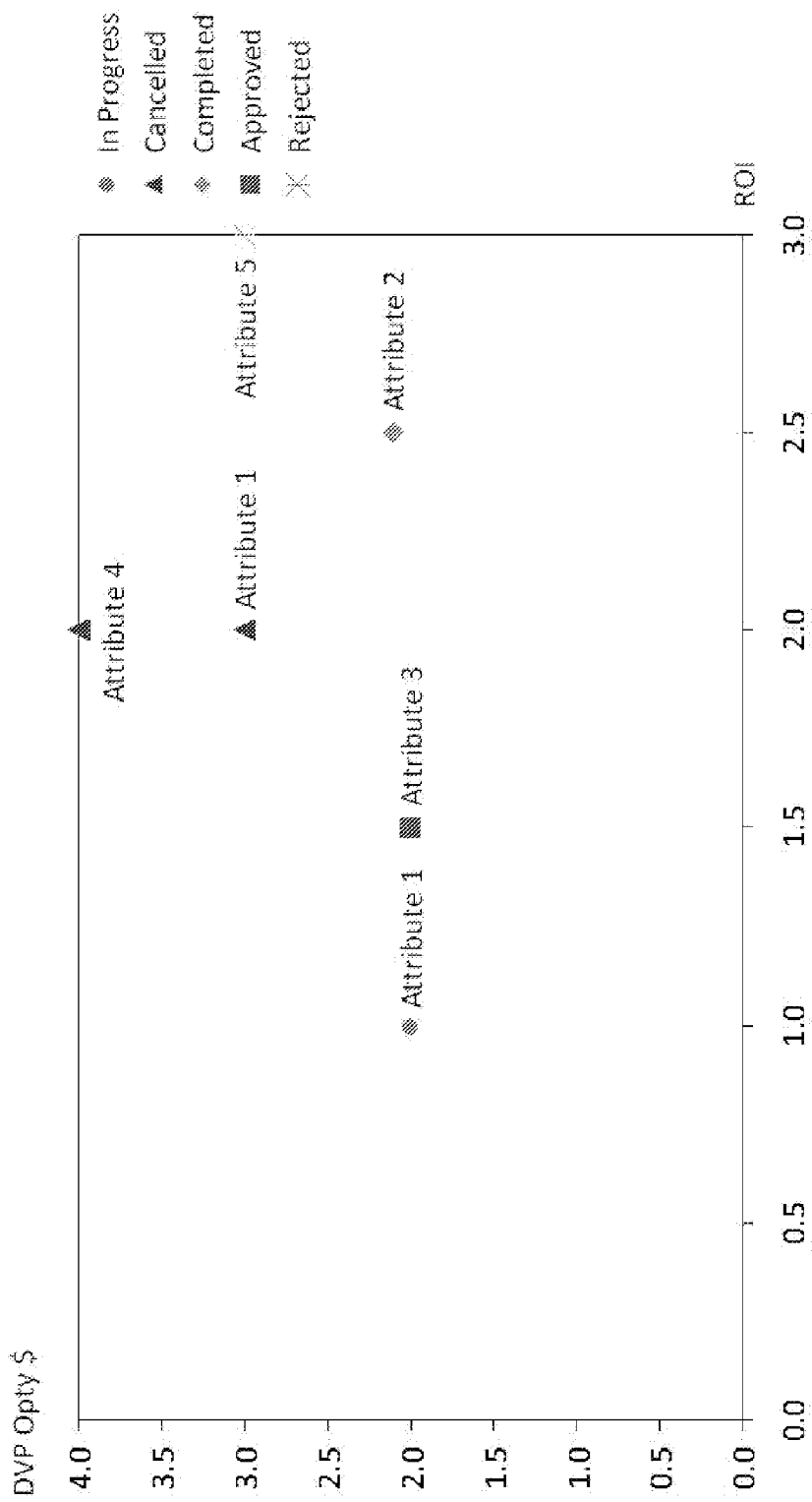
FIG. 31 shows an exemplary Value Capture Analysis graph for the Analyze module.

Third, Value Capture Analysis evaluates the potential investment portfolio, linking an organization's investment to its customer's profitability and, in turn, to the organization's own profitability, such that the evaluation of value creation and value capture can occur. In one embodiment, the analysis assembles each of the Value Creation Initiatives so business cases can be built to execute. At the core of each business case is the balance between Customer Value Creation (DVP Opportunity $) and the organization's return on investment (ROI). An example of a graphical depiction of this balance is shown in FIG. 31.

Figure 32:
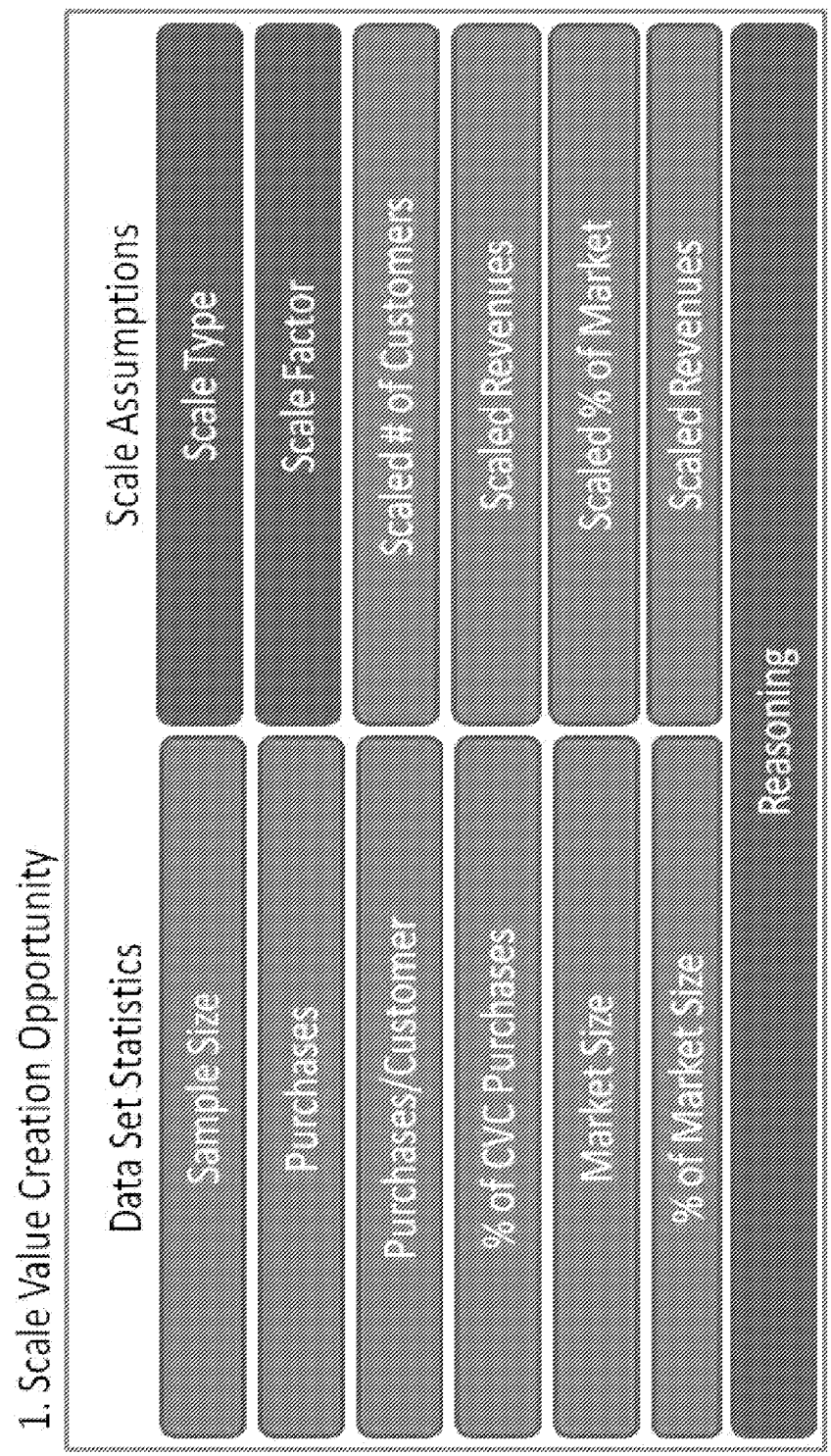
FIG. 32 shows a Value Capture Analysis chart for the Analyze module.
Figure 33:
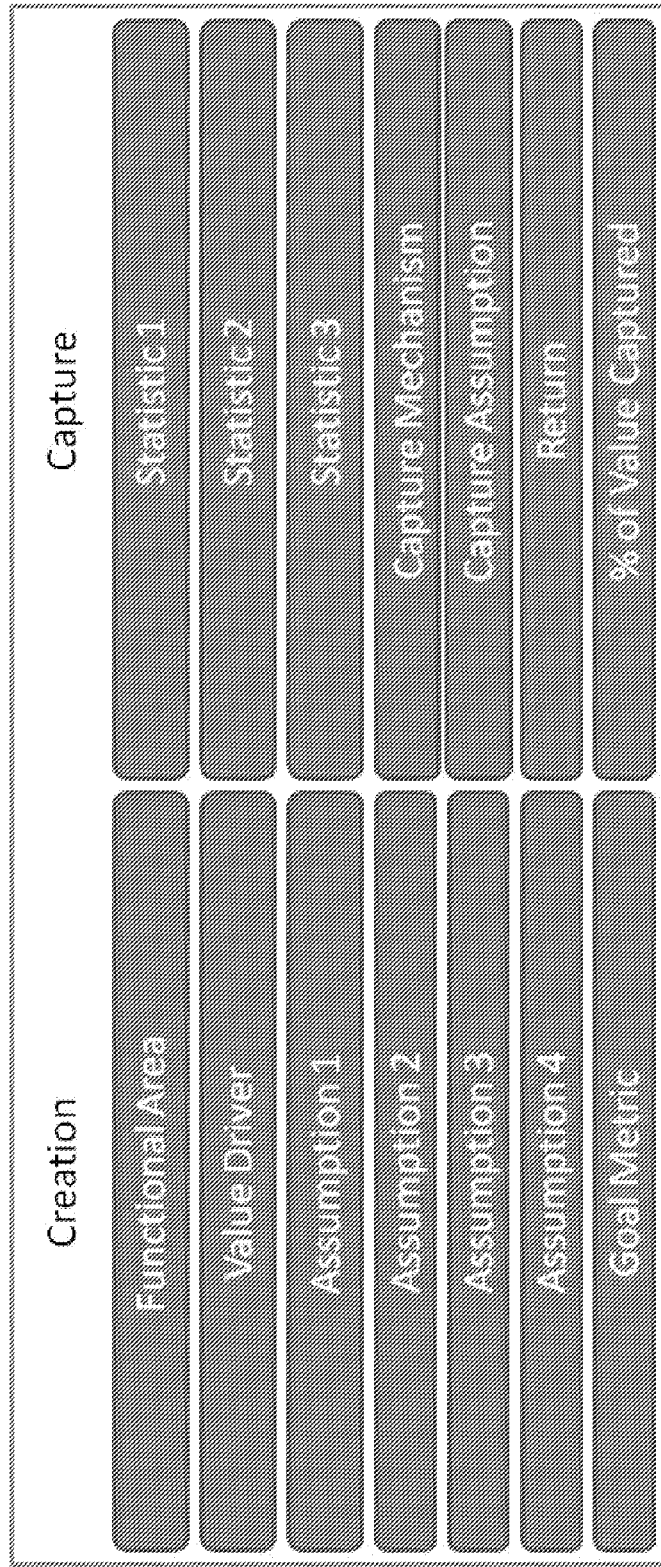
FIG. 33 shows a Value Capture Analysis exchange factor chart for the Analyze module.
Figure 34:
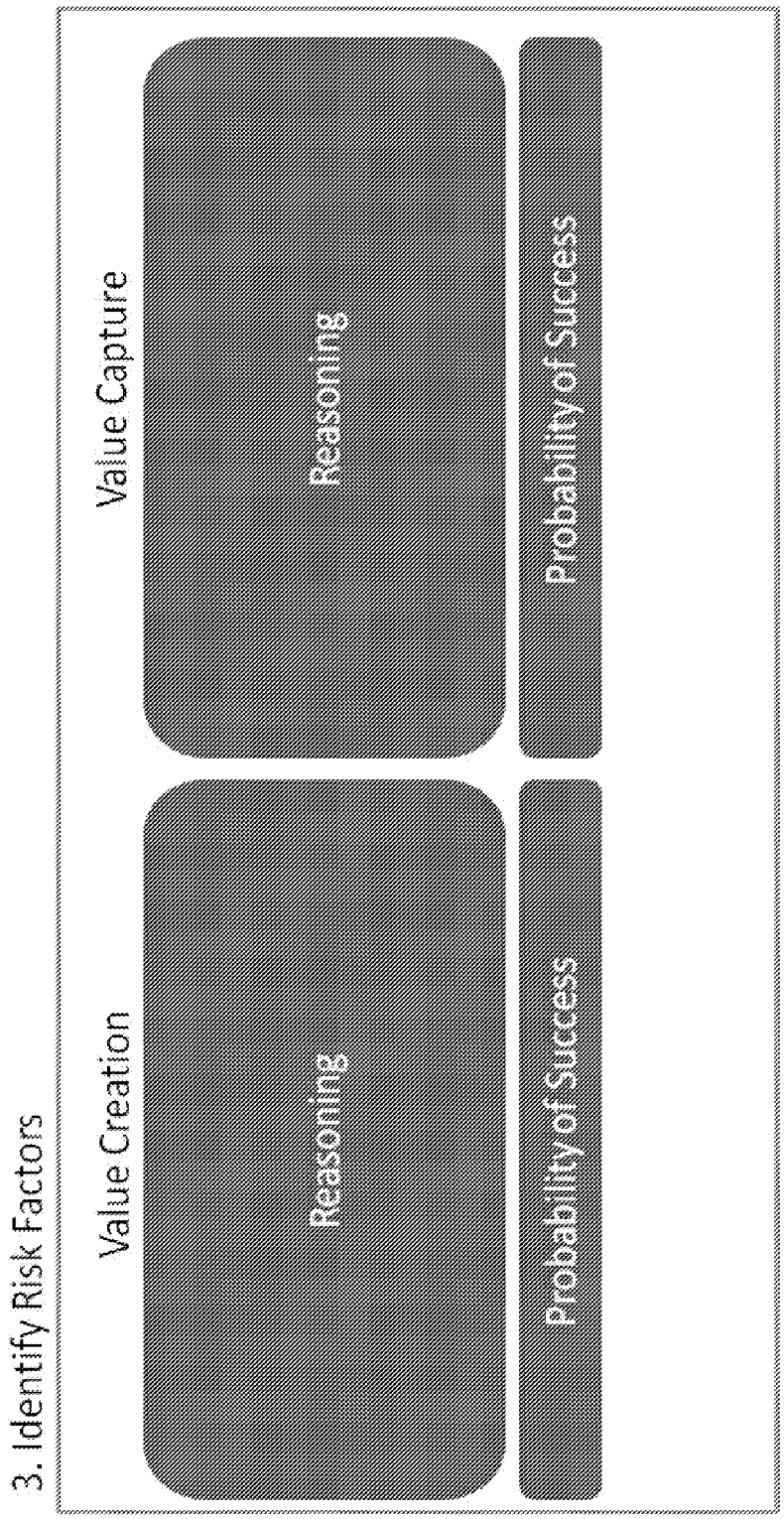
FIG. 34 shows a Value Capture Analysis risk factor chart for the Analyze module.

The first step of this analysis is to scale the value creation opportunity; i.e., create an accurate picture of the value creation opportunity by using sample size and market statistics (see FIG. 32). Next is identifying the value exchange factors (see FIG. 33). An understanding of how the initiative will impact the customer set's bottom line and the resulting mechanism for capturing value. Examples of these factors include, but are not limited to, share, price, volume, and cost reduction. Relevant statistics are provided depending on the Value Drivers that provide direction on which value capture mechanism is more probable. Once the identification is complete, the expected return is calculated. The next step in calculating the value creation and value capture portion of the business case is the identification of risk factors, and how those might affect the probability of success (see FIG. 34). The business case for creating value also includes the investment required to execute. An example of an investment selection screen is shown in FIG. 35. Once the value creation, value capture, and investments are modeled, a business case framed for a decision on execution (see FIG. 31).

Figure 36:
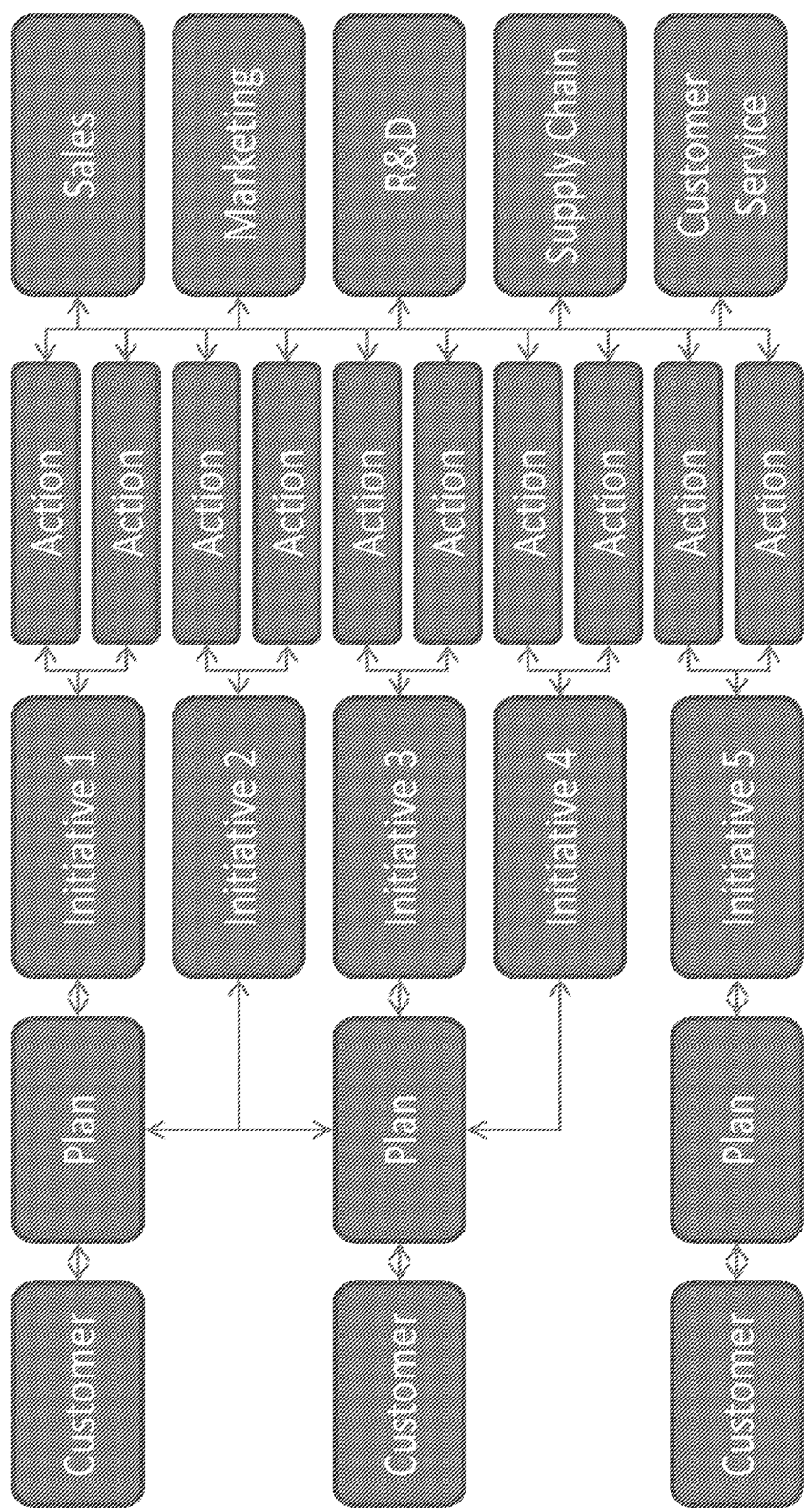
FIG. 36 shows a Value Creation Plan integrated data schema for the Execute module.

Execute: The Execute module takes the results of the Analyze module and delivers the CVC initiatives identified while capturing an organization's fair share. The module is based on an integrated data schema that connects customer value creation activity to all aspects of an organization and its customers (see FIG. 36). In one embodiment, this occurs through enterprise collaboration in four dimensions or components: customer value creation planning; value creation initiative management; value creation action execution; and integration of CVC with existing commercial and non-commercial functions in an organization.

Figure 37:
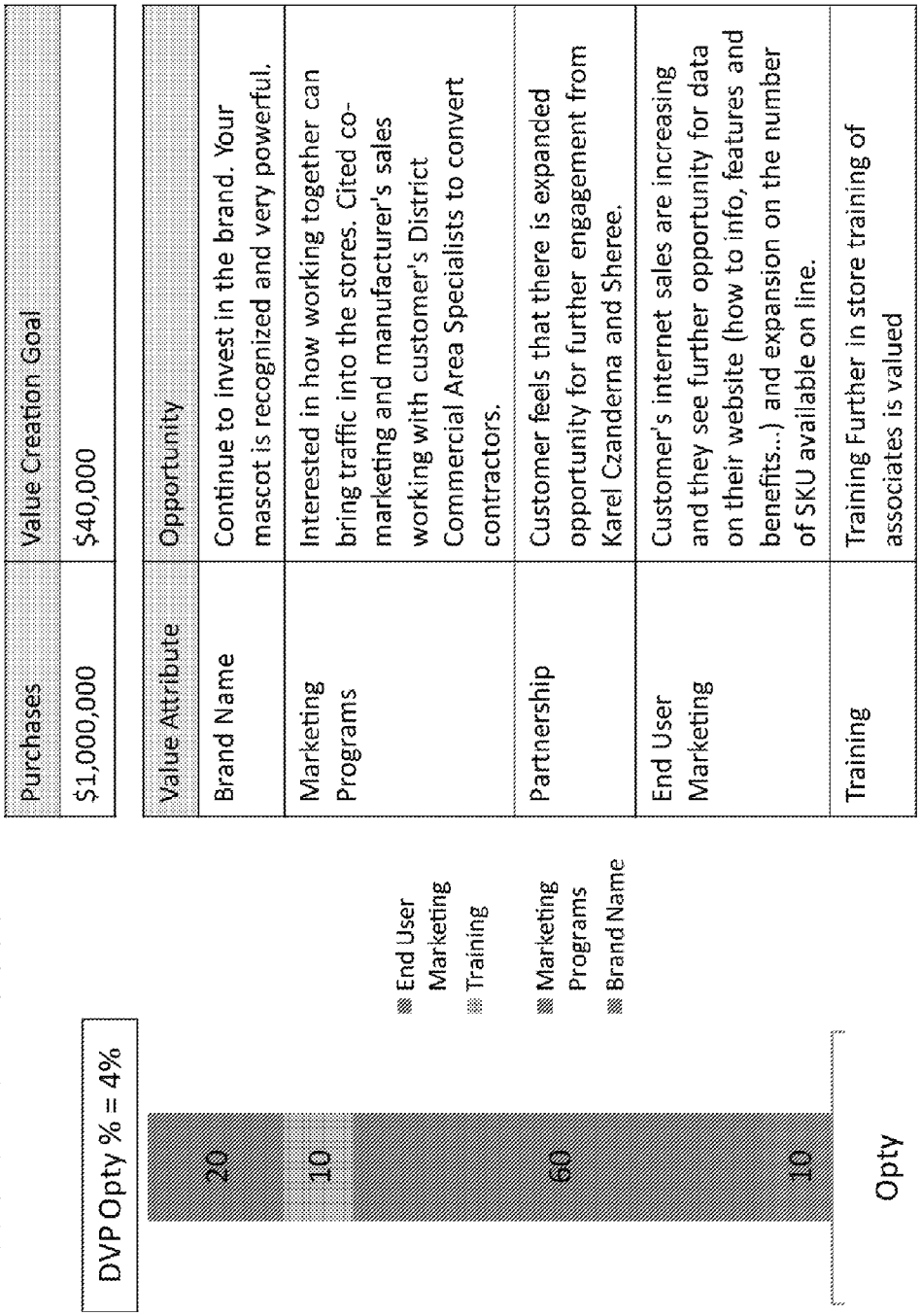
FIG. 37 shows a Value Creation Plan customer needs quantification screen for the Execute module.
Figure 39:
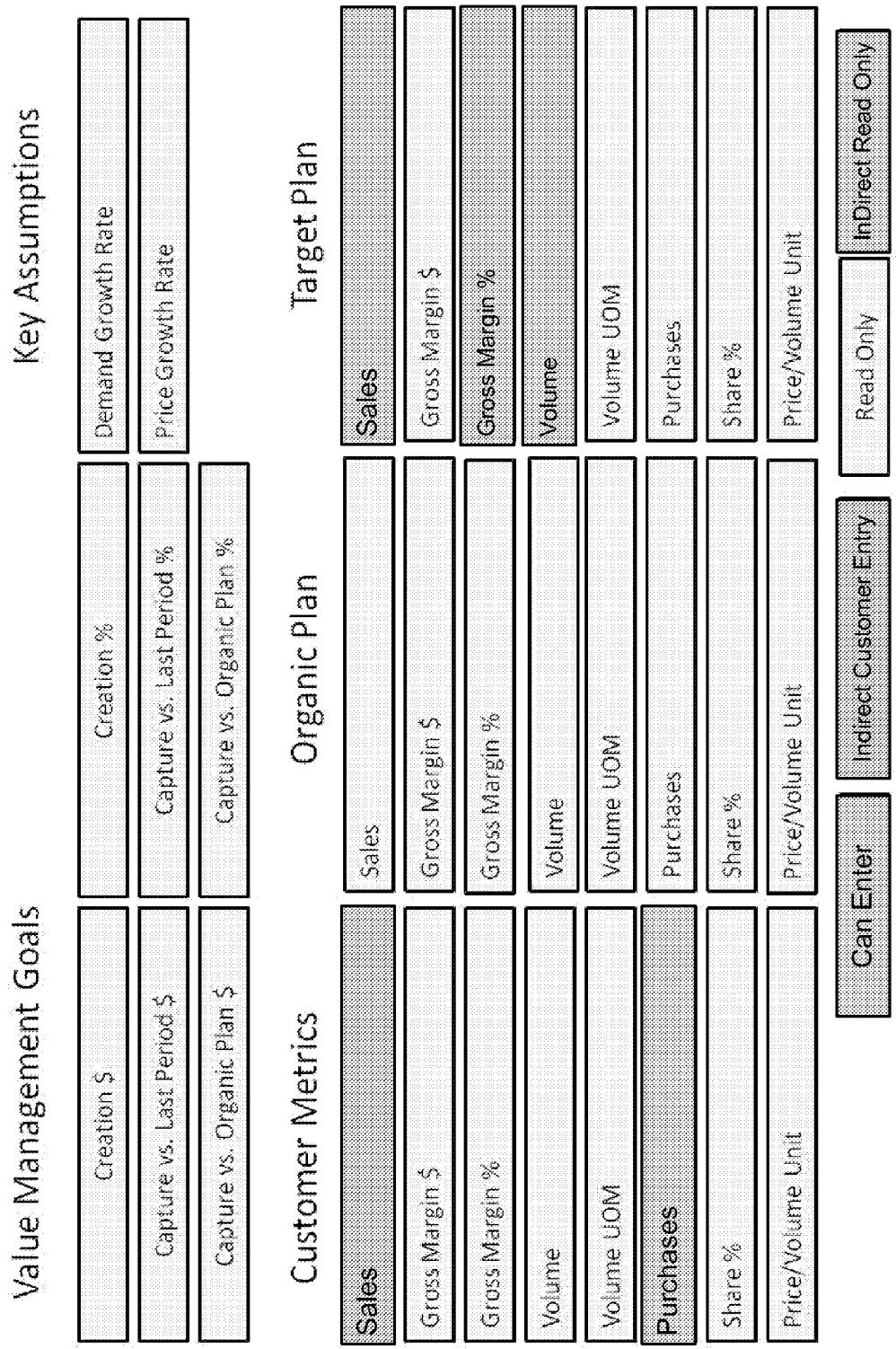
FIG. 39 shows a Value Capture chart for the Execute module.
Figure 40:
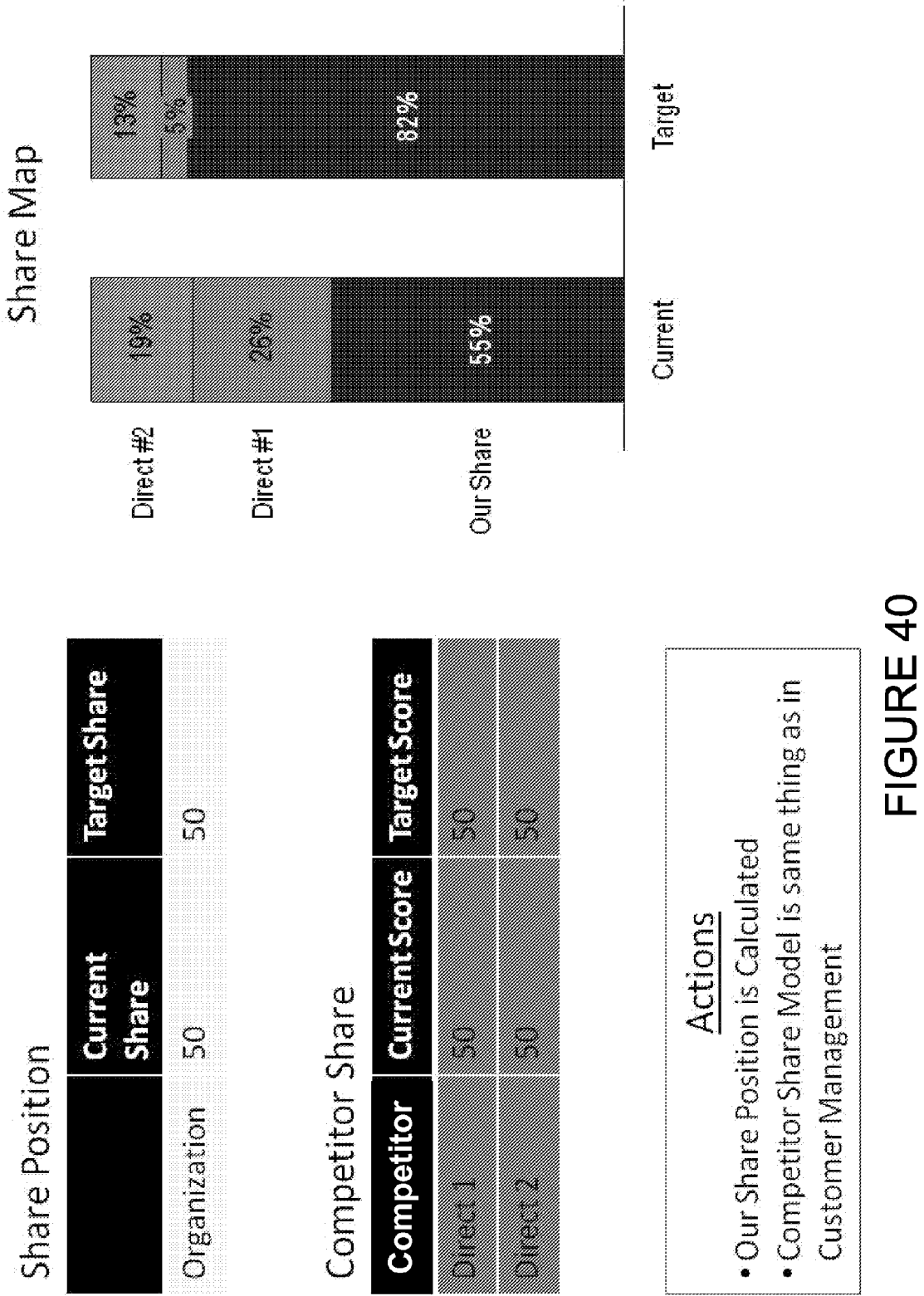
FIG. 40 shows a Value Creation Plan forecast screen for the Execute module.

The Value Creation Planning component documents the value creation and value capture roadmap on an individual customer basis that can be communicated internally and externally. The Value Creation portion of the plan includes the direct response to the value creation opportunities identified during the Gather (or Discover) module. This response comes in the form of CVC initiatives and their current status. The customer's needs are quantified in terms of the customer's economics (see FIGS. 37-38), and includes Value Creation initiatives identified during Opportunity Analysis as well as initiatives that are specific to that given customer. The Value Capture portion of the plan includes the specific returns expected to the organization as a result of executing the value creation plan, and allows a user, such as a sales representative, to forecast incremental gross margin dollar gains as a result of creating customer value (see FIGS. 39-40).

Figure 41:
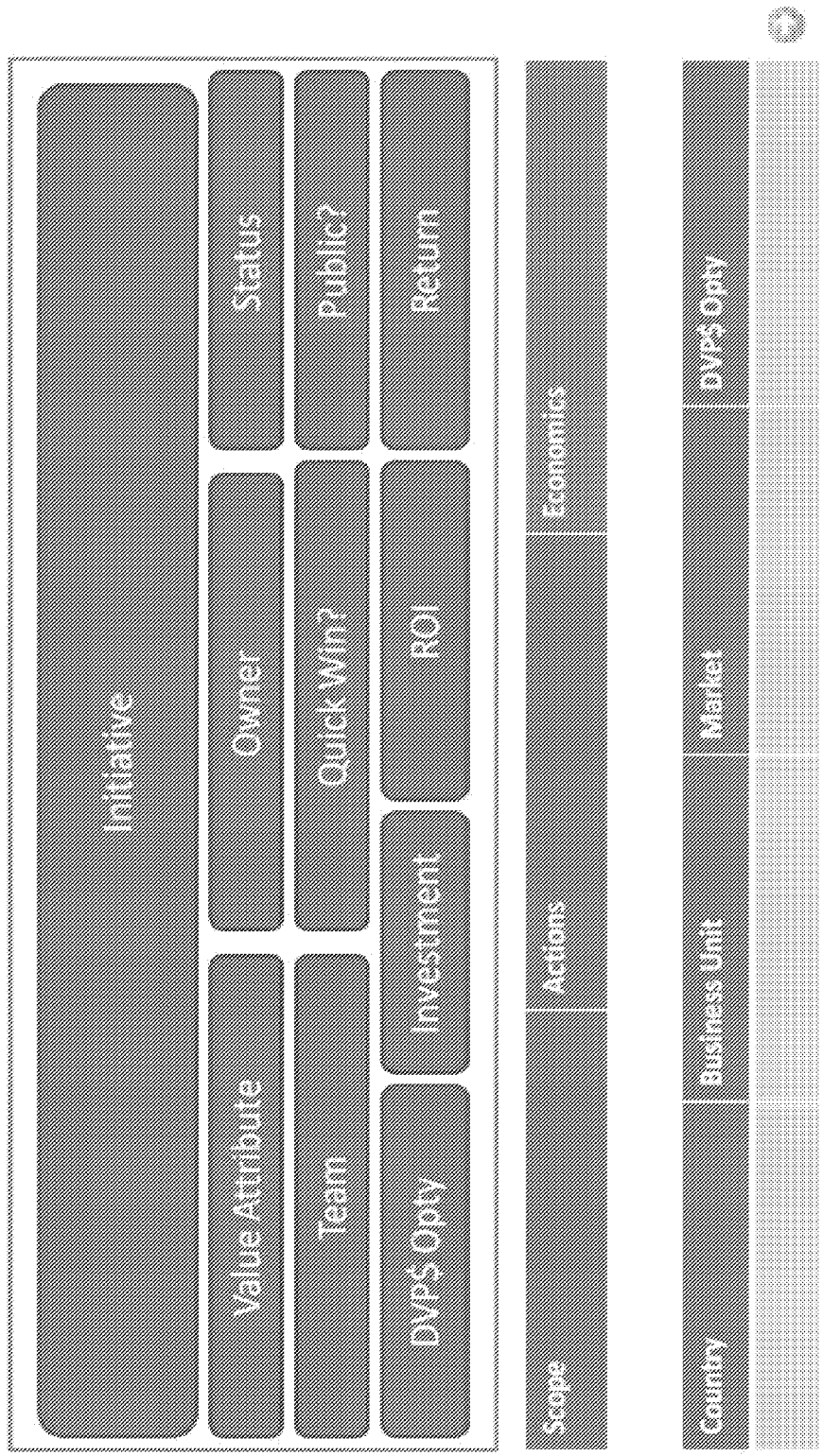
FIG. 41 shows an Initiative chart for the Execute module.
Figure 42:
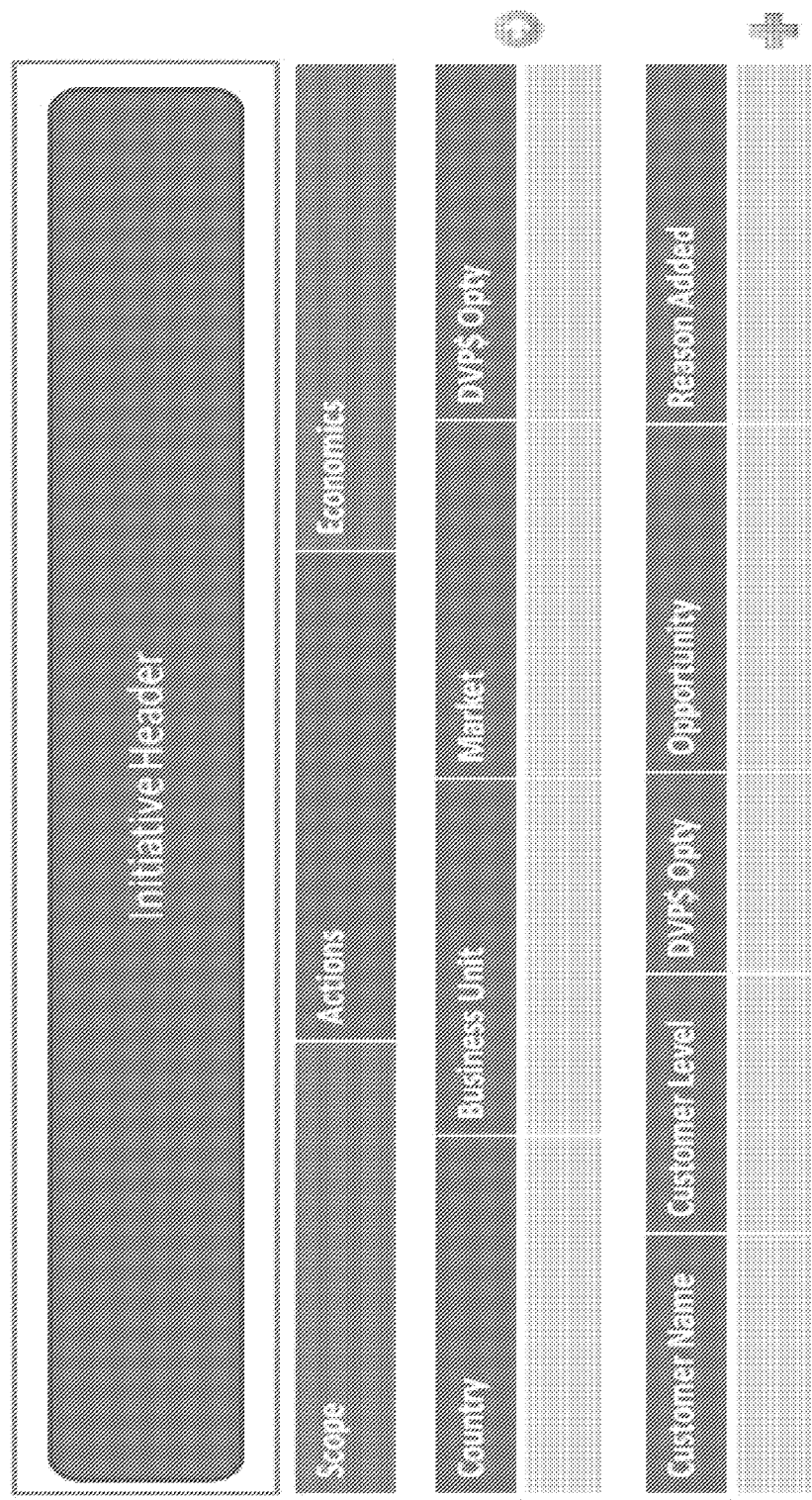
FIG. 42 shows an Initiative Management chart for the Execute module.

The Initiative Management component manages initiatives, the direct response to a given opportunity in a Value Creation Plan. An initiative is a cross-functional execution item that quantifies the value creation and value capture economics (see FIG. 41). Initiatives are owned by various functions in an organization, and thus serve these functions as a direct link to their customers. Each initiative being executed to create differential customer value is managed centrally by an initiative owner, but is still connected to all customers who informed the initiative during the Gather (or Discover) module. Each initiative has the capability to include multiple customers, and therefore, multiple plans (see FIG. 42). For example, if an initiative that was informed by 50 different customers is updated or completed, the communication to each of those 50 customers will be done automatically through the Value Creation Plan. Accordingly, organizations can be directly linked to CVC through the management of initiatives.

The Action Execution component details the action items (i.e., measurable execution items) that make up the execution roadmap for a given initiative. These are the things that, when executed, create value and provide organizations with the ability to capture value. This facilitates the execution of a cross-functional initiative that is centrally managed and communicated similar to value creation initiatives. Each action can be owned by a different team (see FIG. 43), thus creating the potential for a cross-function execution team for the organization.

Figure 44:
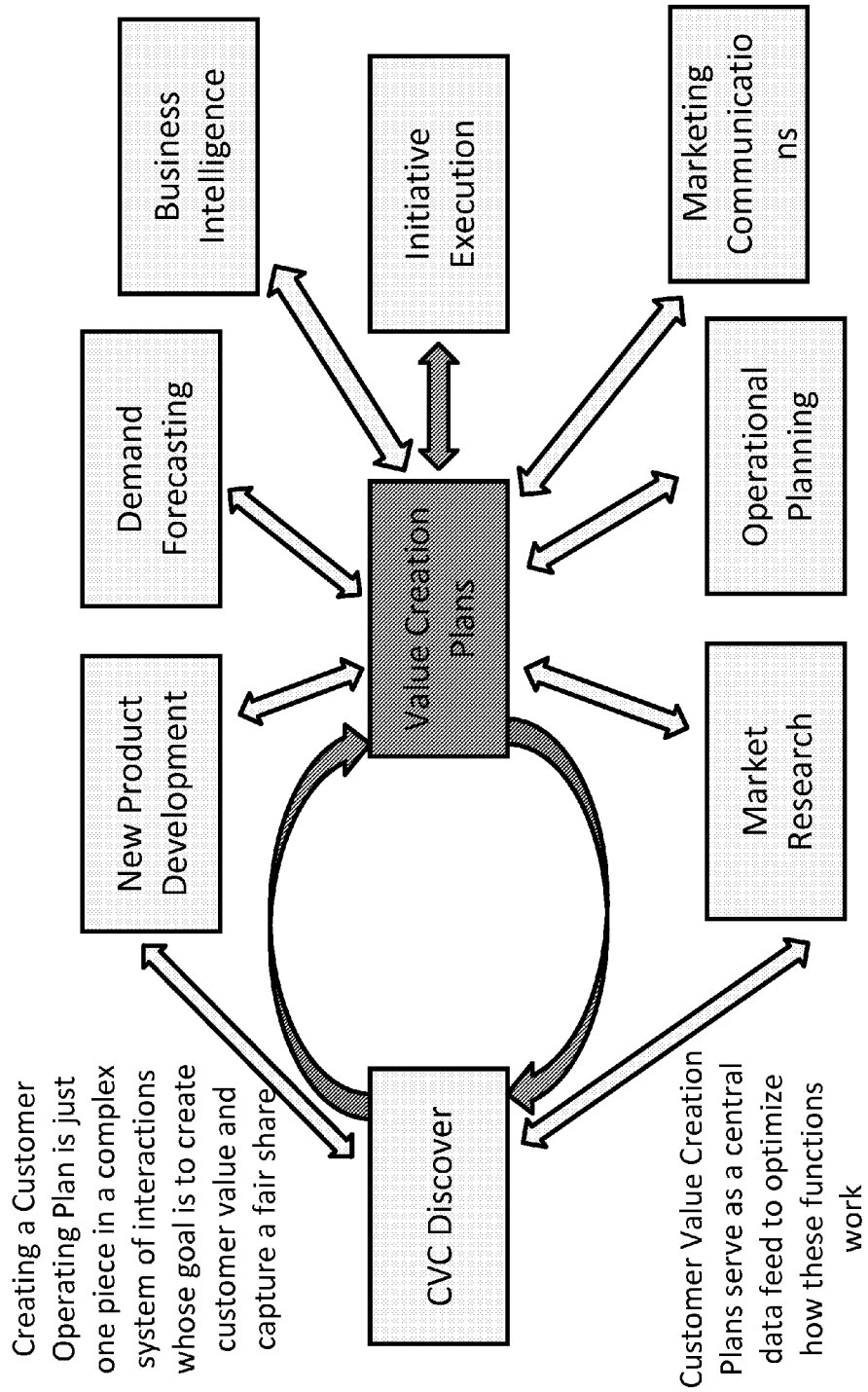
FIG. 44 shows a Process Integration chart for the Execute module.

In the Process Integration component, value creation plans, initiatives, and actions are integrated into organizational processes to drive the execution of customer value creation. This can include assigning initiatives and actions to functions that typically are not connected to the customer, such as R&D, Customer Service, and Marketing Communications (see FIG. 44).

Figure 45:
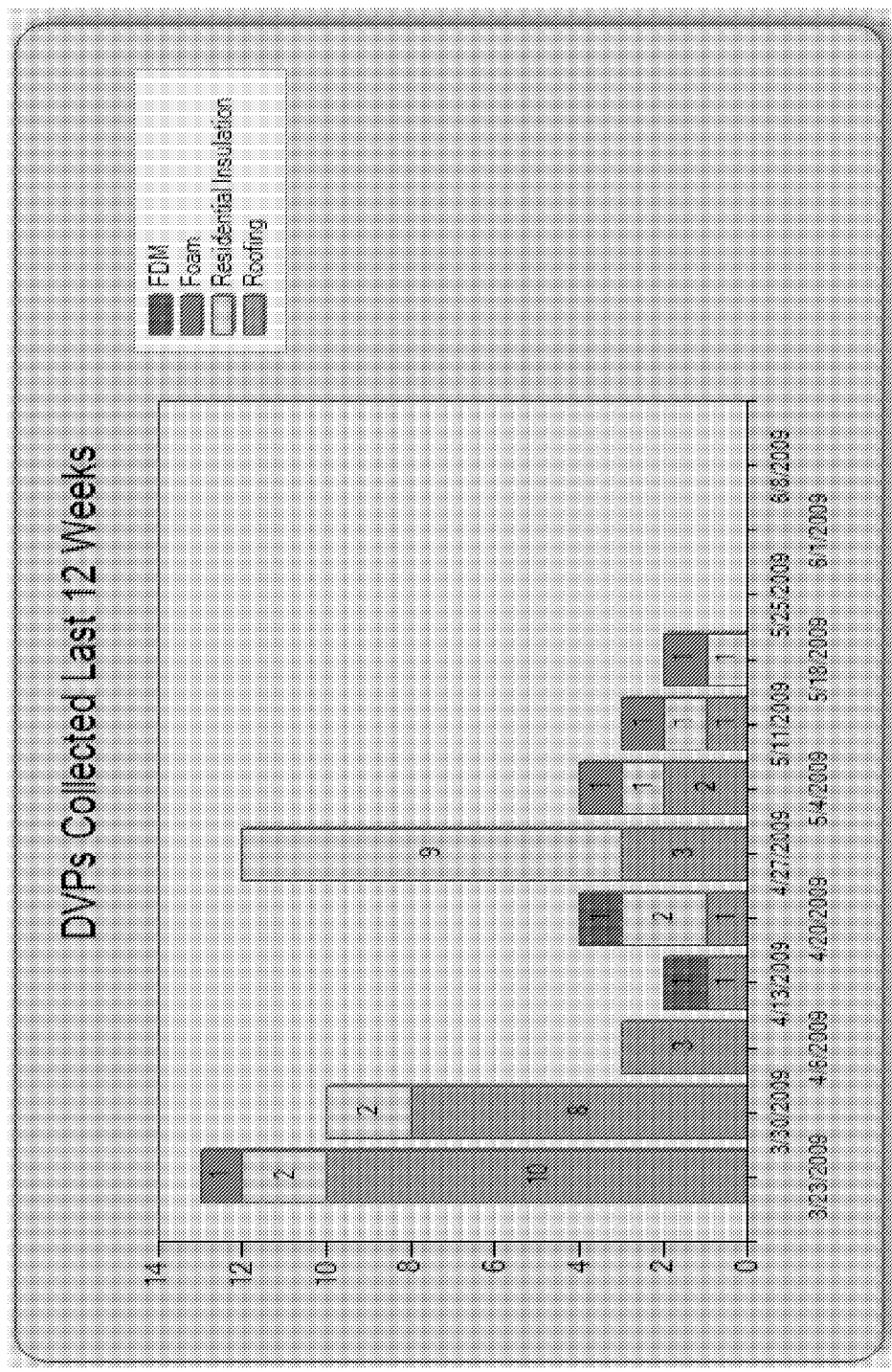
FIG. 45 shows an Execution Dashboard for the Measure module.
Figure 46A:
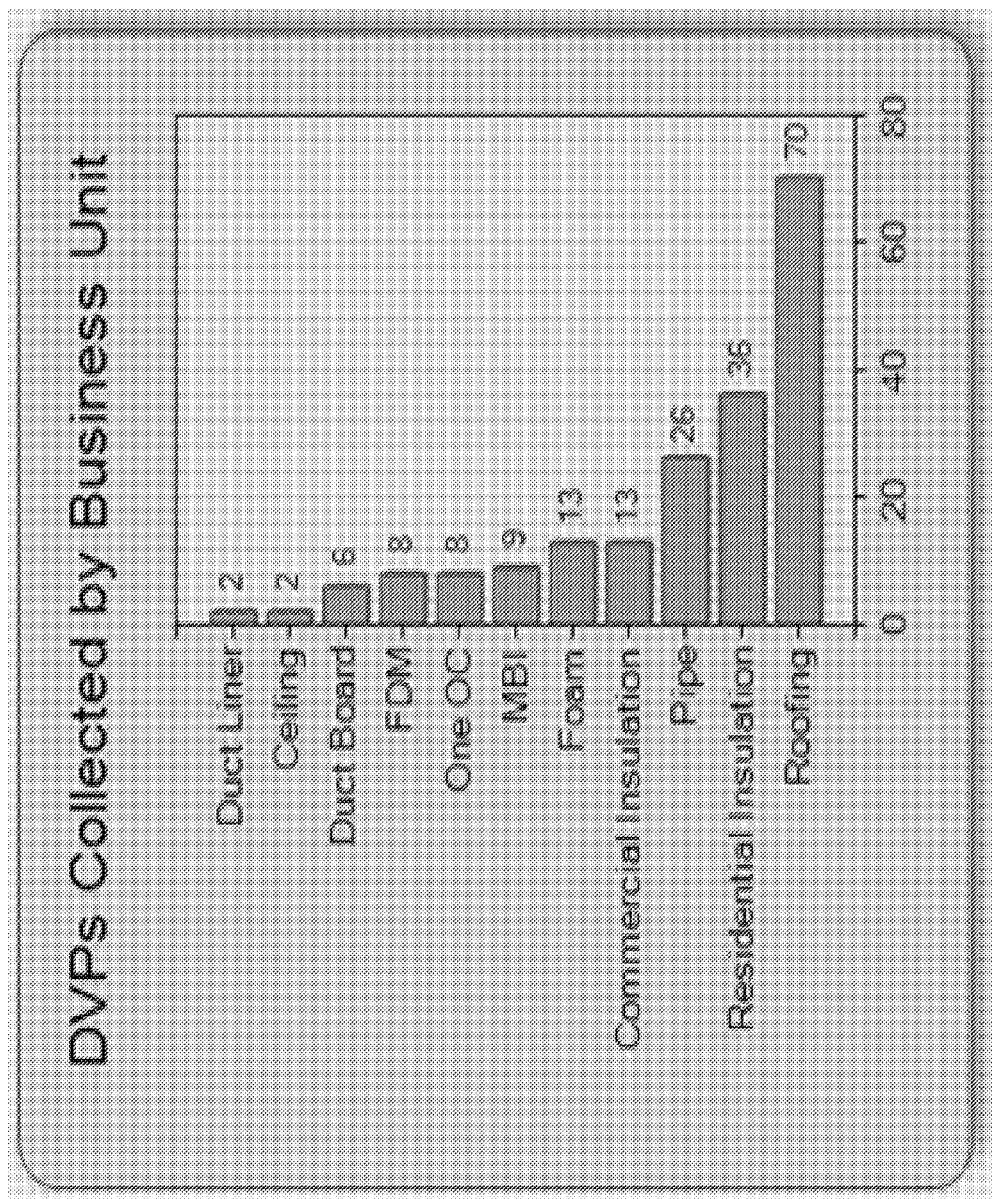
FIG. 46 shows an exemplary DVP collection screen for the Measure module.
Figure 46B:
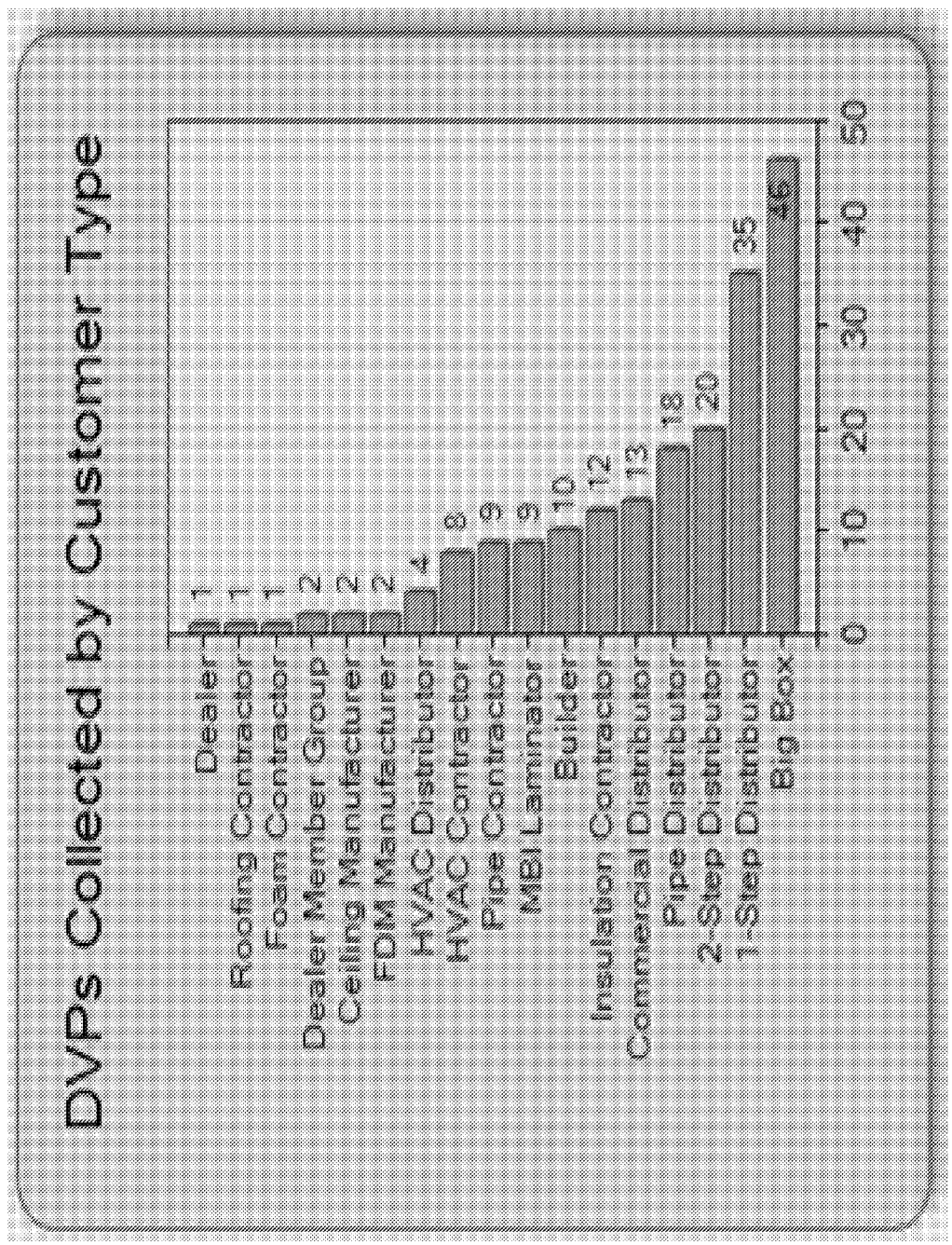

Measure: The Measure module drives an environment of learning and continuous improvement by measuring the activities of the Gather/Discover, Analyze, and Execute modules through a series of integrated data dashboards and additional data collection methods. In one embodiment, the Execution Dashboard measures the data collection effort on a periodic basis (e.g., daily, weekly, monthly) to evaluate the CVC dataset and ensure it is complete and balanced to reduce the potential of biased results. Historical collection measurements can be viewed, as shown in FIG. 45. Data collection can be measured across various dimensions, such as (but not limited to) Sales Rep, Sales Team, Region, Perspective, Customer Type, Country, and Business Units, among others (see FIG. 46).

Figure 47:
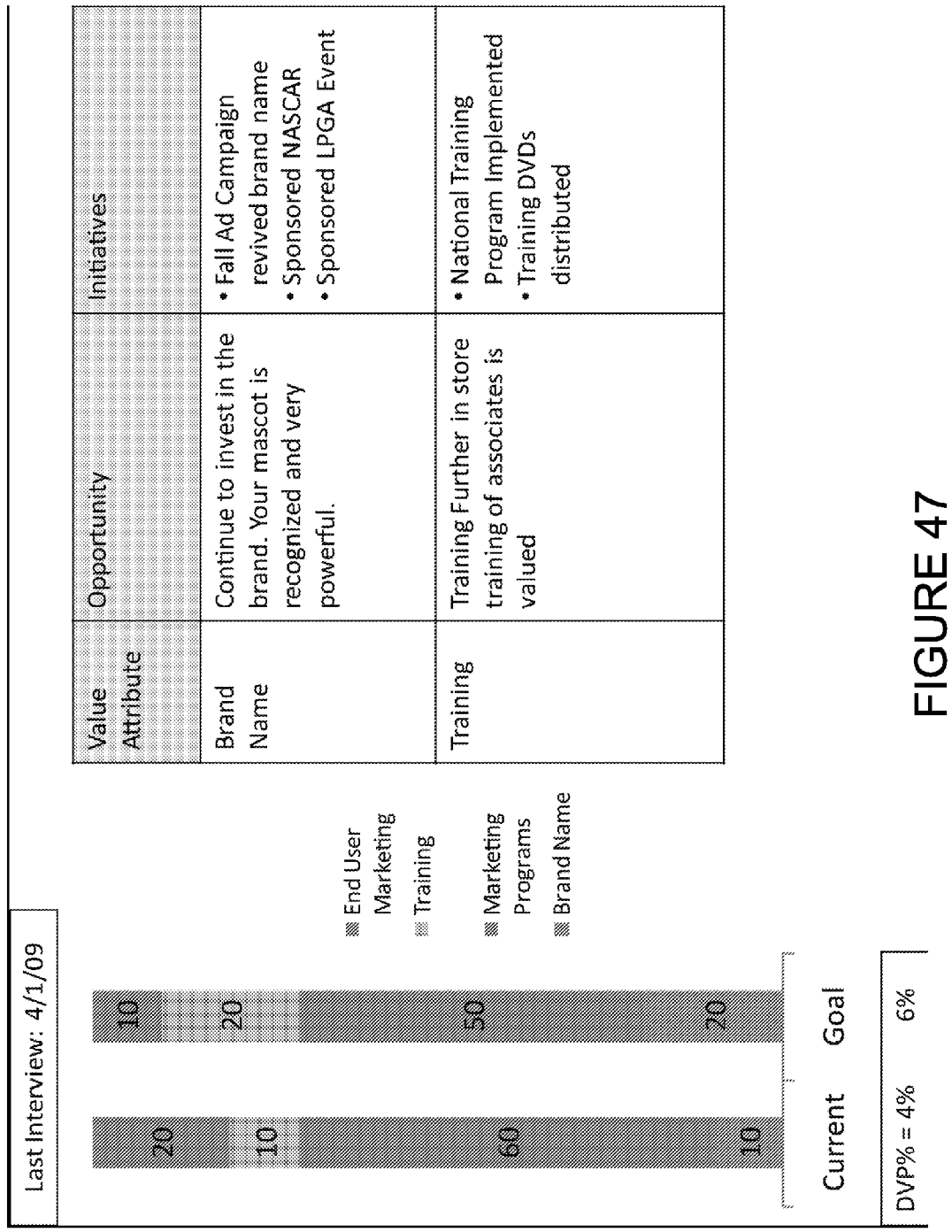
FIG. 47 shows an exemplary Value Creation Progress screen for the Measure module.
Figure 48:
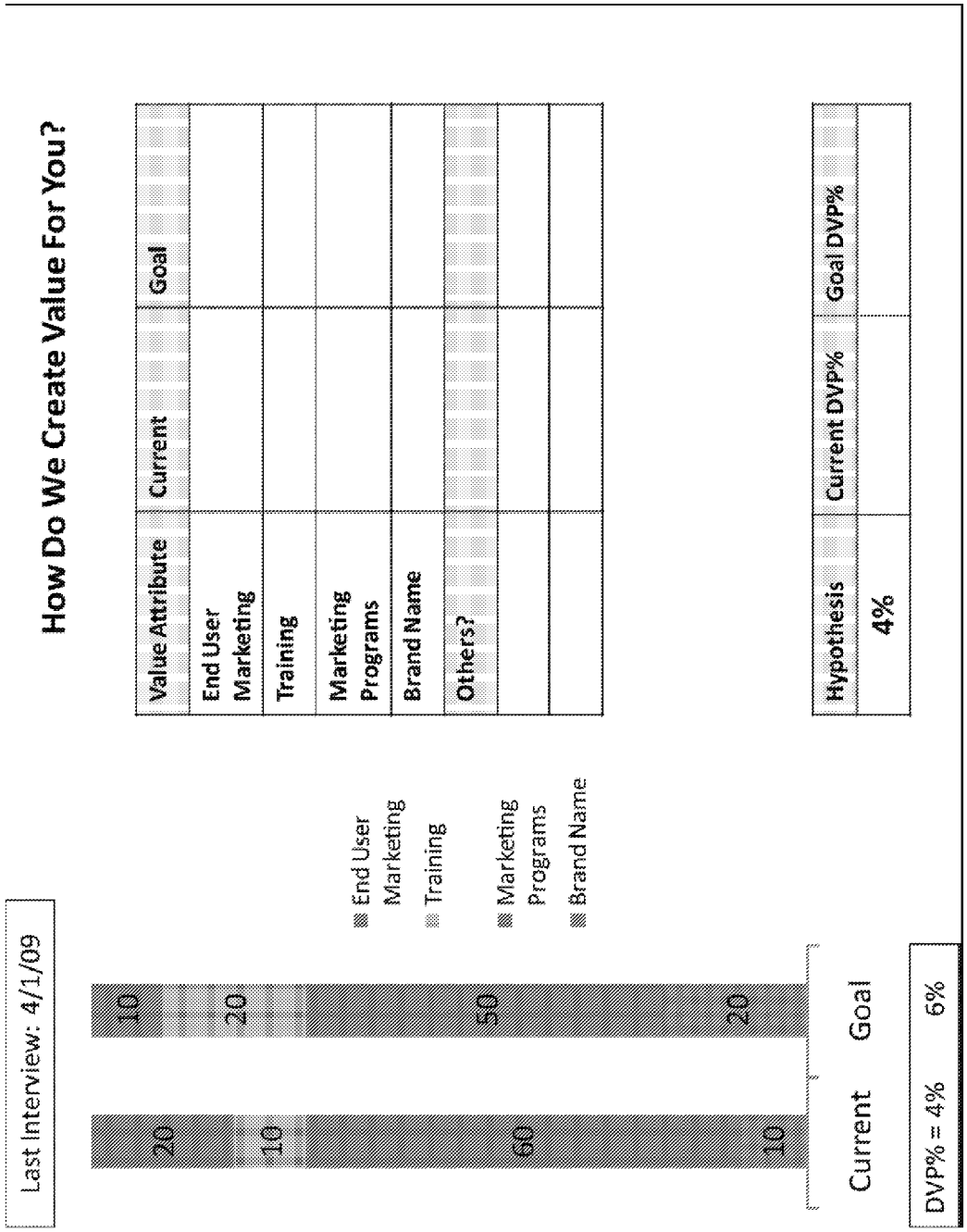
FIG. 48 shows another exemplary Value Creation Progress screen for the Measure module.

The Discover Value Creation Progress dashboard or process, similar to the data collection portion of the Gather/Discover Module, collects the customer's perspective on progress being made on a Value Creation Plan. Measuring Value Creation progress involves the customer, and reviews what was accomplished since the last data collection effort, as well as seeking customer input (see FIGS. 47-48).

Figure 49A:
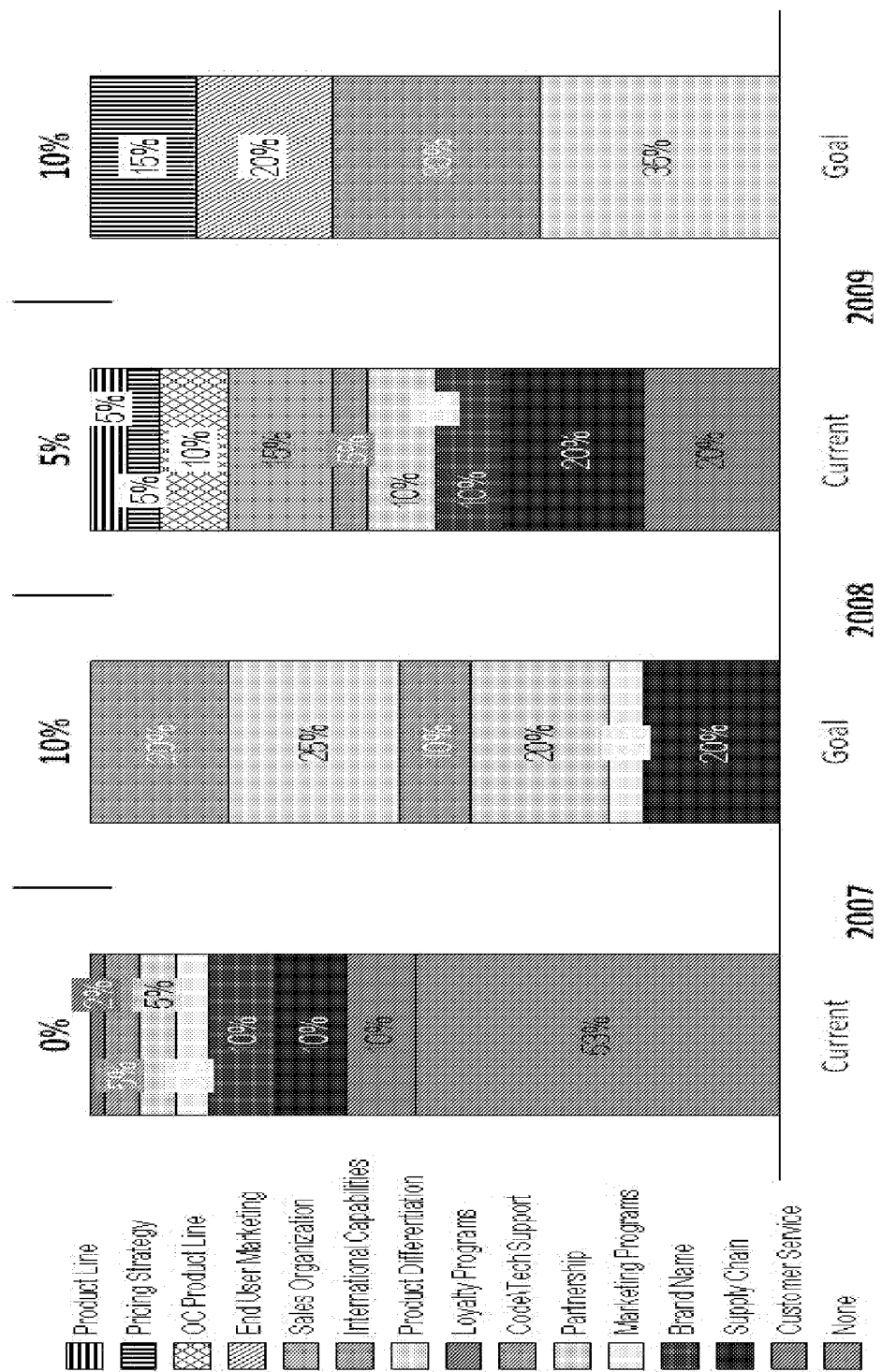
FIG. 49 shows a Value Creation Dashboard for the Measure module.

The Value Creation Dashboard combines the data collection effort in the Gather/Discover and Measure modules to create a dashboard that measures the quantified value creation progress across multiple dimensions, from an individual customer to across the entire dataset or many customers. It tracks ongoing customer economic needs and value creation progress over the course of time in a manner quantified in terms of a customer's economics (see FIG. 49). This dashboard may be built entirely from the customer's perspective.

Figure 50:
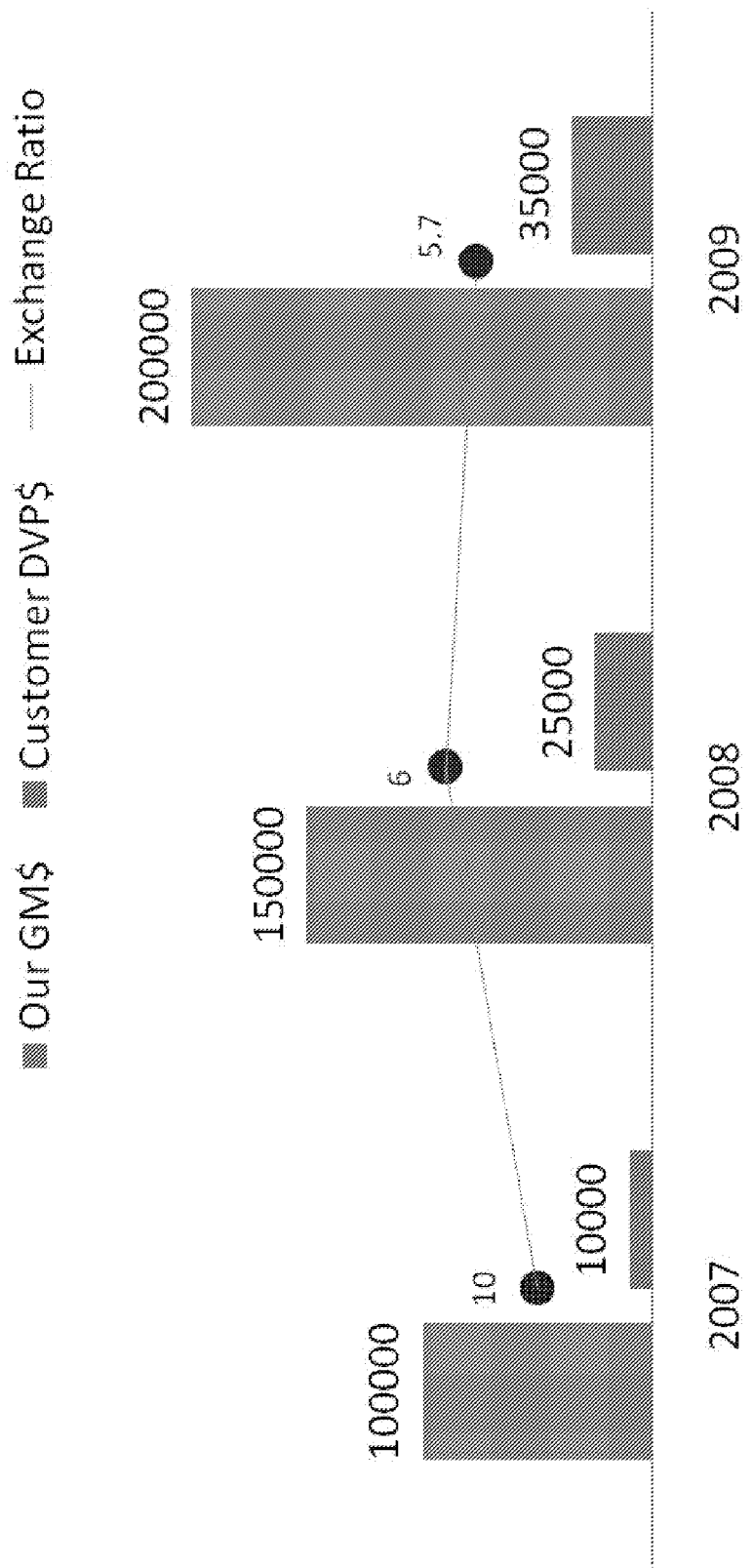
FIG. 50 shows a Value Capture Dashboard for the Measure module.

The Value Capture Dashboard tracks the correlation between customer value creation and an organization's ability to capture its fair share. It combines traditional internal data streams with the data collection efforts in the Gather/Discover and Measure modules to use value creation as a leading indicator to financial performance. At the core of this dashboard is the correlation between the quantified DVP and an organization's gross margin (GM) dollars on its products and services. FIG. 50 shows a historical view of an organization's GM dollars as compared to customer DVP, and the exchange ratio, which is GM divided by customer DVP.

Figure 51:
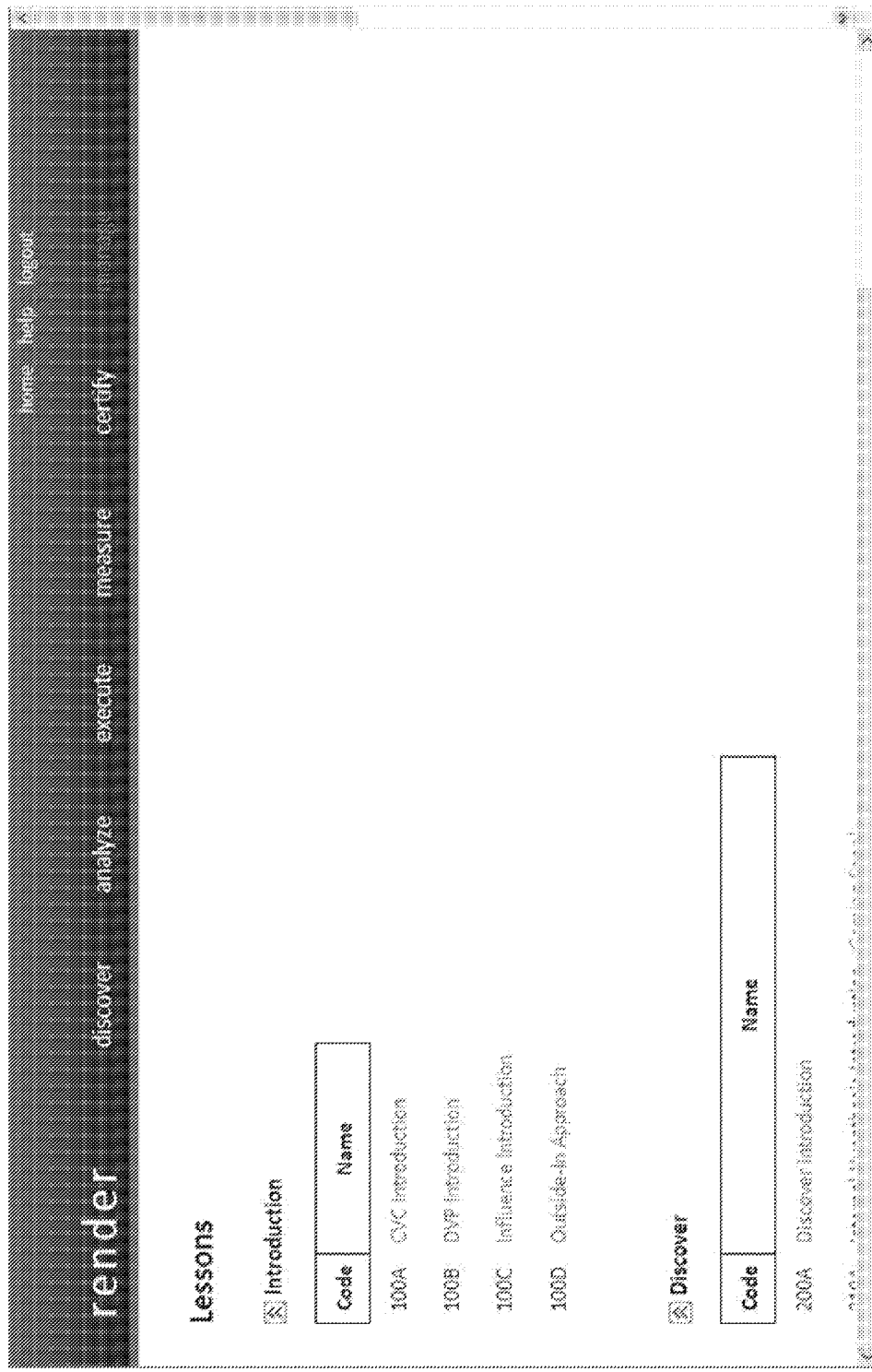
FIG. 51 shows an Online Course screen for the Integrated Education Platform component of the Certify module.

Certify: The Certify module ensures the CVC system and modules are executed with rigor through a combination of education, organizational structure, resources, and measurable change management. The confluence of the Certify module with the other CVC modules is what transforms Customer Value Creation from a project to an organizational capability. The Integrated Education Platform/Curriculum comprises training and developing qualified resources to be available to execute processes on a daily basis, driving adoption into the organization's culture. It also may comprise increasing visibility and efficiency across organization, and implementing qualification measurements (e.g., certification of interviews, analysis, action plans, and the like). It further may comprise accessing, defining, developing, deploying, and measuring a training program, and establishing a level of compliance/results standards (e.g., certification milestones recognition such as black belts for Six Sigma). As seen in FIG. 51, an integrated set of online and offline training lessons may be offered to certify users on each step of each CVC Module, so that execution is rigorous and can be owned by an organization.

In the Roles & Responsibilities process, as seen in FIG. 52, organizational positions are translated into CVC Roles & Responsibility element to drive accountability. This process comprises designing and developing roles and responsibilities to support institutionalization, and considering requirements for business continuity, project execution and support functions. It further comprises mapping roles and responsibilities to tailored processes, clearly defining roles and responsibilities to allow the organization to update job descriptions and clearly communicate critical outcomes, and designing the organization to have the capacity to execute, control and influence, and to have access to required budget.

Figure 53:
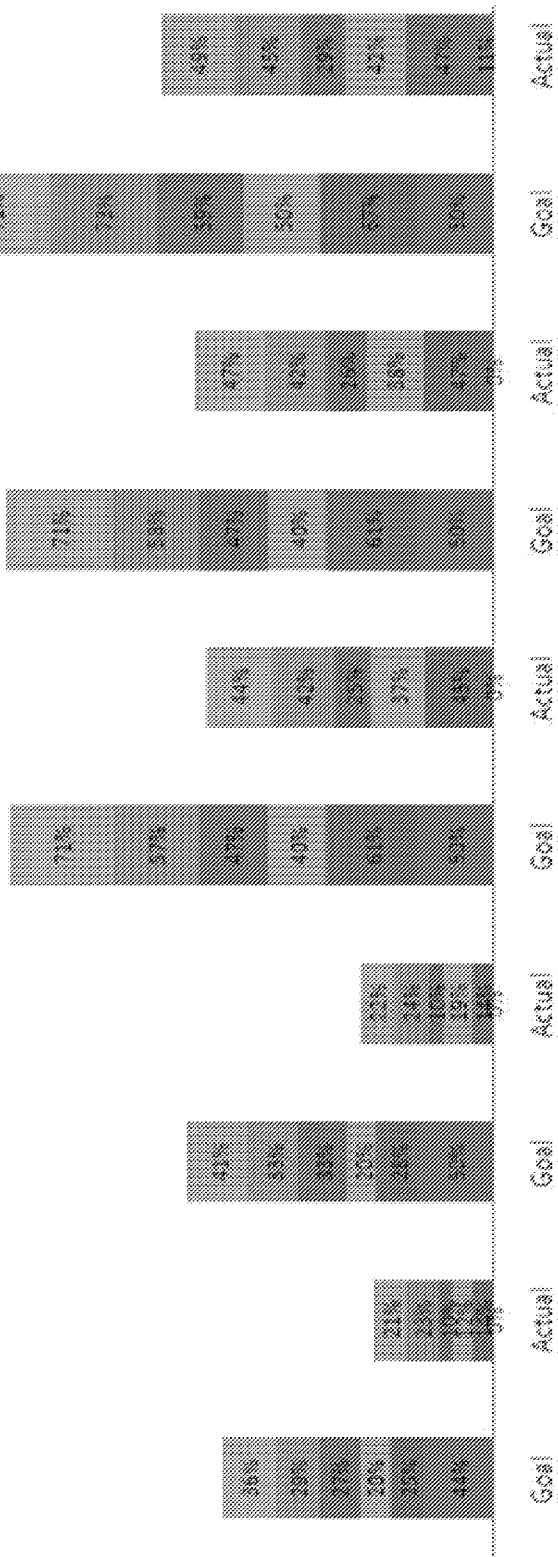
FIG. 53 shows an exemplary CVC Adoption Progress chart for the Certify module.

The Measurable Change Management process comprises the measurement of the execution of the CVC modules so that the CVC Dataset is rigorous and unbiased. Each action in each CVC module can be measured (see FIG. 53), which provides the mechanism to measure and manage change. Each user is assigned a list of change management milestones, based on their role in the organization (see FIG. 54). CVC change is proactively managed by tracking progress against their role milestones (see FIG. 55).

The Communications process comprises providing tools and documents necessary to communicate the purpose, status, and results of Customer Value Creation to both the client organization and its customers to spur adoption, and increasing customer participation and level of engagement, as well as increasing internal awareness. One goal is to become a strong voice for a market-driven organization, and access, design, develop, deploy, and measure a communication program. It also may comprise developing presentation collaterals, and establishing newsletters and monthly and quarterly reports distributions.

Figure 56:
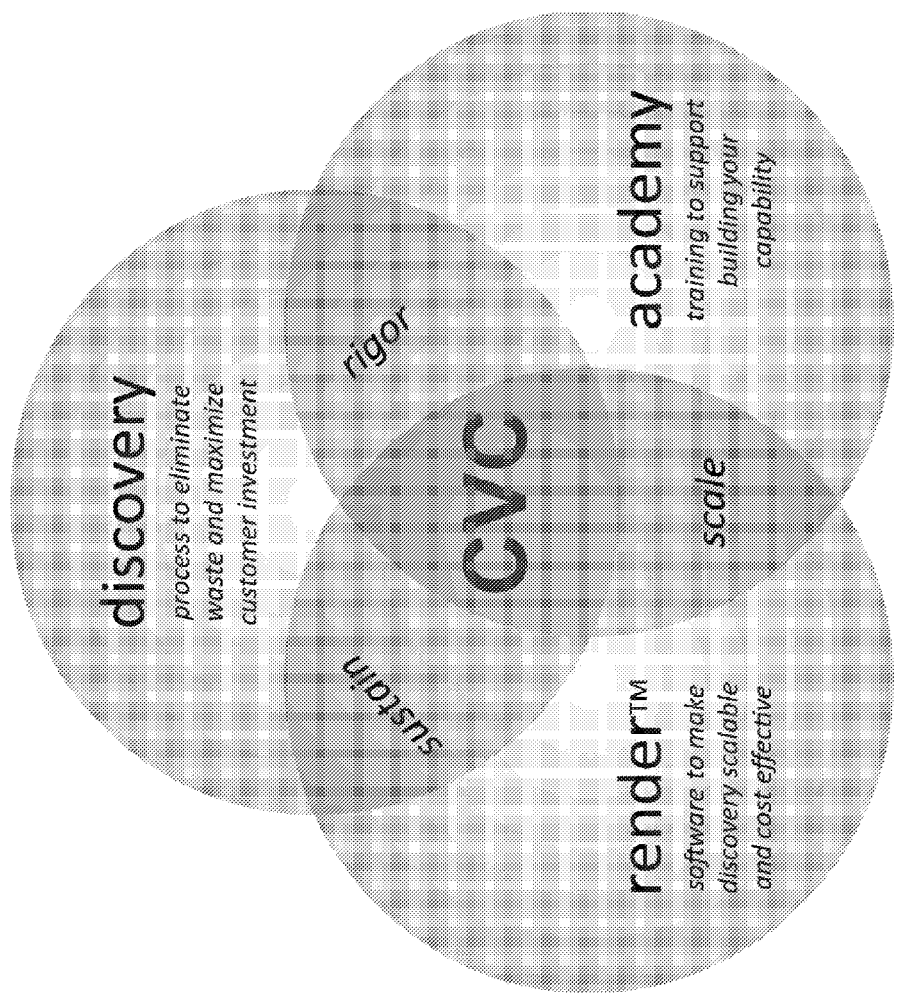
FIG. 56 is a diagram showing the Customer Value Creation Product Suite in accordance with another exemplary embodiment of the present invention.
Figure 58A:
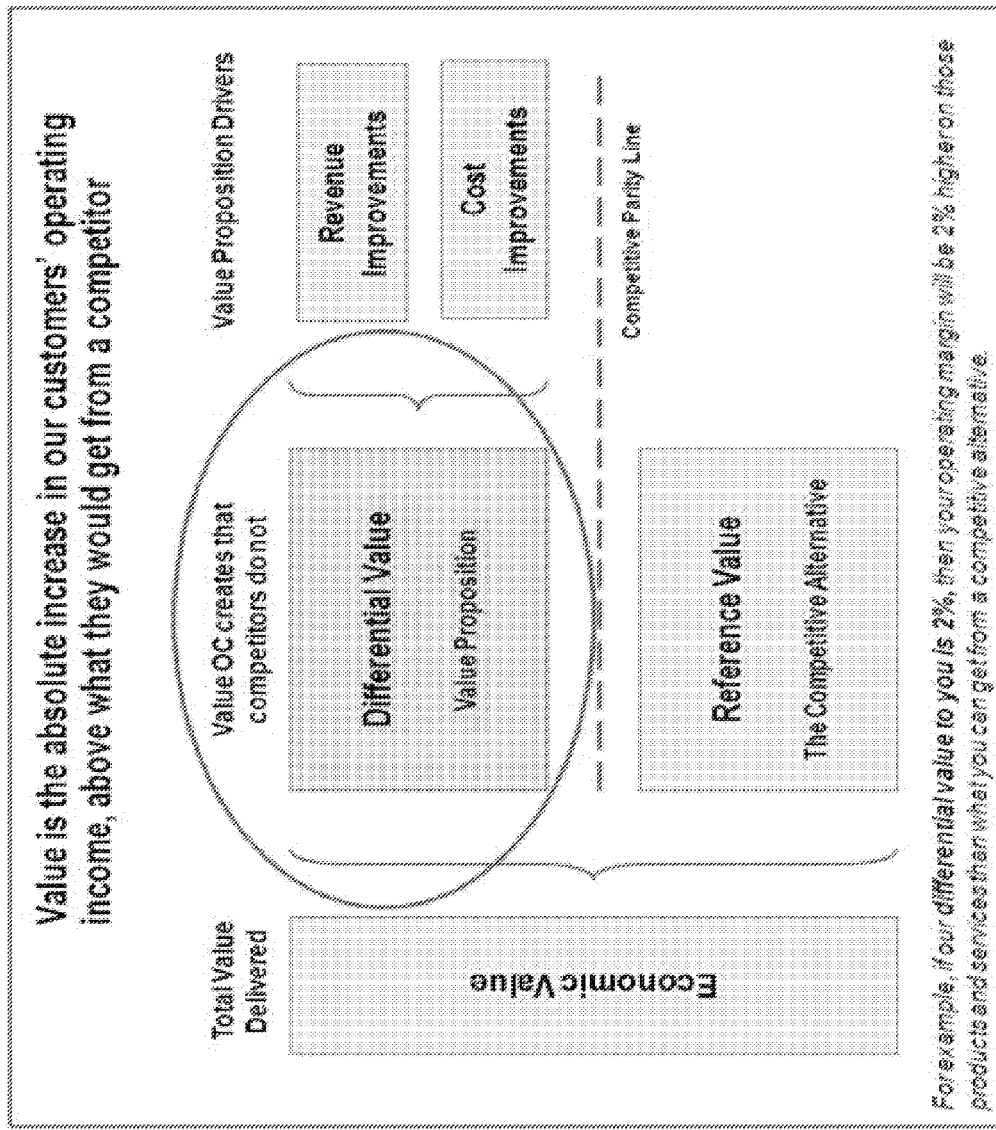
Figure 59A:
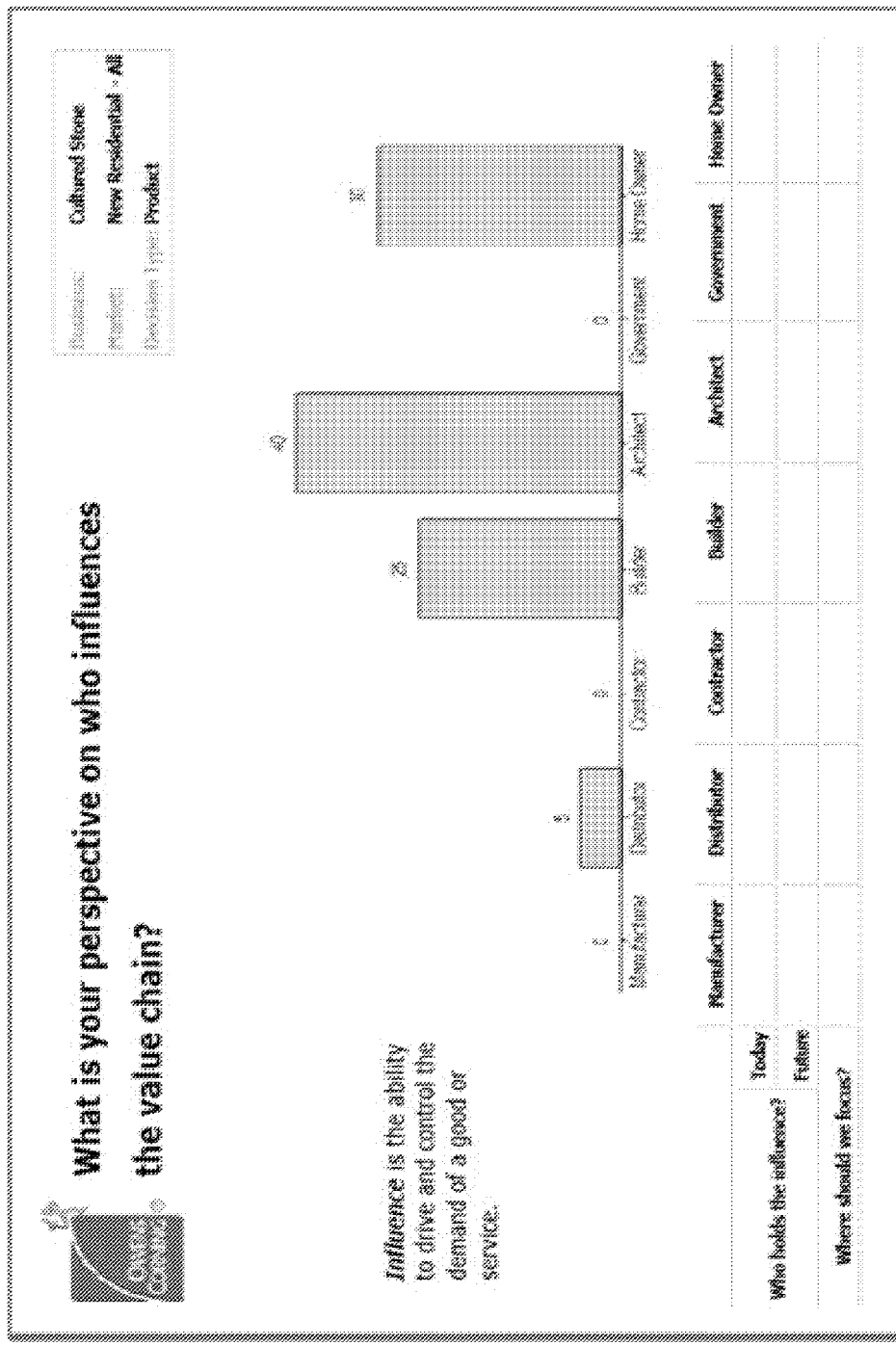
Figure 60A:
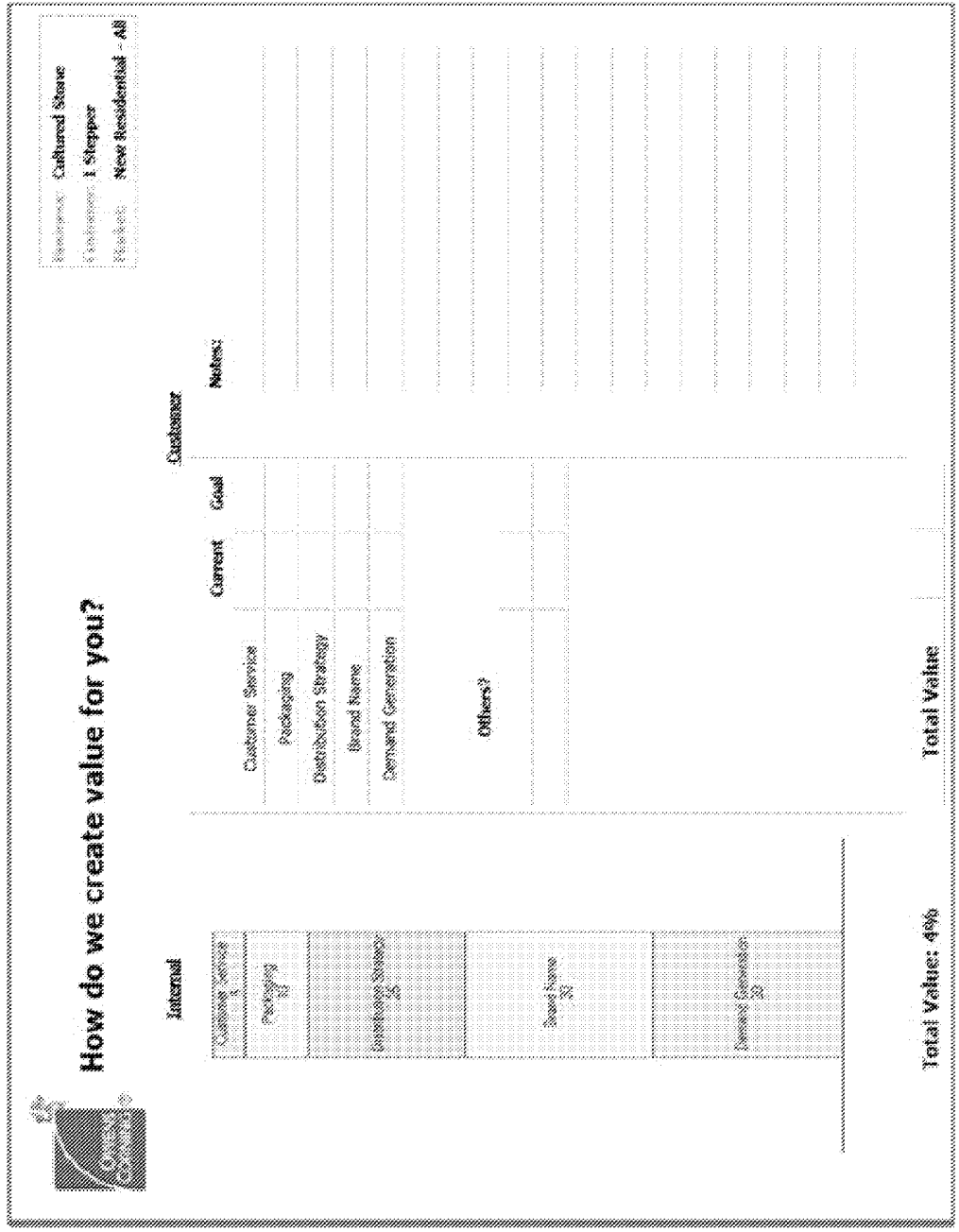
Figure 62:
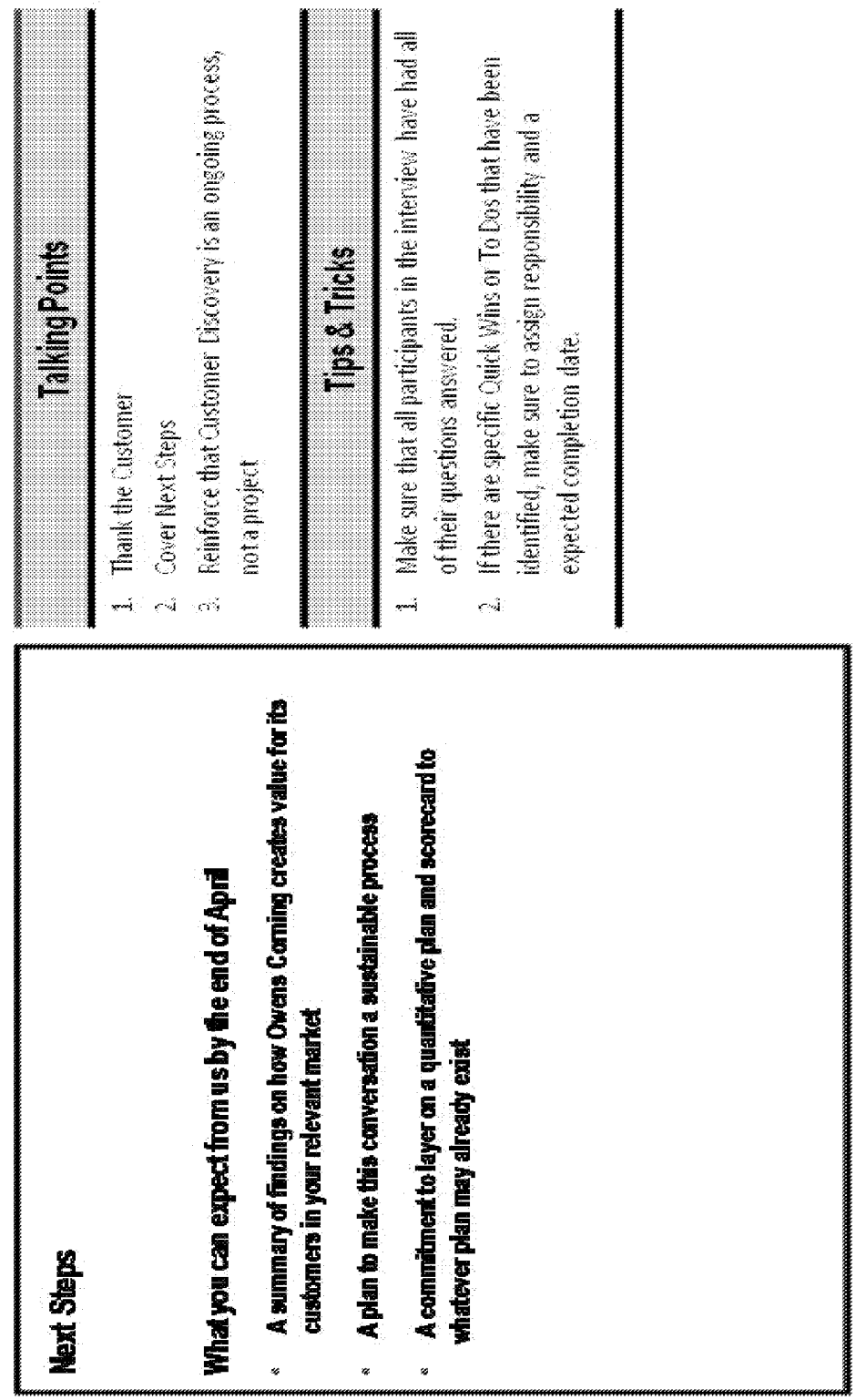

In one embodiment, the system encompasses the Customer Value Creation (CVC) Product Suite. The CVC Product Suite is an integrated computer-based platform of three tools: Discovery (The Process); Render™ (The Software); and Academy (The Education). These products enable an organization to own and manage the CVC dataset and the CVC Approach and modules without the reliance of third party subject matter experts or the dependency on a team of high-cost analysts to manage Customer Value Creation. Instead, these products serve as the vehicle for transferring the CVC process and system to an organization. FIG. 56 shows the CVC Product Suite of an exemplary embodiment of this component of the present invention. At the highest level, the primary factor of differentiation for the CVC Product Suite is the ability to transfer intellectual property through the Discovery Process, the Render™ computer software program, and the Academy Training Curriculum.

The Discovery Process comprises structured customer interaction to extract the customer's perspective on customer value creation as described in sections of the Gather/Discover and Measure modules. The Discovery Process is the primary data collection methodology in Customer Value Creation and therefore is the catalyst for completing the CVC dataset and executing the CVC Approach. The Discovery Process includes 6 steps, as shown in FIGS. 57-62: educating and engaging the customer; defining Differential Value; collecting the current, future, and focus Demand Influence data; collecting the Differential Value Proposition data; collecting the Opportunity data, and properly setting expectations with the customer. The Discovery Process may be executed via in-person interview, telephone interview, online webinar, or various survey methods. The Discovery Process is structured such that customers and organization employees can understand and contribute to the CVC dataset without reliance on professional consultants or excessive training.

Figure 63:
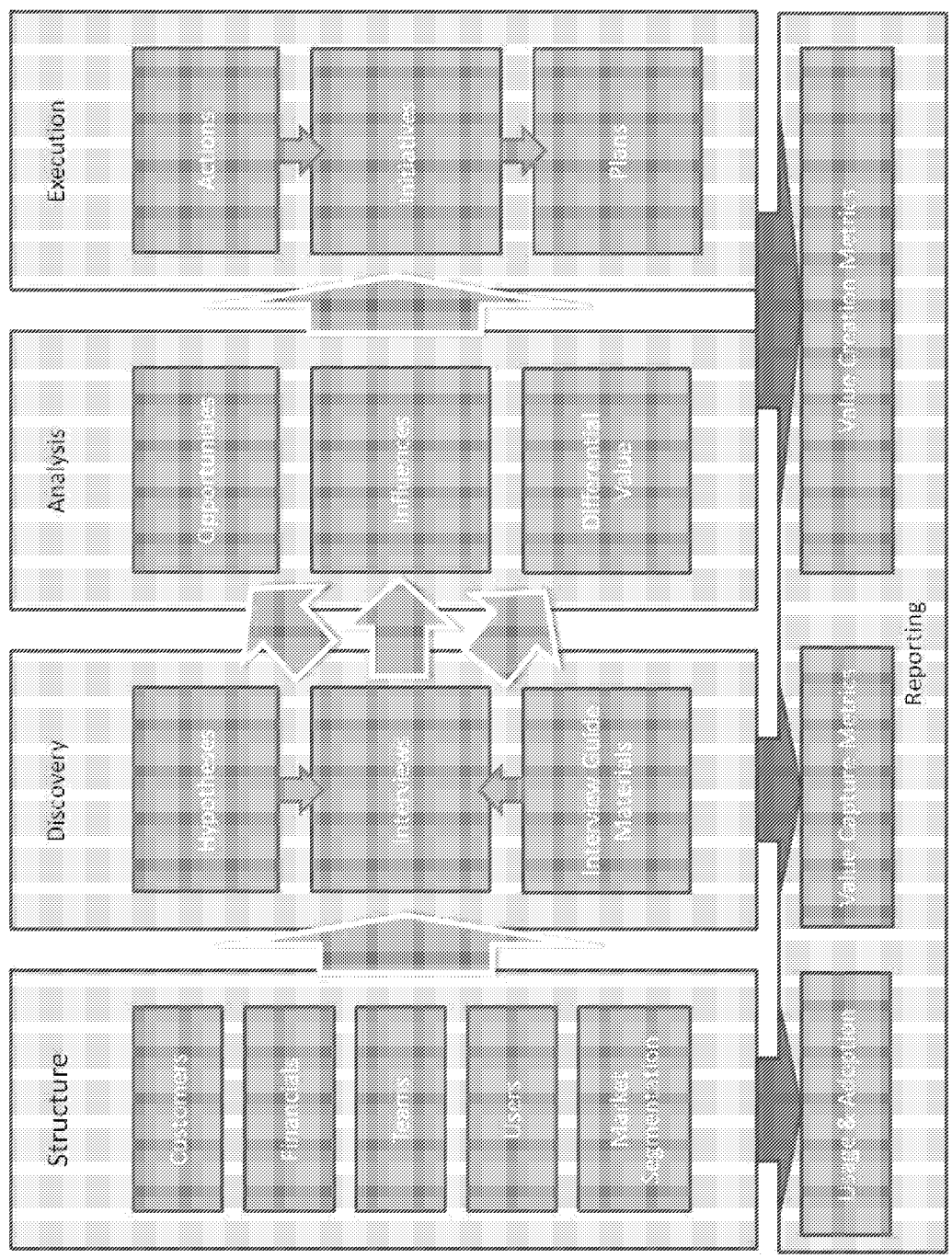
FIG. 63 is a chart of the Render Data Schema Design.

The Render™ software is a web-based computer software program that enables organizations to manage Customer Value Creation in an efficient, effective and affordable fashion such that the organization can own a Customer Value Creation capability. The Render™ computer software program comprises:

(1) Render™ Database: this comprises a data schema that houses the CVC dataset such that the CVC Approach and Modules is executed in an integrated fashion; an exemplary embodiment of a data schema design is shown in FIG. 63.

Figure 64:
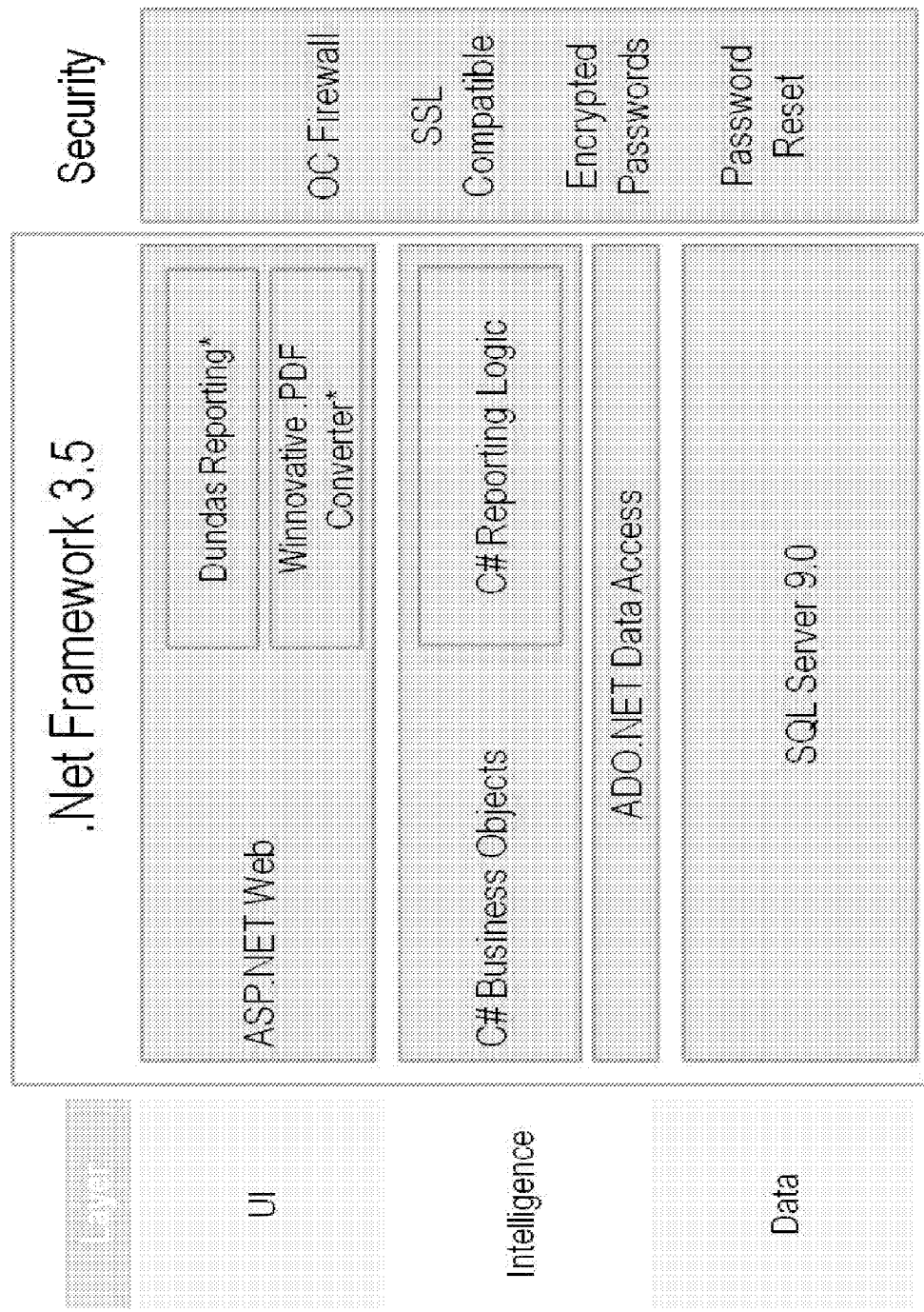
FIG. 64 shows an exemplary embodiment of the Render application design.
Figure 65:
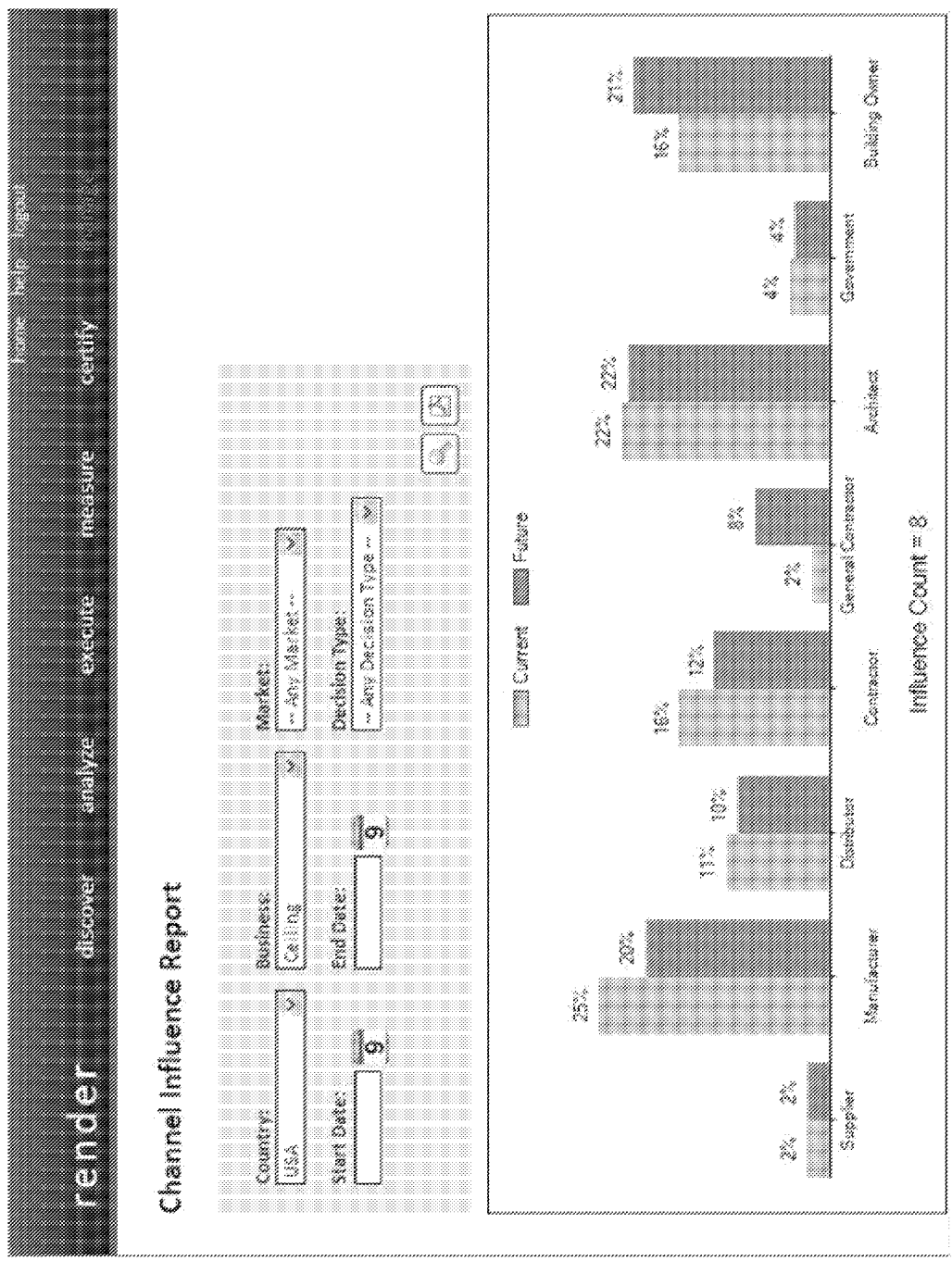
FIG. 65 shows an exemplary screen from Render showing a Channel Influence Report.

(2) Render™ Application: this comprises computer code on computer-readable media, a graphical user interface, and a navigation taxonomy that brings the CVC Approach and modules to life for an organization. The Render™ software application guides users through the CVC Modules in an easy to use fashion that requires minimal training and administration. In one embodiment, the software application is designed as a software-as-a-service delivery model, built on a development platform such as Microsoft .NET, as shown in FIG. 64. It contains all of the CVC modules in its code set, accessible by an easy-to-use web-based graphical user interface, an example of which is shown in FIG. 65.

Figure 66:
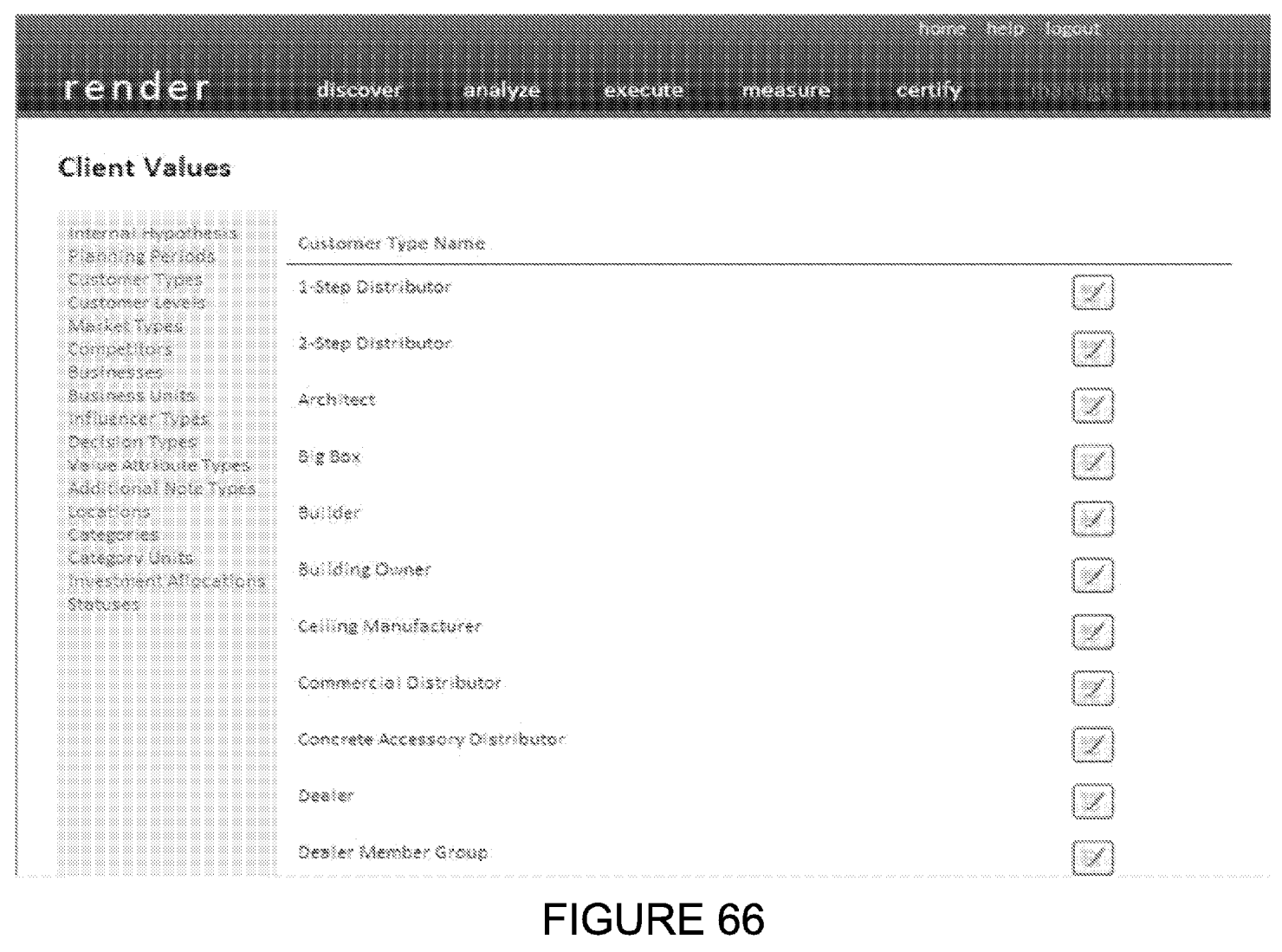

(3) Render™ Shell: this comprises an application shell that allows Customer Value Creation to be tailored to an individual organization's business and needs without requiring additional software application development (see FIG. 66). All customization can be performed by an administrator, allowing deployment to be completed more quickly. In one embodiment, the Render™ Shell comprises a metadata platform that allows organizations to specify the businesses, customers, markets, channels, and all other dataset nuances by an application administrator requiring no prerequisite skill set aside from basic computer use proficiency. The Render™ Application Shell also includes the ability for organizations to customize access to CVC dataset and CVC Modules by user role and responsibility.

Figure 68:
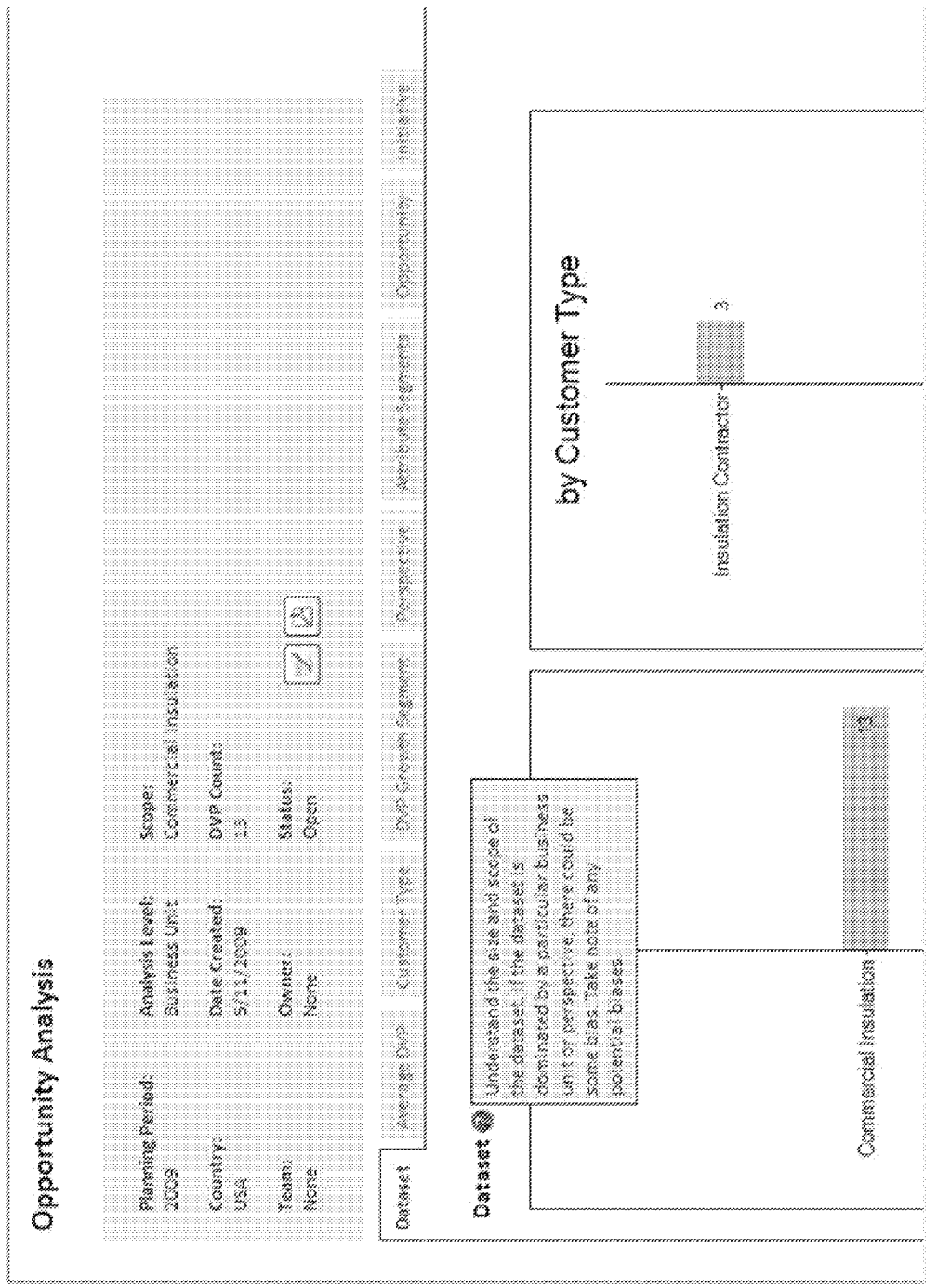
FIG. 68 shows an exemplary tool tips screen.

The Academy Training Curriculum comprises an integrated system of online computer based training lessons, in-person classroom workshops, and application tool tips so that organizations can execute the CVC Modules with rigor. An example of a Class Catalog Matrix is shown in FIG. 67. Academy is customized by user role and deployed by first providing students with the opportunity to study and learn on their own time with computer based training. Once the self-study training is complete, students then complete in-person workshops to practice and receive feedback on critical activities of CVC, such as the Discovery Process. Finally, integrated in Render are tool tips that reinforce the skills acquired in online and offline training, as shown in FIG. 68. The result is transforming a given student from no prior knowledge of Customer Value Creation to a self-sustaining practitioner of CVC in less than 2 days time.

In order to provide a context for the various computer-assisted or computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed herein, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, routines, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable by a single computing device.

A client device may be any type of processor-based platform that is connected to a network and that interacts with one or more application programs The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices.

Users may communicate with each other, and with other systems, networks, and devices, over the network through the respective client device. In one embodiment, the network is also coupled to a server device. Server device comprises a server executing a social network engine application or program. The social network engine allows users to participate in a social network. A social network can refer to a computer network connecting entities, such as people or organizations, by a set of social relationships, such as friendship, co-working, or information exchange, and may also refer to the computer application or data itself.

Server device may comprise a processor coupled to a computer-readable memory. Server device is in communication with at least one social network database. The server device, while discussed herein as a single computer system, may be implemented as a network of computer processors. Examples of server devices include, but are not limited to, servers, mainframe computers, networked computers, a processor-based device, and similar types of systems and devices.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

What is claimed is:

1. One or more tangible non-transitory computer-readable storage media for storing computer-executable instructions executable by processing logic, the media storing modules for managing customer value creation comprising:

a data gathering and collection module including instructions for:
receiving a first dataset about a customer organization, the first dataset comprising first value attributes each having a relative score and a value;
processing the first dataset to generate a first quantified economic or financial impact on a profitability of the customer organization based on the first value attributes;
generating one or more customer data collection templates based on the first quantified economic or financial impact on a profitability of the customer organization for use in obtaining information from the customer organization; and
receiving a second dataset about the customer organization based on the information provided by the customer organization, the second dataset comprising second value attributes each having a relative score and a value;

a data analysis module including instructions for:
processing at least the second dataset to generate a second quantified economic or financial impact on the profitability of the customer organization based on the second value attributes;
identifying one or more investment opportunities based on the second quantified economic or financial impact on the profitability of the customer organization; and
generating and prioritizing one or more initiatives to achieve the identified investment opportunities to increase the profitability of the customer organization; and an execution module including instructions for:
generating at least one business plan based on the identified investment opportunities and initiatives, wherein the plan includes an expected return associated with execution of each initiative and a current status of each initiative.

2. The computer-readable storage media of claim 1, further comprising
a measurement module including instructions for:
measuring progress on the business plan initiatives over time; and
displaying the measured progress on at least one graphical display viewable on a computer monitor or display device.

3. The computer-readable storage media of claim 1, further comprising
a measurement module including instructions for:
measuring a change in the quantified second economic or financial impact on the profitability of the customer organization over time; and displaying the measured change on at least one graphical display viewable on a computer monitor or display device.

4. The computer-readable storage media of claim 1, wherein the data analysis module further includes instructions for:

compiling at least processed second datasets associated with two or more customer organizations.

5. A computer-implemented method for managing customer value creation, comprising:

receiving, by a computer, a first dataset about a customer organization, the first dataset comprising first value attributes each having a relative score and a value;

processing, by the computer, the first dataset to generate a first quantified economic or financial impact on a profitability of the customer organization based on the first value attributes;

generating, by the computer, one or more customer data collection templates based on the first quantified economic or financial impact on a profitability of the customer organization for use in obtaining information from the customer organization;

receiving, by the computer, a second dataset about the customer organization based on information provided by the customer organization, the second dataset comprising second value attributes each having a relative score and a value;

processing, by the computer, at least the second dataset to generate a second quantified economic or financial impact on the profitability of the customer organization based on the second value attributes;

identifying, by the computer, one or more investment opportunities based on the second quantified economic or financial impact on the profitability of the customer organization;

generating and prioritizing, by the computer, one or more initiatives to achieve the identified investment opportunities to increase the profitability of the customer organization;

generating, by the computer, at least one business plan based on the identified investment opportunities and initiatives, wherein the plan includes an expected return associated with each initiative and a current status of each initiative.

6. The computer-implemented method of claim 5, further comprising:

measuring, by the computer, progress on the business plan initiatives over time; and displaying, by the computer, the measured progress on at least one graphical display viewable on a computer monitor or display device.

7. The computer-implemented method of claim 5, further comprising:

measuring, by the computer, a change in the quantified second economic or financial impact on the profitability of the customer organization over time; and displaying, by the computer, the measured change on at least one graphical display viewable on a computer monitor or display device.

8. The computer-implemented method of claim 5, further comprising:

compiling, by the computer, at least processed second datasets associated with two or more customer organizations.

* * * * *

UNITED STATES PATENT AND TRADEMARK OFFICE
CERTIFICATE OF CORRECTION

PATENT NO.         : 8,311,879 B2                              Page 1 of 1
APPLICATION NO.    : 12/486700
DATED              : November 13, 2012
INVENTOR(S)        : Jerry Alderman et al.

It is certified that error appears in the above-identified patent and that said Letters Patent is hereby corrected as shown below:

In the Claims:

Column 16, Claim 1, line 9, after the word "relative" insert -- numerical percentage --.

Column 16, Claim 1, line 22, after the word "relative" insert -- numerical percentage --.

Column 17, Claim 5, line 5, after the word "relative" insert -- numerical percentage --.

Column 17, Claim 5, line 18, after the word "relative" insert -- numerical percentage --.

Signed and Sealed this
Eighth Day of January, 2013

David J. Kappos
*Director of the United States Patent and Trademark Office*